(12) United States Patent
Lewis et al.

(10) Patent No.: US 12,551,583 B2
(45) Date of Patent: Feb. 17, 2026

(54) RADIOLABELED LIGANDS FOR TARGETED PET/SPECT IMAGING AND METHODS OF THEIR USE

(71) Applicants: MEMORIAL SLOAN KETTERING CANCER CENTER, New York, NY (US); UNIVERSITY OF RHODE ISLAND BOARD OF TRUSTEES, Kingston, RI (US); PHLIP, INC., Kingston, RI (US)

(72) Inventors: Jason S. Lewis, New York, NY (US); Dustin Demoin, New York, NY (US); Yana K. Reshetnyak, Saunderson, RI (US); Oleg A. Andreev, Saunderson, RI (US); Nerissa Viola-Villegas, New York, NY (US)

(73) Assignees: Memorial Sloan Kettering Cancer Center, New York, NY (US); University of Rhode Island Board of Trustees, Kingston, RI (US); pHLIP, Inc., Kingston, RI (US)

( * ) Notice: Subject to any disclaimer, the term of this patent is extended or adjusted under 35 U.S.C. 154(b) by 170 days.

(21) Appl. No.: 18/353,822

(22) Filed: Jul. 17, 2023

(65) Prior Publication Data
US 2024/0156998 A1 May 16, 2024

Related U.S. Application Data

(63) Continuation of application No. 16/321,429, filed as application No. PCT/US2017/044555 on Jul. 29, 2017, now abandoned.
(Continued)

(51) Int. Cl.
*A61K 51/08* (2006.01)
*A61K 47/54* (2017.01)
(Continued)

(52) U.S. Cl.
CPC .......... *A61K 51/088* (2013.01); *A61K 47/545* (2017.08); *A61K 47/547* (2017.08);
(Continued)

(58) Field of Classification Search
CPC .. A61K 51/088; A61K 47/545; A61K 47/547; A61K 47/64; A61K 49/0056;
(Continued)

(56) References Cited

U.S. PATENT DOCUMENTS

| | | | |
|---|---|---|---|
| 4,683,195 A | 7/1987 | Mullis et al. | |
| 8,076,451 B2 | 12/2011 | Reshetnyak et al. | |

(Continued)

FOREIGN PATENT DOCUMENTS

WO    WO-2012047354 A2 *  4/2012  ......... A61K 49/0056

OTHER PUBLICATIONS

Forster et al., Maleimido-Functionalized NOTA Derivatives as Bifunctional Chelators for Site-Specific Radiolabeling. Molecules. 2011; 16(6):5228-5240. https://doi.org/10.3390/molecules16065228 (Year: 2011).*

(Continued)

*Primary Examiner* — Randall L Beane
(74) *Attorney, Agent, or Firm* — Foley & Lardner LLP

(57) ABSTRACT

The present disclosure provides compounds, complexes, compositions, and methods for the detection of cancer. Specifically, the compounds, complexes, compositions of the present technology include pH (low) insertion peptides. Also disclosed herein are methods of using the complexes and compositions of the present technology in diagnostic imaging to detect cancer in a subject.

12 Claims, 77 Drawing Sheets
Specification includes a Sequence Listing.

Related U.S. Application Data

(60) Provisional application No. 62/368,991, filed on Jul. 29, 2016.

(51) Int. Cl.
    *A61K 47/64*          (2017.01)
    *A61K 49/00*          (2006.01)
    *A61K 49/08*          (2006.01)
    *A61K 49/12*          (2006.01)

(52) U.S. Cl.
CPC .......... *A61K 47/64* (2017.08); *A61K 49/0056* (2013.01); *A61K 49/085* (2013.01); *A61K 49/124* (2013.01)

(58) Field of Classification Search
CPC .... A61K 49/085; A61K 49/124; A61K 38/00; C07K 14/005; C07K 14/00
See application file for complete search history.

(56) References Cited

U.S. PATENT DOCUMENTS

| | | |
|---|---|---|
| 8,703,909 B2 | 4/2014 | Reshetnyak et al. |
| 8,846,081 B2 | 9/2014 | Reshetnyak et al. |
| 9,289,508 B2 | 3/2016 | Reshetnyak et al. |
| 9,676,823 B2 | 6/2017 | Reshetnyak et al. |
| 9,750,693 B2 | 9/2017 | Reshetnyak et al. |
| 9,814,781 B2 | 11/2017 | Reshetnyak et al. |

OTHER PUBLICATIONS

Viola-Villegas et al., Understanding the pharmacological properties of a metabolic PET tracer in prostate cancer, PNAS, vol. 111(20):7254-7259 and Suppl-7 (May 2014) (Year: 2014).*

Demoin et al, PET Imaging of Extracellular pH in Tumors with 64Cu- and 18F-Labeled pH LIP Peptides: A Structure-Activity Optimization Study, Bioconjug Chem., vol. 27(9):2014-2023, Supplemental pp. 1-54 (online Jul. 9, 2016) (Year: 2016).

International Search Report and Written Opinion, PCT/US2017/044555 (Dec. 28, 2017).

Lewis et al., A Novel Technology for the Imaging of Acidic Prostate Tumors by Positron Emission Tomography, Cancer Res, vol. 69(10):4510-4516 (May 15, 2009) (Year: 2009).

Tolmachev et al., "Evaluation of a maleimido derivative of NOTA for site-specific labeling of affibody molecules," Bioconjugate Chem., 22, pp. 894-902 (2011).

Viola-Villegas et al., "Understanding the pharmacological properties of a metabolic PET tracer in prostate cancer," PNAS, vol. 111, No. 20, pp. 7254-7259 (May 20, 2014).

Weerakkody et al., Family of pH (low) insertion peptides for tumor targeting, PNAS, vol. 110(15):5834-5839 (Apr. 9, 2013) (Year: 2013).

* cited by examiner

1 = [$^{18}$F]-AlF-NOTA-WT
2 = [$^{18}$F]-AlF-NOTA-Var3
3 = [$^{18}$F]-AlF-NOTA-Var7
4 = $^{64}$Cu-NOTA-WT
5 = $^{64}$Cu-NOTA-Var3
6 = $^{64}$Cu-NOTA-Var7
7 = [$^{18}$F]-AlF-NO2A-cysWT
8 = [$^{18}$F]-AlF-NO2A-cysVar3
9 = [$^{18}$F]-AlF-NO2A-cysVar7
10 = $^{64}$Cu-NO2A-cysWT
11 = $^{64}$Cu-NO2A-cysVar3

1 = $^{64}$Cu-NOTA-WT
2 = $^{64}$Cu-NOTA-Var3
3 = $^{64}$Cu-NOTA-Var7
4 = $^{64}$Cu-NO2A-cysWT
5 = $^{64}$Cu-NO2A-cysVar3
6 = $^{64}$Cu-NO2A-cysVar7

| pH | AIF-NO2A-cysVar3 | Cu-NO2A-cysVar3 |
|---|---|---|
| 7.4 | 4.2% | 1.7% |
| 7.2 | 5.9% | 2.5% |
| 6.8 | 11.3% | 5.8% |
| 6.5 | 17.9% | 10.5% |
| 6.2 | 27.0% | 18.3% |
| 6.0 | 34.6% | 25.7% |

1 = $^{64}$Cu-NO2A-cysVar3
2 = [$^{18}$F]-AlF-NO2A-cysVar3
3 = $^{64}$Cu-DO3A-cysWT
4 = $^{18}$F-py-click-6Ahx-WT
5 = $^{68}$Ga-DO3A-cysWT
6 = $^{68}$Ga-DO3A-cysVar7
7 = $^{64}$Cu-DO3A-cysVar7
8 = $^{64}$Cu-NOTA-Var7

1 = $^{64}$Cu-NO2A-cysVar3
2 = [$^{18}$F]-AlF-NO2A-cysVar3
3 = $^{64}$Cu-DO3A-cysWT
4 = $^{18}$F-py-click-6Ahx-WT
5 = $^{64}$Cu-DO3A-cysVar7
6 = $^{64}$Cu-NOTA-Var7

1 = [$^{18}$F]-AlF-NO2A-C$^{27}$Var3 4 h
2 = $^{64}$Cu-NO2A-C$^{27}$Var3 4 h
3 = $^{67}$Ga-NO2A-C$^{27}$Var3 4 h
4 = [$^{18}$F]-AlF-NO2A-C$^{27}$Var3 6 h
5 = $^{64}$Cu-NO2A-C$^{27}$Var3 24 h
6 = $^{67}$Ga-NO2A-C$^{27}$Var3 24 h

| Imaging Agent | Specific Activity (µCi/nmol)[a] | Specific Activity (µCi/nmol)[b] |
|---|---|---|
| $^{64}$Cu-NOTA-Var7 | 82.4 | N/A |
| [18]F-AlF-NOTA-Var7 | 79.9 | N/A |
| $^{64}$Cu-NOTA-Var3 | 132.8[c] | N/A |
| [18]F-AlF-NOTA-Var3 | 101.3 | N/A |
| $^{64}$Cu-NOTA-WT | 116.4 | N/A |
| [18]F-AlF-NOTA-WT | 135.9 | N/A |
| [64]Cu-NO2A-cysVar7 | 113.7 | 219.6 |
| [18]F-AlF-NO2A-cysVar7 | 55.9 | 178.1 |
| [64]Cu-NO2A-cysVar3 | 45.5-523.3 | 47.5-340.2 |
| [18]F-AlF-NO2A-cysVar3 | 31.2-84.2 | 38.9-351.4 |
| [64]Cu-NO2A-cysWT | 215.6 | 99.1 |
| [18]F-AlF-NO2A-cysWT | 19.6 | N/A |

Figure 21

| Tissue | 1 h (n = 4) | 2 h (n = 4) | 4 h (n = 4) | 12 h (n = 4) | 24 h (n = 3) |
|---|---|---|---|---|---|
| Blood | 3.535 ± 0.291 | 0.413 ± 0.265 | 0.172 ± 0.047 | 0.533 ± 0.118 | 0.288 ± 0.119 |
| Heart | 0.057 ± 0.006 | 0.046 ± 0.006 | 0.048 ± 0.009 | 0.069 ± 0.009 | 0.040 ± 0.005 |
| Lungs | 3.359 ± 0.043 | 0.364 ± 0.049 | 0.314 ± 0.041 | 0.340 ± 0.074 | 0.236 ± 0.006 |
| Liver | 1.185 ± 0.298 | 0.991 ± 0.219 | 0.822 ± 0.150 | 0.858 ± 0.166 | 0.645 ± 0.024 |
| Spleen | 0.049 ± 0.009 | 0.039 ± 0.005 | 0.047 ± 0.007 | 0.062 ± 0.008 | 0.058 ± 0.004 |
| Pancreas | 0.041 ± 0.015 | 0.032 ± 0.005 | 0.044 ± 0.019 | 0.057 ± 0.006 | 0.051 ± 0.005 |
| Stomach | 0.282 ± 0.244 | 0.104 ± 0.028 | 0.121 ± 0.043 | 0.109 ± 0.019 | 0.074 ± 0.003 |
| S. intestine | 12.043 ± 2.341 | 1.684 ± 0.580 | 0.444 ± 0.050 | 0.376 ± 0.021 | 0.280 ± 0.010 |
| L. intestine | 2.488 ± 2.911 | 14.230 ± 1.086 | 8.510 ± 3.356 | 0.340 ± 0.138 | 0.291 ± 0.084 |
| Kidneys | 2.213 ± 0.110 | 1.849 ± 0.136 | 1.739 ± 0.183 | 1.434 ± 0.050 | 1.107 ± 0.094 |
| Muscle | 0.020 ± 0.005 | 0.017 ± 0.004 | 0.017 ± 0.004 | 0.018 ± 0.004 | 0.012 ± 0.004 |
| Bone | 0.012 ± 0.008 | 0.012 ± 0.004 | 0.014 ± 0.004 | 0.026 ± 0.015 | 0.012 ± 0.003 |
| Skin | 0.070 ± 0.023 | 0.080 ± 0.022 | 0.054 ± 0.007 | 0.095 ± 0.013 | 0.074 ± 0.012 |
| Brain | 0.033 ± 0.008 | 0.026 ± 0.005 | 0.022 ± 0.003 | 0.023 ± 0.001 | 0.017 ± 0.001 |
| Tumor | 0.101 ± 0.019 | 0.101 ± 0.012 | 0.136 ± 0.027 | 0.192 ± 0.071 | 0.198 ± 0.025 |

Figure 22

| Tissue | 1 h (n = 4) | 2 h (n = 4) | 4 h (n = 4) | 12 h (n = 4) | 24 h (n = 3) |
|---|---|---|---|---|---|
| Blood | 1.529 ± 0.164 | 1.223 ± 0.235 | 1.192 ± 0.263 | 1.241 ± 0.223 | 0.862 ± 0.097 |
| Heart | 0.589 ± 0.061 | 0.476 ± 0.051 | 0.495 ± 0.042 | 0.519 ± 0.099 | 0.364 ± 0.036 |
| Lungs | 1.773 ± 0.161 | 1.470 ± 0.090 | 1.414 ± 0.083 | 1.252 ± 0.231 | 0.866 ± 0.106 |
| Liver | 1.496 ± 0.379 | 1.161 ± 0.231 | 0.904 ± 0.097 | 0.816 ± 0.180 | 0.637 ± 0.063 |
| Spleen | 0.348 ± 0.043 | 0.308 ± 0.021 | 0.318 ± 0.023 | 0.342 ± 0.050 | 0.272 ± 0.017 |
| Pancreas | 0.267 ± 0.082 | 0.223 ± 0.027 | 0.261 ± 0.066 | 0.266 ± 0.091 | 0.188 ± 0.031 |
| Stomach | 0.351 ± 0.264 | 0.352 ± 0.085 | 0.282 ± 0.080 | 0.302 ± 0.055 | 0.170 ± 0.023 |
| S. intestine | 11.075 ± 3.605 | 1.410 ± 0.447 | 0.391 ± 0.082 | 0.301 ± 0.026 | 0.198 ± 0.023 |
| L. intestine | 4.140 ± 4.791 | 20.733 ± 1.782 | 9.956 ± 3.415 | 0.648 ± 0.192 | 0.291 ± 0.063 |
| Kidneys | 8.326 ± 1.158 | 7.156 ± 0.725 | 6.232 ± 0.613 | 4.974 ± 0.766 | 3.527 ± 0.943 |
| Muscle | 0.191 ± 0.026 | 0.164 ± 0.026 | 0.166 ± 0.008 | 0.160 ± 0.019 | 0.124 ± 0.028 |
| Bone | 0.251 ± 0.063 | 0.234 ± 0.089 | 0.274 ± 0.051 | 0.348 ± 0.063 | 0.269 ± 0.042 |
| Skin | 0.700 ± 0.072 | 0.679 ± 0.102 | 0.715 ± 0.109 | 0.766 ± 0.116 | 0.512 ± 0.062 |
| Brain | 0.092 ± 0.012 | 0.069 ± 0.008 | 0.054 ± 0.002 | 0.057 ± 0.007 | 0.046 ± 0.003 |
| Tumor | 0.577 ± 0.074 | 0.574 ± 0.108 | 0.679 ± 0.025 | 0.904 ± 0.144 | 0.845 ± 0.127 |
| Tumor-to-tissue ratios (rel. u.) | | | | | |
| Tumor/blood | 0.377 ± 0.063 | 0.470 ± 0.132 | 0.569 ± 0.127 | 0.729 ± 0.176 | 0.980 ± 0.184 |
| Tumor/liver | 0.386 ± 0.110 | 0.494 ± 0.135 | 0.751 ± 0.085 | 1.108 ± 0.301 | 1.327 ± 0.239 |
| Tumor/S.I. | 0.052 ± 0.018 | 0.407 ± 0.150 | 1.737 ± 0.370 | 3.008 ± 0.543 | 4.264 ± 0.804 |
| Tumor/L.I. | 0.139 ± 0.162 | 0.028 ± 0.006 | 0.068 ± 0.024 | 1.395 ± 0.469 | 2.904 ± 0.767 |
| Tumor/kidney | 0.069 ± 0.013 | 0.080 ± 0.017 | 0.109 ± 0.011 | 0.182 ± 0.040 | 0.240 ± 0.073 |
| Tumor/muscle | 3.029 ± 0.565 | 3.509 ± 0.869 | 4.099 ± 0.255 | 5.665 ± 1.130 | 6.794 ± 1.832 |
| Tumor/bone | 2.301 ± 0.651 | 2.457 ± 1.048 | 2.473 ± 0.471 | 2.601 ± 0.626 | 3.146 ± 0.682 |

Figure 23

| Tissue | 1 h (n = 5) | 2 h (n = 5) | 4 h (n = 5) | 12 h (n = 5) | 24 h (n = 4) |
|---|---|---|---|---|---|
| Blood | 0.288 ± 0.059 | 0.271 ± 0.185 | 0.225 ± 0.122 | 0.232 ± 0.048 | 0.479 ± 0.214 |
| Heart | 0.057 ± 0.014 | 0.052 ± 0.007 | 0.047 ± 0.009 | 0.039 ± 0.004 | 0.041 ± 0.012 |
| Lungs | 0.420 ± 0.047 | 0.458 ± 0.058 | 0.398 ± 0.073 | 0.303 ± 0.067 | 0.276 ± 0.044 |
| Liver | 1.093 ± 0.224 | 0.892 ± 0.188 | 0.808 ± 0.081 | 0.713 ± 0.042 | 0.647 ± 0.140 |
| Spleen | 0.047 ± 0.008 | 0.048 ± 0.005 | 0.045 ± 0.002 | 0.050 ± 0.010 | 0.045 ± 0.006 |
| Pancreas | 0.052 ± 0.015 | 0.044 ± 0.021 | 0.045 ± 0.011 | 0.037 ± 0.009 | 0.041 ± 0.023 |
| Stomach | 0.092 ± 0.018 | 0.119 ± 0.041 | 0.111 ± 0.013 | 0.115 ± 0.025 | 0.096 ± 0.046 |
| S. intestine | 17.226 ± 2.329 | 1.364 ± 0.327 | 0.394 ± 0.075 | 0.335 ± 0.029 | 0.322 ± 0.063 |
| L. intestine | 1.859 ± 0.941 | 18.364 ± 3.419 | 5.350 ± 3.021 | 0.514 ± 0.128 | 0.342 ± 0.026 |
| Kidneys | 2.591 ± 0.170 | 2.141 ± 0.203 | 1.955 ± 0.280 | 1.454 ± 0.097 | 1.266 ± 0.178 |
| Muscle | 0.017 ± 0.007 | 0.020 ± 0.004 | 0.018 ± 0.001 | 0.014 ± 0.003 | 0.016 ± 0.006 |
| Bone | 0.016 ± 0.015 | 0.011 ± 0.006 | 0.022 ± 0.009 | 0.020 ± 0.008 | 0.008 ± 0.006 |
| Skin | 0.055 ± 0.016 | 0.062 ± 0.009 | 0.060 ± 0.013 | 0.056 ± 0.018 | 0.062 ± 0.016 |
| Brain | 0.033 ± 0.004 | 0.030 ± 0.007 | 0.022 ± 0.004 | 0.018 ± 0.002 | 0.017 ± 0.002 |
| Tumor | 0.110 ± 0.029 | 0.124 ± 0.024 | 0.145 ± 0.048 | 0.165 ± 0.029 | 0.195 ± 0.026 |

Figure 25

| Tissue | 1 h (n = 5) | 2 h (n = 5) | 4 h (n = 5) | 12 h (n = 5) | 24 h (n = 4) |
|---|---|---|---|---|---|
| Blood | 1.215 ± 0.223 | 1.226 ± 0.361 | 1.371 ± 0.244 | 1.113 ± 0.138 | 1.073 ± 0.223 |
| Heart | 0.509 ± 0.103 | 0.490 ± 0.067 | 0.489 ± 0.047 | 0.401 ± 0.052 | 0.404 ± 0.104 |
| Lungs | 1.516 ± 0.212 | 1.499 ± 0.231 | 1.420 ± 0.117 | 1.048 ± 0.180 | 1.079 ± 0.179 |
| Liver | 1.273 ± 0.109 | 1.073 ± 0.197 | 1.034 ± 0.150 | 0.631 ± 0.067 | 0.719 ± 0.125 |
| Spleen | 0.305 ± 0.047 | 0.333 ± 0.029 | 0.340 ± 0.032 | 0.289 ± 0.019 | 0.308 ± 0.053 |
| Pancreas | 0.291 ± 0.070 | 0.261 ± 0.057 | 0.279 ± 0.041 | 0.219 ± 0.029 | 0.203 ± 0.045 |
| Stomach | 0.267 ± 0.091 | 0.240 ± 0.064 | 0.194 ± 0.050 | 0.227 ± 0.074 | 0.250 ± 0.038 |
| S. intestine | 13.092 ± 2.311 | 1.034 ± 0.352 | 0.320 ± 0.042 | 0.263 ± 0.024 | 0.259 ± 0.043 |
| L. intestine | 1.988 ± 1.539 | 25.768 ± 5.740 | 7.449 ± 2.726 | 0.507 ± 0.063 | 0.395 ± 0.058 |
| Kidneys | 9.335 ± 0.826 | 7.715 ± 0.750 | 7.165 ± 1.126 | 4.735 ± 0.413 | 4.397 ± 0.874 |
| Muscle | 0.157 ± 0.019 | 0.198 ± 0.052 | 0.171 ± 0.017 | 0.143 ± 0.031 | 0.152 ± 0.051 |
| Bone | 0.216 ± 0.113 | 0.269 ± 0.078 | 0.339 ± 0.018 | 0.320 ± 0.070 | 0.220 ± 0.136 |
| Skin | 0.728 ± 0.205 | 0.720 ± 0.099 | 0.773 ± 0.102 | 0.699 ± 0.192 | 0.672 ± 0.187 |
| Brain | 0.087 ± 0.013 | 0.076 ± 0.018 | 0.063 ± 0.011 | 0.046 ± 0.004 | 0.042 ± 0.010 |
| Tumor | 0.515 ± 0.083 | 0.663 ± 0.167 | 0.649 ± 0.091 | 0.755 ± 0.056 | 0.926 ± 0.175 |
| Tumor-to-tissue ratios (rel. u.) | | | | | |
| Tumor/Blood | 0.42 ± 0.10 | 0.54 ± 0.21 | 0.47 ± 0.11 | 0.68 ± 0.10 | 0.86 ± 0.24 |
| Tumor/Liver | 0.40 ± 0.07 | 0.62 ± 0.19 | 0.63 ± 0.13 | 1.20 ± 0.15 | 1.29 ± 0.33 |
| Tumor/S.I. | 0.04 ± 0.01 | 0.64 ± 0.27 | 2.03 ± 0.39 | 2.87 ± 0.34 | 3.57 ± 0.90 |
| Tumor/L.I. | 0.26 ± 0.20 | 0.03 ± 0.01 | 0.09 ± 0.03 | 1.49 ± 0.22 | 2.35 ± 0.56 |
| Tumor/Kidney | 0.06 ± 0.01 | 0.09 ± 0.02 | 0.09 ± 0.02 | 0.16 ± 0.02 | 0.21 ± 0.06 |
| Tumor/Muscle | 2.75 ± 0.52 | 3.34 ± 1.22 | 3.80 ± 0.65 | 5.27 ± 1.22 | 6.11 ± 2.35 |
| Tumor/Bone | 2.39 ± 1.31 | 2.46 ± 0.94 | 1.92 ± 0.29 | 2.36 ± 0.55 | 4.21 ± 2.72 |

Figure 26

| Tissue | 1 h (n = 4) | | 2 h (n = 4) | | 4 h (n = 4) | | 12 h (n = 4) | | 24 h (n = 4) | |
|---|---|---|---|---|---|---|---|---|---|---|
| Blood | 0.258 | ± 0.037 | 0.228 | ± 0.030 | 0.070 | ± 0.004 | 0.074 | ± 0.009 | 0.163 | ± 0.028 |
| Heart | 0.212 | ± 0.006 | 0.118 | ± 0.004 | 0.033 | ± 0.004 | 0.028 | ± 0.009 | 0.116 | ± 0.005 |
| Lungs | 0.252 | ± 0.010 | 0.289 | ± 0.074 | 0.267 | ± 0.059 | 0.206 | ± 0.059 | 0.142 | ± 0.020 |
| Liver | 0.923 | ± 0.229 | 0.640 | ± 0.246 | 0.673 | ± 0.038 | 0.396 | ± 0.028 | 0.298 | ± 0.050 |
| Spleen | 0.032 | ± 0.004 | 0.024 | ± 0.001 | 0.034 | ± 0.004 | 0.034 | ± 0.005 | 0.025 | ± 0.002 |
| Pancreas | 0.023 | ± 0.005 | 0.018 | ± 0.006 | 0.032 | ± 0.014 | 0.026 | ± 0.009 | 0.018 | ± 0.004 |
| Stomach | 0.081 | ± 0.017 | 0.070 | ± 0.024 | 0.133 | ± 0.026 | 0.085 | ± 0.006 | 0.052 | ± 0.016 |
| S. intestine | 9.532 | ± 1.902 | 0.832 | ± 0.367 | 0.374 | ± 0.103 | 0.233 | ± 0.030 | 0.153 | ± 0.026 |
| L. intestine | 0.300 | ± 0.072 | 12.452 | ± 1.188 | 5.608 | ± 0.658 | 0.201 | ± 0.026 | 0.265 | ± 0.103 |
| Kidneys | 1.875 | ± 0.173 | 1.679 | ± 0.078 | 1.764 | ± 0.059 | 1.067 | ± 0.094 | 0.867 | ± 0.124 |
| Muscle | 0.010 | ± 0.005 | 0.015 | ± 0.001 | 0.012 | ± 0.006 | 0.008 | ± 0.003 | 0.007 | ± 0.002 |
| Bone | 0.003 | ± 0.002 | 0.002 | ± 0.001 | 0.011 | ± 0.002 | 0.008 | ± 0.003 | 0.004 | ± 0.002 |
| Skin | 0.028 | ± 0.014 | 0.041 | ± 0.011 | 0.039 | ± 0.004 | 0.043 | ± 0.014 | 0.038 | ± 0.005 |
| Brain | 0.030 | ± 0.007 | 0.019 | ± 0.002 | 0.016 | ± 0.002 | 0.010 | ± 0.004 | 0.011 | ± 0.003 |
| Tumor | 0.074 | ± 0.029 | 0.063 | ± 0.017 | 0.094 | ± 0.017 | 0.138 | ± 0.066 | 0.161 | ± 0.036 |

Figure 28

| Tissue | 1 h (n = 4) | 2 h (n = 4) | 4 h (n = 4) | 12 h (n = 4) | 24 h (n = 4) |
|---|---|---|---|---|---|
| Blood | 0.988 ± 0.172 | 0.804 ± 0.078 | 0.833 ± 0.068 | 0.759 ± 0.113 | 0.613 ± 0.083 |
| Heart | 0.333 ± 0.055 | 0.316 ± 0.042 | 0.353 ± 0.041 | 0.307 ± 0.036 | 0.282 ± 0.075 |
| Lungs | 1.094 ± 0.153 | 0.979 ± 0.104 | 0.996 ± 0.066 | 0.904 ± 0.088 | 0.666 ± 0.107 |
| Liver | 1.011 ± 0.090 | 0.915 ± 0.152 | 0.739 ± 0.041 | 0.479 ± 0.038 | 0.449 ± 0.091 |
| Spleen | 0.217 ± 0.036 | 0.215 ± 0.020 | 0.279 ± 0.016 | 0.213 ± 0.031 | 0.175 ± 0.030 |
| Pancreas | 0.182 ± 0.040 | 0.150 ± 0.032 | 0.198 ± 0.043 | 0.182 ± 0.029 | 0.122 ± 0.019 |
| Stomach | 0.324 ± 0.062 | 0.299 ± 0.107 | 0.300 ± 0.076 | 0.078 ± 0.015 | 0.200 ± 0.070 |
| S. intestine | 9.167 ± 2.676 | 0.935 ± 0.329 | 0.307 ± 0.077 | 0.158 ± 0.012 | 0.179 ± 0.044 |
| L. intestine | 0.461 ± 0.081 | 18.311 ± 2.211 | 7.782 ± 0.609 | 0.255 ± 0.043 | 0.368 ± 0.098 |
| Kidneys | 6.760 ± 0.950 | 6.065 ± 0.619 | 6.790 ± 0.461 | 4.143 ± 0.512 | 3.410 ± 0.525 |
| Muscle | 0.123 ± 0.018 | 0.141 ± 0.018 | 0.118 ± 0.025 | 0.104 ± 0.016 | 0.101 ± 0.020 |
| Bone | 0.141 ± 0.055 | 0.099 ± 0.053 | 0.229 ± 0.093 | 0.247 ± 0.039 | 0.136 ± 0.064 |
| Skin | 0.490 ± 0.053 | 0.497 ± 0.060 | 0.563 ± 0.145 | 0.566 ± 0.092 | 0.510 ± 0.120 |
| Brain | 0.071 ± 0.016 | 0.053 ± 0.003 | 0.042 ± 0.004 | 0.032 ± 0.007 | 0.032 ± 0.005 |
| Tumor | 0.366 ± 0.034 | 0.414 ± 0.037 | 0.546 ± 0.075 | 0.673 ± 0.078 | 0.693 ± 0.040 |
| Tumor-to-tissue ratios (rel. n.) | | | | | |
| Tumor/Blood | 0.371 ± 0.073 | 0.515 ± 0.068 | 0.655 ± 0.105 | 0.886 ± 0.168 | 1.126 ± 0.165 |
| Tumor/Liver | 0.362 ± 0.047 | 0.452 ± 0.086 | 0.738 ± 0.110 | 1.403 ± 0.198 | 1.542 ± 0.325 |
| Tumor/S.I. | 0.040 ± 0.012 | 0.443 ± 0.101 | 1.780 ± 0.510 | 4.259 ± 0.599 | 3.878 ± 0.972 |
| Tumor/L.I. | 0.794 ± 0.158 | 0.022 ± 0.003 | 0.070 ± 0.011 | 2.642 ± 0.540 | 1.883 ± 0.514 |
| Tumor/Kidney | 0.054 ± 0.009 | 0.068 ± 0.009 | 0.080 ± 0.012 | 0.162 ± 0.028 | 0.203 ± 0.033 |
| Tumor/Muscle | 2.966 ± 0.518 | 2.947 ± 0.465 | 4.618 ± 1.167 | 6.444 ± 1.231 | 6.878 ± 1.430 |
| Tumor/Bone | 2.598 ± 1.040 | 4.193 ± 2.268 | 2.388 ± 1.030 | 2.727 ± 0.536 | 5.087 ± 2.404 |

Figure 29

| Tissue | 0.5 h (n = 5) | 1 h (n = 5) | 2 h (n = 5) | 4 h (n = 5) |
|---|---|---|---|---|
| Blood | 1.319 ± 0.188 | 1.112 ± 0.131 | 0.625 ± 0.423 | 0.637 ± 0.462 |
| Heart | 0.093 ± 0.015 | 0.103 ± 0.031 | 0.092 ± 0.025 | 0.061 ± 0.014 |
| Lungs | 0.525 ± 0.082 | 0.533 ± 0.125 | 0.468 ± 0.114 | 0.485 ± 0.062 |
| Liver | 1.681 ± 0.216 | 1.218 ± 0.260 | 1.238 ± 0.281 | 0.794 ± 0.142 |
| Spleen | 0.069 ± 0.009 | 0.074 ± 0.010 | 0.078 ± 0.006 | 0.068 ± 0.014 |
| Pancreas | 0.049 ± 0.018 | 0.043 ± 0.008 | 0.049 ± 0.009 | 0.044 ± 0.009 |
| Stomach | 0.108 ± 0.006 | 0.129 ± 0.033 | 0.118 ± 0.009 | 0.141 ± 0.027 |
| S. intestine | 12.837 ± 0.988 | 13.737 ± 1.399 | 1.120 ± 0.148 | 0.738 ± 0.243 |
| L. intestine | 0.197 ± 0.039 | 0.266 ± 0.079 | 16.243 ± 1.989 | 16.258 ± 1.370 |
| Kidneys | 5.518 ± 0.849 | 3.471 ± 0.123 | 2.861 ± 0.052 | 2.289 ± 0.250 |
| Muscle | 0.040 ± 0.007 | 0.038 ± 0.005 | 0.036 ± 0.008 | 0.031 ± 0.011 |
| Bone | 0.025 ± 0.011 | 0.013 ± 0.003 | 0.034 ± 0.018 | 0.046 ± 0.004 |
| Skin | 0.114 ± 0.051 | 0.129 ± 0.035 | 0.099 ± 0.029 | 0.105 ± 0.003 |
| Brain | 0.087 ± 0.007 | 0.063 ± 0.009 | 0.052 ± 0.006 | 0.039 ± 0.008 |
| Tumor | 0.159 ± 0.045 | 0.163 ± 0.042 | 0.175 ± 0.028 | 0.187 ± 0.060 |

Figure 31

| Tissue | 0.5 h (n = 5) | 1 h (n = 5) | 2 h (n = 5) | 4 h (n = 5) |
|---|---|---|---|---|
| Blood | 2.305 ± 0.308 | 2.034 ± 0.288 | 2.096 ± 0.250 | 1.978 ± 0.192 |
| Heart | 0.919 ± 0.105 | 0.884 ± 0.167 | 0.856 ± 0.091 | 0.664 ± 0.119 |
| Lungs | 2.353 ± 0.250 | 2.288 ± 0.072 | 2.186 ± 0.273 | 2.049 ± 0.211 |
| Liver | 1.964 ± 0.473 | 1.163 ± 0.166 | 1.158 ± 0.189 | 0.973 ± 0.213 |
| Spleen | 0.482 ± 0.080 | 0.423 ± 0.042 | 0.418 ± 0.046 | 0.434 ± 0.058 |
| Pancreas | 0.359 ± 0.089 | 0.318 ± 0.018 | 0.355 ± 0.062 | 0.324 ± 0.059 |
| Stomach | 0.406 ± 0.114 | 0.364 ± 0.087 | 0.442 ± 0.077 | 0.518 ± 0.152 |
| S. intestine | 12.969 ± 1.568 | 13.510 ± 0.999 | 1.080 ± 0.198 | 0.820 ± 0.245 |
| L. intestine | 0.264 ± 0.037 | 0.368 ± 0.126 | 24.375 ± 2.182 | 24.064 ± 2.848 |
| Kidneys | 18.931 ± 3.456 | 12.308 ± 0.760 | 10.247 ± 0.914 | 8.550 ± 1.138 |
| Muscle | 0.360 ± 0.070 | 0.315 ± 0.034 | 0.349 ± 0.073 | 0.283 ± 0.041 |
| Bone | 0.635 ± 0.181 | 0.627 ± 0.185 | 0.702 ± 0.166 | 0.671 ± 0.305 |
| Skin | 1.256 ± 0.240 | 1.138 ± 0.093 | 1.027 ± 0.178 | 1.032 ± 0.133 |
| Brain | 0.218 ± 0.018 | 0.165 ± 0.015 | 0.135 ± 0.009 | 0.100 ± 0.015 |
| Tumor | 0.995 ± 0.242 | 0.930 ± 0.129 | 0.944 ± 0.142 | 1.005 ± 0.232 |
| Tumor-to-tissue ratios (rel. u.) | | | | |
| Tumor/Blood | 0.43 ± 0.12 | 0.46 ± 0.09 | 0.45 ± 0.09 | 0.51 ± 0.13 |
| Tumor/Liver | 0.51 ± 0.17 | 0.80 ± 0.16 | 0.82 ± 0.18 | 1.03 ± 0.33 |
| Tumor/S. I. | 0.08 ± 0.02 | 0.07 ± 0.01 | 0.87 ± 0.21 | 1.22 ± 0.46 |
| Tumor/L. I. | 3.77 ± 1.06 | 2.52 ± 0.93 | 0.04 ± 0.01 | 0.04 ± 0.01 |
| Tumor/Kidney | 0.05 ± 0.02 | 0.08 ± 0.01 | 0.092 ± 0.016 | 0.12 ± 0.03 |
| Tumor/Muscle | 2.76 ± 0.86 | 2.96 ± 0.52 | 2.70 ± 0.70 | 3.54 ± 0.97 |
| Tumor/Bone | 1.57 ± 0.59 | 1.48 ± 0.48 | 1.345 ± 0.377 | 1.50 ± 0.76 |

Figure 32

| Tissue | 0.5 h (n = 5) | 1 h (n = 5) | 2 h (n = 5) | 4 h (n = 4) |
|---|---|---|---|---|
| Blood | 0.866 ± 0.319 | 0.481 ± 0.473 | 0.337 ± 0.229 | 1.083 ± 0.234 |
| Heart | 0.117 ± 0.020 | 0.095 ± 0.019 | 0.093 ± 0.022 | 0.078 ± 0.006 |
| Lungs | 0.815 ± 0.339 | 0.573 ± 0.157 | 0.588 ± 0.197 | 0.543 ± 0.107 |
| Liver | 2.398 ± 1.056 | 1.627 ± 0.382 | 1.091 ± 0.215 | 0.779 ± 0.050 |
| Spleen | 0.096 ± 0.009 | 0.076 ± 0.007 | 0.055 ± 0.014 | 0.070 ± 0.008 |
| Pancreas | 0.116 ± 0.115 | 0.047 ± 0.008 | 0.047 ± 0.014 | 0.061 ± 0.030 |
| Stomach | 0.235 ± 0.049 | 0.149 ± 0.029 | 0.132 ± 0.015 | 0.130 ± 0.018 |
| S. intestine | 12.015 ± 1.355 | 13.855 ± 1.696 | 2.964 ± 0.687 | 1.078 ± 0.208 |
| L. intestine | 0.326 ± 0.101 | 1.350 ± 1.253 | 13.535 ± 0.993 | 14.054 ± 1.192 |
| Kidneys | 6.242 ± 0.722 | 3.442 ± 0.594 | 2.748 ± 0.105 | 2.236 ± 0.141 |
| Muscle | 0.041 ± 0.014 | 0.044 ± 0.012 | 0.033 ± 0.011 | 0.028 ± 0.004 |
| Bone | 0.027 ± 0.019 | 0.022 ± 0.014 | 0.017 ± 0.014 | 0.016 ± 0.009 |
| Skin | 0.171 ± 0.030 | 0.180 ± 0.018 | 0.161 ± 0.040 | 0.106 ± 0.041 |
| Brain | 0.080 ± 0.014 | 0.063 ± 0.006 | 0.054 ± 0.007 | 0.041 ± 0.011 |
| Tumor | 0.188 ± 0.033 | 0.164 ± 0.025 | 0.134 ± 0.035 | 0.216 ± 0.047 |

Figure 34

| Tissue | 0.5 h (n = 5) | | 1 h (n = 5) | | 2 h (n = 5) | | 4 h (n = 4) | |
|---|---|---|---|---|---|---|---|---|
| Blood | 5.778 | ± 2.950 | 2.851 | ± 0.208 | 1.998 | ± 0.319 | 2.201 | ± 0.374 |
| Heart | 1.128 | ± 0.154 | 1.024 | ± 0.112 | 0.879 | ± 0.098 | 0.775 | ± 0.079 |
| Lungs | 3.470 | ± 0.434 | 2.567 | ± 0.497 | 2.375 | ± 0.279 | 2.217 | ± 0.380 |
| Liver | 2.960 | ± 0.390 | 1.605 | ± 0.396 | 1.302 | ± 0.332 | 0.923 | ± 0.153 |
| Spleen | 0.706 | ± 0.106 | 0.554 | ± 0.053 | 0.440 | ± 0.148 | 0.469 | ± 0.093 |
| Pancreas | 0.754 | ± 0.414 | 0.405 | ± 0.070 | 0.380 | ± 0.140 | 0.332 | ± 0.020 |
| Stomach | 1.034 | ± 0.138 | 0.648 | ± 0.300 | 0.586 | ± 0.096 | 0.482 | ± 0.223 |
| S. intestine | 10.125 | ± 1.224 | 12.675 | ± 2.221 | 2.671 | ± 0.830 | 0.927 | ± 0.152 |
| L. intestine | 0.434 | ± 0.077 | 1.879 | ± 1.637 | 19.737 | ± 2.432 | 22.047 | ± 2.461 |
| Kidneys | 21.180 | ± 3.755 | 11.398 | ± 1.054 | 10.166 | ± 1.290 | 8.237 | ± 1.106 |
| Muscle | 0.413 | ± 0.040 | 0.391 | ± 0.105 | 0.316 | ± 0.040 | 0.282 | ± 0.055 |
| Bone | 0.626 | ± 0.177 | 0.547 | ± 0.127 | 0.516 | ± 0.063 | 0.540 | ± 0.119 |
| Skin | 1.926 | ± 0.399 | 1.557 | ± 0.270 | 1.411 | ± 0.163 | 1.126 | ± 0.115 |
| Brain | 0.222 | ± 0.033 | 0.162 | ± 0.012 | 0.133 | ± 0.017 | 0.107 | ± 0.023 |
| Tumor | 1.142 | ± 0.244 | 0.913 | ± 0.046 | 0.802 | ± 0.129 | 0.923 | ± 0.119 |
| Tumor-to-tissue ratios (rel. u.) | | | | | | | | |
| Tumor/Blood | 0.198 | ± 0.109 | 0.320 | ± 0.028 | 0.401 | ± 0.091 | 0.419 | ± 0.090 |
| Tumor/Liver | 0.386 | ± 0.097 | 0.569 | ± 0.143 | 0.615 | ± 0.186 | 1.000 | ± 0.211 |
| Tumor/S. I. | 0.113 | ± 0.028 | 0.072 | ± 0.013 | 0.300 | ± 0.105 | 0.996 | ± 0.208 |
| Tumor/L. I. | 2.631 | ± 0.733 | 0.486 | ± 0.424 | 0.041 | ± 0.008 | 0.042 | ± 0.007 |
| Tumor/Kidney | 0.054 | ± 0.015 | 0.080 | ± 0.008 | 0.079 | ± 0.016 | 0.112 | ± 0.021 |
| Tumor/Muscle | 2.763 | ± 0.648 | 2.334 | ± 0.635 | 2.535 | ± 0.520 | 3.277 | ± 0.765 |
| Tumor/Bone | 1.823 | ± 0.646 | 1.668 | ± 0.397 | 1.554 | ± 0.315 | 1.709 | ± 0.430 |

Figure 35

| Tissue | 0.5 h (n = 5) | | 1 h (n = 5) | | 2 h (n = 5) | | 4 h (n = 5) | |
|---|---|---|---|---|---|---|---|---|
| Blood | 0.840 | ± 0.323 | 0.523 | ± 0.262 | 0.206 | ± 0.126 | 0.149 | ± 0.111 |
| Heart | 0.105 | ± 0.015 | 0.101 | ± 0.038 | 0.091 | ± 0.022 | 0.076 | ± 0.012 |
| Lungs | 0.625 | ± 0.122 | 0.555 | ± 0.304 | 0.485 | ± 0.196 | 0.593 | ± 0.054 |
| Liver | 1.258 | ± 0.785 | 1.083 | ± 0.384 | 1.043 | ± 0.440 | 0.863 | ± 0.132 |
| Spleen | 0.078 | ± 0.015 | 0.070 | ± 0.014 | 0.070 | ± 0.025 | 0.077 | ± 0.014 |
| Pancreas | 0.053 | ± 0.013 | 0.042 | ± 0.008 | 0.055 | ± 0.014 | 0.054 | ± 0.015 |
| Stomach | 0.163 | ± 0.035 | 0.127 | ± 0.039 | 0.136 | ± 0.013 | 0.167 | ± 0.052 |
| S. intestine | 13.273 | ± 1.269 | 11.429 | ± 5.124 | 4.863 | ± 2.873 | 0.905 | ± 0.293 |
| L. intestine | 0.207 | ± 0.050 | 1.006 | ± 1.208 | 10.930 | ± 2.777 | 13.783 | ± 4.870 |
| Kidneys | 4.639 | ± 0.460 | 2.934 | ± 0.361 | 2.360 | ± 0.178 | 2.147 | ± 0.138 |
| Muscle | 0.035 | ± 0.008 | 0.024 | ± 0.004 | 0.031 | ± 0.012 | 0.031 | ± 0.007 |
| Bone | 0.011 | ± 0.004 | 0.011 | ± 0.006 | 0.014 | ± 0.007 | 0.022 | ± 0.021 |
| Skin | 0.106 | ± 0.024 | 0.091 | ± 0.026 | 0.121 | ± 0.037 | 0.128 | ± 0.027 |
| Brain | 0.122 | ± 0.093 | 0.066 | ± 0.021 | 0.053 | ± 0.006 | 0.047 | ± 0.006 |
| Tumor | 0.174 | ± 0.057 | 0.163 | ± 0.055 | 0.163 | ± 0.036 | 0.209 | ± 0.070 |

Figure 37

| Tissue | 0.5 h (n = 5) | 1 h (n = 5) | 2 h (n = 5) | 4 h (n = 5) |
|---|---|---|---|---|
| Blood | 2.961 ± 0.684 | 2.263 ± 0.412 | 2.547 ± 0.642 | 2.292 ± 0.277 |
| Heart | 0.994 ± 0.167 | 0.885 ± 0.247 | 0.918 ± 0.195 | 0.775 ± 0.056 |
| Lungs | 2.110 ± 0.351 | 2.508 ± 0.683 | 2.532 ± 0.120 | 2.325 ± 0.212 |
| Liver | 1.946 ± 0.408 | 1.433 ± 0.605 | 1.545 ± 0.635 | 1.089 ± 0.066 |
| Spleen | 0.578 ± 0.156 | 0.419 ± 0.048 | 0.489 ± 0.096 | 0.485 ± 0.029 |
| Pancreas | 0.406 ± 0.047 | 0.340 ± 0.054 | 0.422 ± 0.083 | 0.373 ± 0.051 |
| Stomach | 0.727 ± 0.373 | 0.444 ± 0.097 | 0.603 ± 0.154 | 0.593 ± 0.153 |
| S. intestine | 13.049 ± 3.020 | 12.437 ± 6.386 | 4.931 ± 2.811 | 0.776 ± 0.196 |
| L. intestine | 0.332 ± 0.078 | 4.535 ± 6.803 | 18.246 ± 4.799 | 22.081 ± 6.021 |
| Kidneys | 17.053 ± 2.372 | 10.443 ± 0.757 | 9.250 ± 1.538 | 7.759 ± 0.638 |
| Muscle | 0.351 ± 0.046 | 0.296 ± 0.117 | 0.327 ± 0.088 | 0.325 ± 0.073 |
| Bone | 0.441 ± 0.086 | 0.355 ± 0.093 | 0.402 ± 0.063 | 0.571 ± 0.202 |
| Skin | 1.439 ± 0.207 | 1.217 ± 0.184 | 1.482 ± 0.329 | 1.377 ± 0.148 |
| Brain | 0.434 ± 0.495 | 0.170 ± 0.034 | 0.128 ± 0.020 | 0.118 ± 0.011 |
| Tumor | 0.864 ± 0.070 | 0.794 ± 0.230 | 0.915 ± 0.096 | 1.105 ± 0.125 |
| Tumor-to-tissue ratios (rel. u.) | | | | |
| Tumor/Blood | 0.29 ± 0.07 | 0.35 ± 0.12 | 0.36 ± 0.10 | 0.48 ± 0.08 |
| Tumor/Liver | 0.44 ± 0.10 | 0.6 ± 0.3 | 0.6 ± 0.3 | 1.01 ± 0.13 |
| Tumor/S.I. | 0.066 ± 0.016 | 0.06 ± 0.04 | 0.19 ± 0.11 | 1.4 ± 0.4 |
| Tumor/L.I. | 2.60 ± 0.64 | 0.17 ± 0.27 | 0.050 ± 0.014 | 0.050 ± 0.015 |
| Tumor/Kidney | 0.051 ± 0.008 | 0.08 ± 0.02 | 0.099 ± 0.019 | 0.14 ± 0.02 |
| Tumor/Muscle | 2.5 ± 0.4 | 2.7 ± 1.3 | 2.8 ± 0.8 | 3.4 ± 0.9 |
| Tumor/Bone | 2.0 ± 0.4 | 2.2 ± 0.9 | 2.3 ± 0.4 | 1.9 ± 0.7 |

| Tissue | 1 h (n=4) | 2 h (n=4) | 4 h (n=4) | 4 h + glucose (n=4) | 12 h (n=4) | 24 h (n=5) | 48 h (n=5) |
|---|---|---|---|---|---|---|---|
| Blood | 1.96 ± 0.24 | 0.87 ± 0.41 | 0.45 ± 0.08 | 0.39 ± 0.15 | 0.74 ± 0.38 | 0.47 ± 0.10 | 0.28 ± 0.12 |
| Heart | 0.25 ± 0.04 | 0.21 ± 0.01 | 0.28 ± 0.03 | 0.25 ± 0.02 | 0.49 ± 0.11 | 0.46 ± 0.08 | 0.36 ± 0.04 |
| Lungs | 1.52 ± 0.27 | 1.02 ± 0.19 | 1.04 ± 0.09 | 0.86 ± 0.12 | 1.56 ± 0.13 | 1.36 ± 0.16 | 0.79 ± 0.07 |
| Liver | 6.14 ± 0.70 | 9.31 ± 0.68 | 13.7 ± 1.3 | 13.7 ± 0.9 | 18.8 ± 2.8 | 16.4 ± 1.7 | 10.3 ± 1.1 |
| Spleen | 0.22 ± 0.02 | 0.26 ± 0.08 | 0.35 ± 0.04 | 0.35 ± 0.02 | 0.08 ± 0.20 | 0.23 ± 0.11 | 0.23 ± 0.05 |
| Pancreas | 0.14 ± 0.01 | 0.18 ± 0.02 | 0.28 ± 0.05 | 0.24 ± 0.03 | 0.38 ± 0.05 | 0.40 ± 0.04 | 0.24 ± 0.07 |
| Stomach | 0.44 ± 0.10 | 0.55 ± 0.04 | 1.48 ± 0.08 | 1.10 ± 0.36 | 1.85 ± 0.30 | 1.33 ± 0.16 | 1.02 ± 0.20 |
| S. intestine | 2.66 ± 0.29 | 4.74 ± 0.92 | 9.04 ± 0.95 | 5.91 ± 0.44 | 9.73 ± 0.76 | 8.21 ± 0.34 | 4.70 ± 0.27 |
| L. intestine | 0.85 ± 0.17 | 2.07 ± 0.26 | 6.39 ± 0.66 | 4.30 ± 0.87 | 8.64 ± 1.32 | 3.79 ± 0.27 | 4.52 ± 0.51 |
| Kidneys | 35.5 ± 3.92 | 40.5 ± 1.57 | 29.7 ± 3.4 | 25.1 ± 2.0 | 8.14 ± 0.52 | 5.23 ± 0.47 | 2.97 ± 0.19 |
| Muscle | 0.10 ± 0.02 | 0.08 ± 0.01 | 0.09 ± 0.02 | 0.09 ± 0.03 | 0.10 ± 0.02 | 0.11 ± 0.03 | 0.08 ± 0.01 |
| Bone | 0.03 ± 0.01 | 0.03 ± 0.03 | 0.14 ± 0.05 | 0.07 ± 0.00 | 0.10 ± 0.02 | 0.08 ± 0.01 | 0.05 ± 0.01 |
| Skin | 0.39 ± 0.04 | 0.32 ± 0.10 | 0.29 ± 0.02 | 0.31 ± 0.04 | 0.33 ± 0.03 | 0.24 ± 0.05 | 0.14 ± 0.01 |
| Brain | 0.08 ± 0.02 | 0.06 ± 0.01 | 0.10 ± 0.01 | 0.08 ± 0.01 | 0.18 ± 0.04 | 0.25 ± 0.02 | 0.21 ± 0.03 |
| Tumor | 0.38 ± 0.10 | 0.48 ± 0.09 | 0.71 ± 0.13 | 0.63 ± 0.11 | 0.78 ± 0.24 | 0.57 ± 0.24 | 0.37 ± 0.03 |

| Tissue | 0.5 h (n=4) | 1 h (n=4) | 2 h (n=4) | 4 h (n=4) | 4 h + glucose (n=4) | 6 h (n=4) |
|---|---|---|---|---|---|---|
| Blood | 1.23 ± 3.05 | 5.71 ± 0.45 | 6.72 ± 3.43 | 6.20 ± 3.06 | 4.16 ± 1.89 | 2.39 ± 0.99 |
| Heart | 0.59 ± 0.07 | 0.66 ± 0.25 | 0.51 ± 0.08 | 0.48 ± 0.15 | 0.35 ± 0.05 | 0.66 ± 0.18 |
| Lungs | 3.72 ± 2.15 | 4.09 ± 0.32 | 2.84 ± 0.29 | 1.74 ± 0.23 | 1.99 ± 0.13 | 0.98 ± 0.21 |
| Liver | 13.2 ± 0.74 | 12.9 ± 0.61 | 12.2 ± 0.79 | 14.4 ± 1.53 | 17.9 ± 1.03 | 13.1 ± 1.32 |
| Spleen | 0.43 ± 0.04 | 0.40 ± 0.08 | 0.43 ± 0.02 | 0.60 ± 0.03 | 0.63 ± 0.08 | 0.93 ± 0.26 |
| Pancreas | 0.29 ± 0.04 | 0.33 ± 0.08 | 0.27 ± 0.04 | 0.27 ± 0.07 | 0.26 ± 0.08 | 0.57 ± 0.25 |
| Stomach | 0.50 ± 0.04 | 0.42 ± 0.05 | 0.50 ± 0.12 | 0.38 ± 0.01 | 0.60 ± 0.15 | 0.83 ± 0.23 |
| S. intestine | 2.62 ± 0.29 | 2.55 ± 0.38 | 3.14 ± 0.53 | 3.16 ± 0.18 | 2.82 ± 0.35 | 3.58 ± 0.30 |
| L. intestine | 0.60 ± 0.21 | 0.68 ± 0.24 | 0.78 ± 0.03 | 1.17 ± 0.32 | 1.09 ± 0.26 | 1.64 ± 0.28 |
| Kidneys | 4.95 ± 0.53 | 6.85 ± 0.74 | 9.95 ± 1.17 | 15.0 ± 0.72 | 11.4 ± 1.58 | 17.7 ± 2.34 |
| Muscle | 0.12 ± 0.02 | 0.12 ± 0.01 | 0.14 ± 0.02 | 0.15 ± 0.03 | 0.10 ± 0.02 | 0.45 ± 0.31 |
| Bone | 0.07 ± 0.02 | 0.05 ± 0.01 | 0.05 ± 0.02 | 0.05 ± 0.02 | 0.16 ± 0.07 | 0.47 ± 0.26 |
| Skin | 0.28 ± 0.08 | 0.35 ± 0.06 | 0.31 ± 0.07 | 0.50 ± 0.08 | 0.20 ± 0.09 | 0.64 ± 0.24 |
| Brain | 0.26 ± 0.04 | 0.18 ± 0.03 | 0.14 ± 0.02 | 0.13 ± 0.03 | 0.13 ± 0.02 | 0.47 ± 0.24 |
| Tumor | 0.22 ± 0.06 | 0.25 ± 0.08 | 0.35 ± 0.10 | 0.55 ± 0.12 | 0.48 ± 0.15 | 0.89 ± 0.32 |

Figure 46

| Tissue | 0.5 h (n=4) | 1 h (n=4) | 2 h (n=4) | 4 h (n=4) | 4 h + glucose (n=4) | 6 h (n=4) |
|---|---|---|---|---|---|---|
| Blood | 35.8 ± 3.22 | 24.3 ± 1.66 | 21.6 ± 1.75 | 15.9 ± 0.63 | 14.0 ± 0.73 | 10.0 ± 1.91 |
| Heart | 6.33 ± 0.75 | 6.18 ± 1.69 | 5.40 ± 0.59 | 4.78 ± 0.53 | 3.75 ± 0.48 | 7.48 ± 2.47 |
| Lungs | 17.0 ± 3.66 | 13.1 ± 1.58 | 12.4 ± 0.44 | 8.73 ± 0.84 | 7.22 ± 0.20 | 6.34 ± 1.93 |
| Liver | 16.3 ± 1.39 | 13.7 ± 1.52 | 15.4 ± 1.23 | 12.6 ± 1.14 | 18.4 ± 1.31 | 14.5 ± 1.60 |
| Spleen | 4.06 ± 0.43 | 3.64 ± 0.31 | 4.12 ± 0.15 | 5.31 ± 0.34 | 3.85 ± 0.45 | 8.25 ± 2.44 |
| Pancreas | 2.09 ± 0.09 | 1.97 ± 0.29 | 1.86 ± 0.18 | 2.10 ± 0.13 | 2.01 ± 0.58 | 5.00 ± 2.53 |
| Stomach | 2.47 ± 0.70 | 1.35 ± 0.15 | 2.01 ± 0.34 | 1.31 ± 0.96 | 1.96 ± 0.16 | 2.05 ± 1.11 |
| S. intestine | 2.58 ± 0.39 | 2.12 ± 0.19 | 2.83 ± 0.27 | 2.85 ± 0.31 | 2.34 ± 0.20 | 3.15 ± 0.54 |
| L. intestine | 0.93 ± 0.21 | 0.92 ± 0.21 | 1.19 ± 0.08 | 1.47 ± 0.14 | 1.61 ± 0.26 | 2.34 ± 0.34 |
| Kidneys | 18.8 ± 1.96 | 23.4 ± 2.15 | 36.1 ± 6.63 | 59.1 ± 3.63 | 42.6 ± 10.9 | 64.8 ± 14.3 |
| Muscle | 0.96 ± 0.10 | 0.93 ± 0.05 | 1.18 ± 0.04 | 1.23 ± 0.17 | 0.81 ± 0.12 | 3.71 ± 2.52 |
| Bone | 2.43 ± 0.39 | 1.82 ± 0.19 | 1.99 ± 0.30 | 1.94 ± 0.45 | 2.70 ± 0.15 | 11.2 ± 6.44 |
| Skin | 1.97 ± 0.11 | 1.93 ± 0.11 | 2.87 ± 0.13 | 2.85 ± 0.22 | 1.95 ± 0.34 | 6.39 ± 2.36 |
| Brain | 0.70 ± 0.12 | 0.49 ± 0.08 | 0.41 ± 0.03 | 0.34 ± 0.06 | 0.32 ± 0.05 | 1.39 ± 0.35 |
| Tumor | 3.56 ± 0.92 | 4.20 ± 1.02 | 6.52 ± 0.92 | 8.16 ± 0.53 | 6.66 ± 0.91 | 15.6 ± 3.49 |
| Tumor-to-tissue ratios (rel u.) | | | | | | |
| Tumor/Blood | 0.10 ± 0.03 | 0.17 ± 0.04 | 0.30 ± 0.05 | 0.51 ± 0.04 | 0.48 ± 0.07 | 1.6 ± 0.5 |
| Tumor/Liver | 0.22 ± 0.06 | 0.31 ± 0.08 | 0.42 ± 0.07 | 0.6 ± 0.6 | 0.36 ± 0.06 | 1.1 ± 0.3 |
| Tumor/S.I. | 1.4 ± 0.4 | 2.0 ± 0.5 | 2.3 ± 0.4 | 2.9 ± 0.4 | 2.8 ± 0.5 | 4.9 ± 1.4 |
| Tumor/L.I. | 3.8 ± 1.3 | 4.6 ± 1.5 | 5.5 ± 0.9 | 5.5 ± 0.6 | 4.1 ± 0.9 | 6.1 ± 1.6 |
| Tumor/Kidney | 0.19 ± 0.05 | 0.18 ± 0.05 | 0.18 ± 0.04 | 0.138 ± 0.012 | 0.16 ± 0.05 | 0.24 ± 0.08 |
| Tumor/Muscle | 3.7 ± 1.0 | 4.5 ± 1.1 | 5.5 ± 0.8 | 6.6 ± 1.0 | 8 ± 2 | 4.2 ± 3.0 |
| Tumor/Bone | 1.5 ± 0.4 | 2.3 ± 0.6 | 3.3 ± 0.7 | 4.2 ± 1.0 | 2.5 ± 0.4 | 1.4 ± 0.9 |

Figure 47

| Tissue | 0.5 h (n=4) | 1 h (n=4) | 2 h (n=3) | 4 h (n=4) | 4 h + glucose (n=3) | 6 h (n=5) |
|---|---|---|---|---|---|---|
| Blood | 3.89 ± 2.41 | 1.92 ± 1.54 | 3.21 ± 2.40 | 0.71 ± 0.37 | 3.12 ± 0.52 | 0.12 ± 0.09 |
| Heart | 0.36 ± 0.05 | 0.24 ± 0.04 | 0.33 ± 0.31 | 0.08 ± 0.02 | 0.13 ± 0.01 | 0.063 ± 0.005 |
| Lungs | 1.83 ± 0.54 | 1.40 ± 0.32 | 1.05 ± 0.44 | 0.40 ± 0.09 | 0.08 ± 0.04 | 0.17 ± 0.03 |
| Liver | 4.97 ± 0.36 | 3.55 ± 0.18 | 4.26 ± 2.00 | 2.15 ± 0.35 | 0.18 ± 0.03 | 2.17 ± 0.22 |
| Spleen | 0.19 ± 0.02 | 0.15 ± 0.01 | 0.18 ± 0.12 | 0.12 ± 0.01 | 1.04 ± 0.12 | 0.11 ± 0.02 |
| Pancreas | 0.17 ± 0.03 | 0.14 ± 0.03 | 0.14 ± 0.08 | 0.07 ± 0.01 | 0.61 ± 0.05 | 0.05 ± 0.01 |
| Stomach | 0.40 ± 0.10 | 0.22 ± 0.01 | 0.25 ± 0.12 | 0.13 ± 0.01 | 52.4 ± 9.57 | 0.17 ± 0.02 |
| S. intestine | 1.63 ± 0.34 | 1.34 ± 0.26 | 1.96 ± 1.54 | 0.96 ± 0.08 | 0.04 ± 0.01 | 0.67 ± 0.08 |
| L. intestine | 0.70 ± 0.05 | 0.31 ± 0.07 | 0.69 ± 0.36 | 0.59 ± 0.06 | 0.02 ± 0.00 | 0.53 ± 0.03 |
| Kidneys | 23.8 ± 4.50 | 40.1 ± 4.20 | 42.2 ± 21.6 | 62.9 ± 3.68 | 0.30 ± 0.04 | 70.5 ± 5.72 |
| Muscle | 0.13 ± 0.03 | 0.06 ± 0.01 | 0.07 ± 0.03 | 0.03 ± 0.01 | 0.03 ± 0.00 | 0.043 ± 0.003 |
| Bone | 0.04 ± 0.02 | 0.02 ± 0.01 | 0.03 ± 0.02 | 0.02 ± 0.01 | 0.40 ± 0.11 | 0.05 ± 0.02 |
| Skin | 0.34 ± 0.06 | 0.35 ± 0.05 | 0.38 ± 0.16 | 0.27 ± 0.03 | 0.81 ± 0.23 | 0.15 ± 0.02 |
| Brain | 0.10 ± 0.03 | 0.04 ± 0.01 | 0.09 ± 0.11 | 0.020 ± 0.003 | 1.04 ± 0.91 | 0.012 ± 0.004 |
| Tumor | 0.21 ± 0.05 | 0.30 ± 0.09 | 0.27 ± 0.09 | 0.53 ± 0.11 | 0.11 ± 0.03 | 0.31 ± 0.10 |

| Tissue | 0.5 h (n=5) | 1 h (n=5) | 2 h (n=5) | 4 h (n=10) | 4 h + glucose (n=4) | 6 h (n=5) | 8 h (n=5) |
|---|---|---|---|---|---|---|---|
| Blood | 5.30 ± 3.19 | 9.36 ± 8.73 | 1.96 ± 1.06 | 5.81 ± 2.46 | 3.71 ± 1.51 | 2.46 ± 0.99 | 4.71 ± 2.12 |
| Heart | 1.26 ± 0.16 | 1.08 ± 0.23 | 0.82 ± 0.16 | 0.63 ± 0.12 | 0.66 ± 0.26 | 0.54 ± 0.08 | 0.55 ± 0.06 |
| Lungs | 11.2 ± 0.83 | 8.53 ± 2.35 | 1.02 ± 0.94 | 2.27 ± 1.04 | 3.98 ± 1.98 | 3.55 ± 0.64 | 1.06 ± 0.18 |
| Liver | 11.7 ± 1.93 | 12.1 ± 0.61 | 9.57 ± 1.32 | 8.00 ± 0.96 | 6.79 ± 2.07 | 7.91 ± 0.46 | 7.14 ± 0.67 |
| Spleen | 0.38 ± 0.03 | 0.49 ± 0.09 | 0.41 ± 0.02 | 0.45 ± 3.12 | 0.31 ± 0.09 | 0.36 ± 0.03 | 0.51 ± 0.05 |
| Pancreas | 0.70 ± 0.11 | 0.49 ± 0.18 | 0.41 ± 0.05 | 0.38 ± 0.08 | 0.26 ± 0.05 | 0.32 ± 0.02 | 0.26 ± 0.03 |
| Stomach | 0.91 ± 0.25 | 0.55 ± 0.08 | 0.53 ± 0.08 | 0.52 ± 3.06 | 0.38 ± 0.13 | 0.49 ± 0.09 | 0.44 ± 0.06 |
| S. intestine | 3.33 ± 0.44 | 3.91 ± 0.71 | 3.47 ± 0.69 | 2.09 ± 0.30 | 2.29 ± 0.66 | 1.90 ± 0.12 | 2.28 ± 0.12 |
| L. intestine | 1.57 ± 0.17 | 1.48 ± 0.08 | 1.50 ± 0.23 | 1.67 ± 3.61 | 1.54 ± 0.58 | 1.48 ± 0.31 | 1.10 ± 0.11 |
| Kidneys | 6.69 ± 0.67 | 8.56 ± 0.50 | 11.2 ± 0.61 | 10.1 ± 1.35 | 12.2 ± 2.88 | 10.6 ± 0.51 | 15.3 ± 1.74 |
| Muscle | 0.13 ± 0.05 | 0.16 ± 0.03 | 0.11 ± 0.08 | 0.16 ± 3.04 | 0.09 ± 0.03 | 0.15 ± 0.02 | 0.19 ± 0.07 |
| Bone | 0.14 ± 0.04 | 0.06 ± 0.03 | 0.12 ± 0.08 | 0.08 ± 3.06 | 0.07 ± 0.01 | 0.11 ± 0.01 | 0.11 ± 0.00 |
| Skin | 0.28 ± 0.09 | 0.42 ± 0.08 | 0.61 ± 0.16 | 0.29 ± 3.16 | 0.37 ± 0.12 | 0.36 ± 0.11 | 0.31 ± 0.07 |
| Brain | 0.34 ± 0.05 | 0.22 ± 0.02 | 0.21 ± 0.04 | 0.17 ± 3.05 | 0.12 ± 0.03 | 0.17 ± 0.03 | 0.19 ± 0.05 |
| Tumor | 0.29 ± 0.09 | 0.33 ± 0.08 | 0.47 ± 0.11 | 0.79 ± 3.22 | 0.36 ± 0.20 | 1.13 ± 0.21 | 1.97 ± 0.99 |

| Tissue | 1 h (n=8) | | 4 h (n=8) | | 12 h (n=8) | | 24 h (n=8) | | 48 h (n=8) | |
|---|---|---|---|---|---|---|---|---|---|---|
| Blood | 18.3 | ± 3.05 | 10.1 | ± 3.52 | 3.98 | ± 1.12 | 2.30 | ± 0.82 | 0.55 | ± 0.21 |
| Heart | 0.80 | ± 0.12 | 0.81 | ± 0.28 | 0.66 | ± 0.10 | 0.49 | ± 0.08 | 0.41 | ± 0.04 |
| Lungs | 2.09 | ± 0.34 | 1.68 | ± 0.36 | 1.29 | ± 0.44 | 1.20 | ± 0.18 | 0.90 | ± 0.10 |
| Liver | 10.1 | ± 1.67 | 11.6 | ± 0.97 | 14.0 | ± 2.35 | 16.7 | ± 3.53 | 12.9 | ± 1.90 |
| Spleen | 0.33 | ± 0.05 | 0.33 | ± 0.04 | 0.26 | ± 0.04 | 0.29 | ± 0.07 | 0.22 | ± 0.03 |
| Pancreas | 0.37 | ± 0.05 | 0.30 | ± 0.03 | 0.27 | ± 0.02 | 0.31 | ± 0.04 | 0.25 | ± 0.05 |
| Stomach | 0.56 | ± 0.12 | 0.72 | ± 0.06 | 0.93 | ± 0.17 | 1.09 | ± 0.29 | 1.12 | ± 0.26 |
| S. intestine | 3.20 | ± 1.01 | 3.69 | ± 0.28 | 4.98 | ± 0.75 | 6.06 | ± 0.90 | 4.52 | ± 0.67 |
| L. intestine | 1.38 | ± 0.24 | 2.43 | ± 0.66 | 3.96 | ± 0.31 | 7.69 | ± 1.23 | 7.83 | ± 1.28 |
| Kidneys | 7.74 | ± 2.26 | 8.61 | ± 1.42 | 7.29 | ± 0.98 | 5.43 | ± 0.62 | 4.05 | ± 0.48 |
| Muscle | 0.16 | ± 0.03 | 0.15 | ± 0.02 | 0.13 | ± 0.04 | 0.12 | ± 0.03 | 0.10 | ± 0.03 |
| Bone | 0.07 | ± 0.02 | 0.10 | ± 0.07 | 0.10 | ± 0.01 | 0.10 | ± 0.04 | 0.08 | ± 0.01 |
| Skin | 0.68 | ± 0.37 | 0.85 | ± 0.28 | 0.63 | ± 0.20 | 0.66 | ± 0.22 | 0.42 | ± 0.11 |
| Tumor | 0.78 | ± 0.30 | 1.04 | ± 0.49 | 1.55 | ± 0.71 | 2.34 | ± 0.86 | 2.42 | ± 0.78 |

Figure 58

| Tissue | 1 h (n=3) | 4 h (n=3) | 12 h (n=3) | 24 h (n=3) | 48 h (n=3) |
|---|---|---|---|---|---|
| Blood | 22.0 ± 2.88 | 15.6 ± 2.21 | 7.51 ± 1.77 | 3.12 ± 0.77 | 2.48 ± 0.24 |
| Heart | 6.50 ± 0.80 | 5.71 ± 1.21 | 3.79 ± 0.82 | 3.32 ± 0.46 | 3.44 ± 0.26 |
| Lungs | 10.7 ± 1.66 | 8.63 ± 1.01 | 5.85 ± 0.89 | 5.69 ± 0.51 | 4.37 ± 0.57 |
| Liver | 8.38 ± 1.34 | 9.74 ± 1.10 | 9.66 ± 1.35 | 12.4 ± 2.39 | 11.1 ± 1.84 |
| Spleen | 3.42 ± 0.25 | 3.17 ± 0.27 | 2.96 ± 0.54 | 3.39 ± 0.25 | 3.06 ± 0.31 |
| Pancreas | 2.38 ± 0.40 | 2.02 ± 0.19 | 1.68 ± 0.31 | 1.74 ± 0.17 | 1.62 ± 0.21 |
| Stomach | 1.46 ± 0.44 | 1.41 ± 0.50 | 1.30 ± 0.39 | 1.56 ± 0.41 | 2.18 ± 0.35 |
| S. intestine | 2.02 ± 0.55 | 2.34 ± 0.38 | 2.22 ± 0.29 | 2.94 ± 0.36 | 3.08 ± 0.17 |
| L. intestine | 0.72 ± 0.17 | 1.34 ± 0.48 | 1.80 ± 0.23 | 3.13 ± 0.48 | 3.26 ± 0.18 |
| Kidneys | 16.1 ± 4.73 | 17.5 ± 2.72 | 13.9 ± 1.20 | 10.9 ± 1.11 | 8.88 ± 0.68 |
| Muscle | 1.13 ± 0.15 | 1.21 ± 0.11 | 1.05 ± 0.20 | 0.90 ± 0.09 | 0.81 ± 0.15 |
| Bone | 1.86 ± 0.31 | 1.71 ± 0.26 | 1.54 ± 0.26 | 1.61 ± 0.16 | 1.41 ± 0.15 |
| Skin | 2.80 ± 0.73 | 4.39 ± 0.84 | 3.67 ± 0.69 | 3.37 ± 0.37 | 2.60 ± 0.42 |
| Tumor | 3.16 ± 0.49 | 4.61 ± 0.82 | 5.58 ± 1.12 | 6.60 ± 0.76 | 6.32 ± 0.81 |
| Tumor-to-tissue ratios (rel. u.) | | | | | |
| Tumor/Blood | 0.14 ± 0.03 | 0.29 ± 0.07 | 0.7 ± 0.2 | 1.3 ± 0.2 | 2.6 ± 0.4 |
| Tumor/Liver | 0.38 ± 0.08 | 0.47 ± 0.10 | 0.58 ± 0.14 | 0.53 ± 0.12 | 0.57 ± 0.12 |
| Tumor/S.I. | 1.6 ± 0.5 | 2.0 ± 0.5 | 2.5 ± 0.6 | 2.2 ± 0.4 | 2.1 ± 0.3 |
| Tumor/L.I. | 4.4 ± 1.2 | 3.4 ± 1.4 | 3.1 ± 0.7 | 2.1 ± 0.4 | 1.9 ± 0.3 |
| Tumor/Kidney | 0.20 ± 0.07 | 0.26 ± 0.06 | 0.40 ± 0.09 | 0.61 ± 0.09 | 0.71 ± 0.11 |
| Tumor/Muscle | 2.8 ± 0.6 | 3.8 ± 0.8 | 5.3 ± 1.5 | 7.3 ± 1.1 | 7.8 ± 1.8 |
| Tumor/Bone | 1.7 ± 0.4 | 2.7 ± 0.6 | 3.6 ± 0.9 | 4.1 ± 0.6 | 4.5 ± 0.7 |

Figure 59

| Tissue | 1 h (n=8) | 4 h (n=8) | 12 h (n=8) | 24 h (n=8) | 48 h (n=11) |
|---|---|---|---|---|---|
| Blood | 12.3 ± 5.56 | 11.1 ± 3.10 | 3.77 ± 1.21 | 4.29 ± 1.48 | 1.42 ± 0.55 |
| Heart | 0.94 ± 0.27 | 0.84 ± 0.29 | 0.56 ± 0.12 | 0.54 ± 0.11 | 0.38 ± 0.06 |
| Lungs | 2.50 ± 0.60 | 1.94 ± 0.49 | 1.33 ± 0.32 | 1.25 ± 0.40 | 0.71 ± 0.12 |
| Liver | 10.6 ± 1.85 | 10.1 ± 2.02 | 13.0 ± 2.07 | 14.5 ± 2.77 | 10.2 ± 3.13 |
| Spleen | 0.34 ± 0.07 | 0.26 ± 0.04 | 0.30 ± 0.06 | 0.35 ± 0.09 | 0.25 ± 0.09 |
| Pancreas | 0.42 ± 0.05 | 0.32 ± 0.06 | 0.25 ± 0.04 | 0.33 ± 0.05 | 0.26 ± 0.05 |
| Stomach | 0.62 ± 0.21 | 0.77 ± 0.13 | 0.86 ± 0.30 | 1.34 ± 0.28 | 0.95 ± 0.26 |
| S. intestine | 3.29 ± 0.54 | 3.99 ± 1.00 | 4.15 ± 0.64 | 6.92 ± 1.91 | 4.17 ± 0.55 |
| L. intestine | 1.37 ± 0.30 | 1.94 ± 0.69 | 3.91 ± 0.71 | 7.40 ± 2.22 | 5.95 ± 0.98 |
| Kidneys | 7.07 ± 2.14 | 8.46 ± 2.83 | 7.11 ± 0.05 | 5.94 ± 1.57 | 3.44 ± 0.62 |
| Muscle | 0.16 ± 0.04 | 0.13 ± 0.03 | 0.15 ± 0.04 | 0.13 ± 0.05 | 0.08 ± 0.02 |
| Bone | 0.07 ± 0.03 | 0.08 ± 0.03 | 0.09 ± 0.02 | 0.08 ± 0.02 | 0.04 ± 0.03 |
| Skin | 0.49 ± 0.17 | 0.78 ± 0.34 | 0.58 ± 0.10 | 0.85 ± 0.31 | 0.41 ± 0.22 |
| Tumor | 0.43 ± 0.48 | 1.13 ± 0.99 | 0.50 ± 0.48 | 2.24 ± 1.05 | 1.53 ± 1.67 |

Figure 60

| Tissue | 1 h (n=8) | 4 h (n=8) | 12 h (n=8) | 24 h (n=8) | 48 h (n=11) |
|---|---|---|---|---|---|
| Blood | 20.8 ± 5.81 | 15.3 ± 3.85 | 6.60 ± 1.47 | 7.21 ± 2.52 | 2.56 ± 0.78 |
| Heart | 6.30 ± 1.68 | 5.49 ± 1.25 | 3.09 ± 0.56 | 4.71 ± 2.50 | 2.94 ± 0.48 |
| Lungs | 11.8 ± 3.01 | 9.27 ± 2.16 | 5.57 ± 0.76 | 7.45 ± 5.42 | 4.17 ± 0.78 |
| Liver | 8.49 ± 2.99 | 8.94 ± 2.51 | 8.22 ± 1.01 | 13.4 ± 3.93 | 8.78 ± 1.16 |
| Spleen | 3.63 ± 1.58 | 2.99 ± 0.79 | 2.65 ± 0.23 | 4.17 ± 1.31 | 3.39 ± 0.87 |
| Pancreas | 2.30 ± 0.55 | 1.86 ± 0.34 | 1.43 ± 0.13 | 1.89 ± 0.36 | 1.54 ± 0.23 |
| Stomach | 1.70 ± 0.81 | 1.32 ± 0.44 | 0.96 ± 0.36 | 1.94 ± 0.64 | 1.61 ± 0.50 |
| S. intestine | 2.07 ± 0.42 | 2.11 ± 0.53 | 1.99 ± 0.37 | 3.08 ± 0.81 | 2.40 ± 0.46 |
| L. intestine | 0.72 ± 0.17 | 0.99 ± 0.38 | 2.11 ± 0.58 | 3.65 ± 0.67 | 3.13 ± 0.66 |
| Kidneys | 14.9 ± 6.43 | 16.7 ± 6.94 | 11.6 ± 0.66 | 12.9 ± 5.07 | 7.49 ± 1.47 |
| Muscle | 1.00 ± 0.31 | 1.07 ± 0.21 | 0.87 ± 0.14 | 1.14 ± 0.49 | 0.74 ± 0.19 |
| Bone | 1.87 ± 1.16 | 1.51 ± 0.33 | 1.32 ± 0.14 | 1.67 ± 0.46 | 1.12 ± 0.27 |
| Skin | 2.33 ± 0.59 | 3.72 ± 0.91 | 3.36 ± 0.52 | 4.32 ± 0.87 | 2.42 ± 0.38 |
| Tumor | 4.09 ± 1.43 | 6.32 ± 2.15 | 5.14 ± 2.65 | 9.47 ± 3.32 | 6.12 ± 1.92 |
| Tumor-to-tissue ratios (rel. u.) | | | | | |
| Tumor/Blood | 0.20 ± 0.09 | 0.41 ± 0.18 | 0.78 ± 0.44 | 1.31 ± 0.65 | 2.40 ± 1.05 |
| Tumor/Liver | 0.48 ± 0.24 | 0.71 ± 0.31 | 0.62 ± 0.33 | 0.71 ± 0.32 | 0.70 ± 0.24 |
| Tumor/S.I. | 1.98 ± 0.80 | 3.00 ± 1.27 | 2.59 ± 1.42 | 3.08 ± 1.35 | 2.55 ± 0.94 |
| Tumor/L.I. | 5.65 ± 2.36 | 6.38 ± 3.27 | 2.43 ± 1.42 | 2.60 ± 1.03 | 1.96 ± 0.74 |
| Tumor/Kidney | 0.28 ± 0.15 | 0.38 ± 0.20 | 0.44 ± 0.23 | 0.74 ± 0.39 | 0.82 ± 0.30 |
| Tumor/Muscle | 4.08 ± 1.91 | 5.89 ± 2.30 | 5.92 ± 3.21 | 8.32 ± 4.60 | 8.28 ± 3.33 |
| Tumor/Bone | 2.19 ± 1.56 | 4.19 ± 1.70 | 3.90 ± 2.05 | 5.68 ± 2.52 | 5.48 ± 2.17 |

Figure 61

| Tissue | 1 h (n=4) | 4 h (n=3) | 12 h (n=4) | 14.5 h (n=3) | 24 h (n=4) |
|---|---|---|---|---|---|
| Blood | 18.6 ± 1.60 | 6.70 ± 1.64 | 3.95 ± 0.61 | 1.05 ± 0.36 | 1.37 ± 0.67 |
| Heart | 1.28 ± 0.67 | 0.76 ± 0.07 | 0.58 ± 0.08 | 0.63 ± 0.13 | 0.45 ± 0.03 |
| Lungs | 2.55 ± 0.25 | 2.26 ± 0.43 | 2.58 ± 0.53 | 1.93 ± 0.03 | 1.09 ± 0.17 |
| Liver | 9.24 ± 1.45 | 9.54 ± 0.50 | 11.1 ± 1.04 | 9.77 ± 0.63 | 11.3 ± 0.74 |
| Spleen | 0.37 ± 0.09 | 0.32 ± 0.04 | 0.34 ± 0.02 | 0.37 ± 0.09 | 0.35 ± 0.05 |
| Stomach | 0.77 ± 0.20 | 0.76 ± 0.13 | 1.36 ± 0.95 | 0.78 ± 0.17 | 1.27 ± 0.17 |
| S. intestine | 4.38 ± 0.94 | 3.94 ± 0.90 | 5.64 ± 0.68 | 4.52 ± 0.66 | 5.16 ± 0.36 |
| L. intestine | 1.35 ± 0.33 | 2.72 ± 0.42 | 3.44 ± 0.38 | 3.89 ± 0.25 | 6.11 ± 0.27 |
| Kidneys | 4.54 ± 0.78 | 8.92 ± 0.99 | 8.08 ± 0.88 | 6.61 ± 1.23 | 4.82 ± 0.43 |
| Muscle | 0.10 ± 0.03 | 0.15 ± 0.05 | 0.15 ± 0.03 | 0.18 ± 0.07 | 0.13 ± 0.05 |
| Bone | 0.07 ± 0.01 | 0.17 ± 0.02 | 0.13 ± 0.04 | 0.35 ± 0.05 | 0.21 ± 0.08 |
| Skin (ears) | 0.30 ± 0.19 | 0.33 ± 0.08 | 0.28 ± 0.10 | 0.14 ± 0.01 | 0.36 ± 0.10 |
| Skin (shoulder) | 0.26 ± 0.09 | 0.22 ± 0.03 | 0.26 ± 0.10 | 0.21 ± 0.04 | 0.15 ± 0.03 |
| Tumor | 2.15 ± 1.37 | 1.45 ± 2.02 | 3.58 ± 2.10 | 1.27 ± 1.95 | 1.61 ± 0.93 |

Figure 62

| Tissue | 1 h (n=4) | 4 h (n=3) | 12 h (n=4) | 14.5 h (n=3) | 24 h (n=4) |
|---|---|---|---|---|---|
| Blood | 28.4 ± 0.74 | 19.5 ± 1.06 | 11.6 ± 1.52 | 12.0 ± 2.14 | 6.37 ± 0.39 |
| Heart | 8.24 ± 0.28 | 6.86 ± 0.52 | 4.55 ± 0.64 | 4.75 ± 0.72 | 4.32 ± 0.41 |
| Lungs | 12.6 ± 1.32 | 11.8 ± 3.38 | 9.94 ± 1.74 | 8.97 ± 1.30 | 5.81 ± 0.59 |
| Liver | 11.1 ± 1.47 | 10.3 ± 0.38 | 8.97 ± 0.68 | 10.1 ± 1.35 | 11.7 ± 1.42 |
| Spleen | 4.24 ± 0.34 | 4.33 ± 0.10 | 4.22 ± 0.41 | 4.54 ± 0.63 | 4.96 ± 0.29 |
| Stomach | 2.53 ± 0.45 | 1.55 ± 0.07 | 1.55 ± 0.73 | 2.00 ± 0.37 | 3.25 ± 0.54 |
| S. intestine | 3.41 ± 0.30 | 3.14 ± 0.30 | 3.43 ± 0.30 | 4.00 ± 0.29 | 5.44 ± 0.87 |
| L. intestine | 1.94 ± 0.40 | 2.98 ± 0.13 | 3.27 ± 0.37 | 4.35 ± 0.28 | 7.24 ± 0.51 |
| Kidneys | 13.5 ± 2.19 | 28.5 ± 5.17 | 26.0 ± 2.38 | 21.0 ± 1.61 | 16.2 ± 1.31 |
| Muscle | 0.75 ± 0.12 | 1.48 ± 0.31 | 1.23 ± 0.13 | 1.31 ± 0.30 | 1.28 ± 0.28 |
| Bone | 1.86 ± 0.49 | 2.53 ± 0.17 | 2.03 ± 0.39 | 2.66 ± 0.39 | 2.28 ± 0.19 |
| Skin (ears) | 1.80 ± 0.50 | 3.90 ± 0.71 | 3.35 ± 0.30 | 3.55 ± 0.30 | 3.73 ± 0.56 |
| Skin (shoulder) | 1.98 ± 0.43 | 5.68 ± 0.65 | 3.93 ± 0.73 | 5.49 ± 0.41 | 5.09 ± 0.88 |
| Tumor | 5.42 ± 0.76 | 9.29 ± 0.43 | 11.6 ± 0.51 | 11.2 ± 0.94 | 11.4 ± 2.92 |
| Tumor-to-tissue ratios (rel. u.) | | | | | |
| Tumor/Blood | 0.19 ± 0.03 | 0.48 ± 0.03 | 1.00 ± 0.14 | 0.94 ± 0.19 | 1.8 ± 0.5 |
| Tumor/Liver | 0.49 ± 0.09 | 0.90 ± 0.05 | 1.29 ± 0.11 | 1.11 ± 0.17 | 1.0 ± 0.3 |
| Tumor/S.I. | 1.6 ± 0.3 | 3.0 ± 0.3 | 3.4 ± 0.3 | 2.8 ± 0.3 | 2.1 ± 0.6 |
| Tumor/L.I. | 2.8 ± 0.7 | 3.1 ± 0.2 | 3.5 ± 0.4 | 2.6 ± 0.3 | 1.6 ± 0.4 |
| Tumor/Kidney | 0.40 ± 0.09 | 0.33 ± 0.06 | 0.45 ± 0.05 | 0.53 ± 0.06 | 0.70 ± 0.19 |
| Tumor/Muscle | 7.2 ± 1.5 | 6.3 ± 1.4 | 9.4 ± 1.1 | 9 ± 2 | 9 ± 3 |
| Tumor/Bone | 2.9 ± 0.9 | 3.7 ± 0.3 | 5.7 ± 1.1 | 4.2 ± 0.7 | 5.0 ± 1.3 |

Figure 63

| Tissue | 1 h (n=3) | 4 h (n=4) | 6 h (n=4) | 8 h (n=4) |
|---|---|---|---|---|
| Blood | 10.7 ± 0.84 | 6.88 ± 1.21 | 6.37 ± 3.17 | 4.62 ± 2.24 |
| Heart | 2.25 ± 0.22 | 0.61 ± 0.07 | 0.82 ± 0.19 | 0.68 ± 0.09 |
| Lungs | 2.25 ± 0.84 | 2.06 ± 0.77 | 0.77 ± 0.12 | 0.84 ± 0.17 |
| Liver | 9.87 ± 0.55 | 7.09 ± 1.13 | 6.97 ± 1.87 | 6.02 ± 0.51 |
| Spleen | 0.24 ± 0.03 | 0.29 ± 0.06 | 0.21 ± 0.05 | 0.35 ± 0.03 |
| Pancreas | 0.37 ± 0.06 | 0.27 ± 0.03 | 0.19 ± 0.02 | 0.30 ± 0.09 |
| Stomach | 0.46 ± 0.07 | 0.41 ± 0.09 | 0.35 ± 0.04 | 0.42 ± 0.05 |
| S. intestine | 2.66 ± 0.10 | 2.47 ± 0.58 | 1.73 ± 0.29 | 2.20 ± 0.22 |
| L. intestine | 1.16 ± 0.06 | 1.32 ± 0.27 | 1.15 ± 0.24 | 1.19 ± 0.18 |
| Kidneys | 5.82 ± 0.64 | 10.6 ± 1.97 | 12.3 ± 1.50 | 13.7 ± 0.50 |
| Muscle | 0.10 ± 0.03 | 0.17 ± 0.02 | 0.12 ± 0.03 | 0.15 ± 0.01 |
| Bone | 0.05 ± 0.01 | 0.06 ± 0.03 | 0.10 ± 0.02 | 0.09 ± 0.01 |
| Skin | 0.59 ± 0.22 | 1.10 ± 0.26 | 0.29 ± 0.09 | 0.42 ± 0.09 |
| Tumor | 0.96 ± 0.45 | 1.04 ± 0.55 | 1.11 ± 0.53 | 1.79 ± 0.98 |

Figure 64

| Tissue | 1 h (n=3) | | 4 h (n=4) | | 6 h (n=4) | | 8 h (n=4) | |
|---|---|---|---|---|---|---|---|---|
| Blood | 16.2 | ± 2.29 | 11.6 | ± 1.83 | 8.66 | ± 0.91 | 9.08 | ± 0.70 |
| Heart | 5.41 | ± 0.99 | 4.04 | ± 0.28 | 3.79 | ± 1.14 | 4.11 | ± 0.14 |
| Lungs | 9.39 | ± 3.35 | 7.69 | ± 1.72 | 3.93 | ± 0.86 | 4.27 | ± 0.45 |
| Liver | 6.03 | ± 0.68 | 5.12 | ± 0.35 | 4.16 | ± 0.40 | 4.19 | ± 0.45 |
| Spleen | 2.23 | ± 0.36 | 2.04 | ± 0.11 | 1.83 | ± 0.20 | 2.47 | ± 0.11 |
| Pancreas | 1.78 | ± 0.31 | 1.56 | ± 0.20 | 1.13 | ± 0.15 | 1.37 | ± 0.30 |
| Stomach | 0.65 | ± 0.02 | 0.53 | ± 0.03 | 0.63 | ± 0.10 | 0.44 | ± 0.11 |
| S. intestine | 1.28 | ± 0.15 | 1.22 | ± 0.08 | 0.86 | ± 0.14 | 1.38 | ± 0.09 |
| L. intestine | 0.58 | ± 0.06 | 0.58 | ± 0.02 | 0.72 | ± 0.19 | 0.74 | ± 0.13 |
| Kidneys | 10.7 | ± 1.10 | 18.2 | ± 3.15 | 19.2 | ± 4.25 | 25.8 | ± 2.51 |
| Muscle | 0.68 | ± 0.13 | 1.03 | ± 0.11 | 0.90 | ± 0.28 | 0.91 | ± 0.23 |
| Bone | 1.21 | ± 0.29 | 1.24 | ± 0.25 | 1.31 | ± 0.09 | 1.28 | ± 0.26 |
| Skin | 1.96 | ± 0.29 | 3.73 | ± 0.08 | 2.32 | ± 0.46 | 2.53 | ± 0.15 |
| Tumor | 3.05 | ± 0.36 | 4.02 | ± 0.35 | 4.19 | ± 0.55 | 3.99 | ± 0.27 |
| Tumor-to-tissue ratios (rel. u.) | | | | | | | | |
| Tumor/Blood | 0.19 | ± 0.03 | 0.35 | ± 0.06 | 0.48 | ± 0.08 | 0.44 | ± 0.04 |
| Tumor/Liver | 0.51 | ± 0.08 | 0.79 | ± 0.09 | 1.01 | ± 0.16 | 0.95 | ± 0.12 |
| Tumor/S.I. | 2.4 | ± 0.4 | 3.3 | ± 0.4 | 4.8 | ± 1.0 | 2.9 | ± 0.3 |
| Tumor/L.I. | 5.2 | ± 0.8 | 7.0 | ± 0.7 | 5.8 | ± 1.7 | 5.4 | ± 1.0 |
| Tumor/Kidney | 0.29 | ± 0.04 | 0.22 | ± 0.04 | 0.22 | ± 0.06 | 0.15 | ± 0.02 |
| Tumor/Muscle | 4.5 | ± 1.0 | 3.9 | ± 0.5 | 4.7 | ± 1.6 | 4.4 | ± 1.1 |
| Tumor/Bone | 2.5 | ± 0.7 | 3.2 | ± 0.7 | 3.2 | ± 0.5 | 3.1 | ± 0.7 |

Figure 65

| Tissue | 1 h (n=4) | | 4 h (n=4) | | 6 h (n=4) | | 8 h (n=4) | |
|---|---|---|---|---|---|---|---|---|
| Blood | 17.7 | ± 4.60 | 11.4 | ± 0.78 | 5.43 | ± 1.31 | 5.49 | ± 1.77 |
| Heart | 0.66 | ± 0.12 | 0.62 | ± 0.10 | 0.73 | ± 0.16 | 0.53 | ± 0.08 |
| Lungs | 1.98 | ± 0.24 | 1.15 | ± 0.14 | 1.33 | ± 0.30 | 0.83 | ± 0.08 |
| Liver | 7.33 | ± 1.08 | 5.00 | ± 0.70 | 5.84 | ± 0.23 | 5.42 | ± 0.28 |
| Spleen | 0.30 | ± 0.08 | 0.25 | ± 0.03 | 0.25 | ± 0.02 | 0.27 | ± 0.08 |
| Pancreas | 0.33 | ± 0.09 | 0.25 | ± 0.05 | 0.23 | ± 0.03 | 0.20 | ± 0.04 |
| Stomach | 0.47 | ± 0.08 | 0.53 | ± 0.32 | 0.47 | ± 0.03 | 0.43 | ± 0.09 |
| S. intestine | 2.16 | ± 0.31 | 1.98 | ± 0.36 | 1.72 | ± 0.08 | 2.57 | ± 0.29 |
| L. intestine | 0.97 | ± 0.23 | 1.08 | ± 0.18 | 1.19 | ± 0.09 | 1.38 | ± 0.36 |
| Kidneys | 5.61 | ± 0.62 | 8.87 | ± 1.78 | 11.0 | ± 1.50 | 13.9 | ± 0.79 |
| Muscle | 0.14 | ± 0.03 | 0.16 | ± 0.03 | 0.16 | ± 0.05 | 0.13 | ± 0.02 |
| Bone | 0.05 | ± 0.02 | 0.05 | ± 0.03 | 0.08 | ± 0.01 | 0.08 | ± 0.03 |
| Skin | 0.71 | ± 0.27 | 0.89 | ± 0.17 | 0.42 | ± 0.08 | 0.37 | ± 0.05 |
| Tumor | 0.39 | ± 0.26 | 0.78 | ± 0.47 | 3.73 | ± 3.95 | 1.81 | ± 2.24 |

Figure 66

| Tissue | 1 h (n=4) | 4 h (n=4) | 6 h (n=4) | 8 h (n=4) |
|---|---|---|---|---|
| Blood | 20.0 ± 2.48 | 12.4 ± 1.74 | 12.1 ± 2.16 | 10.2 ± 2.15 |
| Heart | 5.28 ± 0.92 | 4.41 ± 1.11 | 4.39 ± 0.69 | 3.69 ± 0.28 |
| Lungs | 9.19 ± 1.18 | 5.82 ± 0.49 | 6.48 ± 1.05 | 4.42 ± 0.51 |
| Liver | 5.87 ± 0.39 | 4.62 ± 0.51 | 4.56 ± 0.43 | 4.33 ± 0.49 |
| Spleen | 2.79 ± 0.52 | 1.96 ± 0.14 | 1.93 ± 0.25 | 2.60 ± 0.27 |
| Pancreas | 2.01 ± 0.30 | 1.37 ± 0.26 | 1.42 ± 0.24 | 1.42 ± 0.36 |
| Stomach | 1.07 ± 0.21 | 0.70 ± 0.14 | 0.63 ± 0.20 | 0.67 ± 0.13 |
| S. intestine | 1.38 ± 0.26 | 1.03 ± 0.05 | 0.97 ± 0.05 | 1.32 ± 0.29 |
| L. intestine | 0.47 ± 0.14 | 0.42 ± 0.06 | 0.47 ± 0.03 | 0.68 ± 0.34 |
| Kidneys | 10.7 ± 0.68 | 17.3 ± 1.51 | 23.9 ± 3.74 | 28.6 ± 2.36 |
| Muscle | 0.75 ± 0.09 | 0.93 ± 0.16 | 1.14 ± 0.24 | 1.06 ± 0.33 |
| Bone | 1.23 ± 0.22 | 1.02 ± 0.25 | 1.33 ± 0.14 | 1.24 ± 0.27 |
| Skin | 2.59 ± 0.45 | 3.03 ± 0.42 | 2.91 ± 0.48 | 2.64 ± 0.18 |
| Tumor | 3.04 ± 0.37 | 4.41 ± 0.47 | 4.79 ± 1.08 | 4.57 ± 0.75 |
| Tumor-to-tissue ratios (rel. u.) | | | | |
| Tumor/Blood | 0.15 ± 0.03 | 0.36 ± 0.06 | 0.40 ± 0.11 | 0.45 ± 0.12 |
| Tumor/Liver | 0.52 ± 0.07 | 0.95 ± 0.15 | 1.1 ± 0.3 | 1.1 ± 0.2 |
| Tumor/S. I. | 2.2 ± 0.5 | 4.3 ± 0.5 | 4.9 ± 1.1 | 3.5 ± 0.9 |
| Tumor/L. I. | 7 ± 2 | 10.5 ± 1.8 | 10 ± 2 | 6.7 ± 3.6 |
| Tumor/Kidney | 0.28 ± 0.04 | 0.25 ± 0.03 | 0.20 ± 0.06 | 0.16 ± 0.03 |
| Tumor/Muscle | 4.1 ± 0.7 | 4.7 ± 0.9 | 4.2 ± 1.3 | 4.3 ± 1.5 |
| Tumor/Bone | 2.5 ± 0.5 | 4.3 ± 1.1 | 3.6 ± 0.9 | 3.7 ± 1.0 |

Figure 67

| Tissue | 1 h (n=4) | | | 4 h (n=3) | | | 6 h (n=4) | | | 8 h (n=3) | | | 6 h (n=3)* | | |
|---|---|---|---|---|---|---|---|---|---|---|---|---|---|---|---|
| Blood | 1.27 | ± | 0.92 | 8.16 | ± | 1.53 | 4.17 | ± | 0.88 | 4.17 | ± | 2.37 | 6.25 | ± | 2.32 |
| Heart | 0.13 | ± | 0.13 | 0.58 | ± | 0.07 | 0.55 | ± | 0.13 | 0.54 | ± | 0.08 | 0.67 | ± | 0.14 |
| Lungs | 2.70 | ± | 0.89 | 1.80 | ± | 0.65 | 2.06 | ± | 0.64 | 1.00 | ± | 0.10 | 1.53 | ± | 0.07 |
| Liver | 10.2 | ± | 0.90 | 6.59 | ± | 1.19 | 5.94 | ± | 0.45 | 5.88 | ± | 0.38 | 6.65 | ± | 0.57 |
| Spleen | 0.30 | ± | 0.02 | 0.29 | ± | 0.07 | 0.28 | ± | 0.03 | 0.26 | ± | 0.05 | 0.51 | ± | 0.08 |
| Stomach | 0.63 | ± | 0.12 | 0.51 | ± | 0.05 | 0.42 | ± | 0.06 | 0.45 | ± | 0.08 | 0.62 | ± | 0.09 |
| S. intestine | 3.04 | ± | 0.45 | 2.20 | ± | 0.39 | 2.40 | ± | 0.29 | 2.14 | ± | 0.19 | 2.79 | ± | 0.23 |
| L. intestine | 1.04 | ± | 0.13 | 1.14 | ± | 0.10 | 1.23 | ± | 0.05 | 1.28 | ± | 0.36 | 1.72 | ± | 0.04 |
| Kidneys | 6.11 | ± | 0.70 | 8.10 | ± | 0.58 | 11.8 | ± | 0.73 | 13.0 | ± | 1.76 | 10.20 | ± | 0.11 |
| Muscle | 0.14 | ± | 0.04 | 0.18 | ± | 0.06 | 0.15 | ± | 0.05 | 0.17 | ± | 0.03 | 0.17 | ± | 0.04 |
| Bone | 0.07 | ± | 0.03 | 0.09 | ± | 0.03 | 0.12 | ± | 0.04 | 0.14 | ± | 0.04 | 0.12 | ± | 0.00 |
| Skin (ears) | 0.33 | ± | 0.09 | 0.44 | ± | 0.15 | 0.34 | ± | 0.06 | 0.24 | ± | 0.05 | 0.26 | ± | 0.04 |
| Skin (shoulder) | 0.38 | ± | 0.11 | 0.58 | ± | 0.21 | 0.32 | ± | 0.17 | 0.20 | ± | 0.08 | 0.16 | ± | 0.05 |
| Tumor | 0.67 | ± | 0.16 | 1.56 | ± | 1.89 | 2.29 | ± | 1.97 | 1.96 | ± | 2.18 | 0.11 | ± | 0.07 |

Figure 68

| Tissue | 1 h (n=5) | 4 h (n=5) | 6 h (n=5) | 8 h (n=5) | 6 h (n=3)+ |
|---|---|---|---|---|---|
| Blood | 29.3 ± 3.06 | 17.2 ± 1.77 | 15.3 ± 0.70 | 14.3 ± 0.80 | 2.11 ± 0.27 |
| Heart | 8.86 ± 1.02 | 5.79 ± 0.63 | 4.86 ± 0.53 | 5.36 ± 0.66 | 6.98 ± 0.81 |
| Lungs | 15.2 ± 1.14 | 10.1 ± 3.12 | 9.70 ± 1.84 | 5.82 ± 0.57 | 8.76 ± 0.47 |
| Liver | 10.1 ± 1.60 | 7.22 ± 0.64 | 7.41 ± 0.20 | 7.01 ± 0.35 | 8.02 ± 0.11 |
| Spleen | 3.79 ± 0.36 | 3.18 ± 0.41 | 3.22 ± 0.19 | 4.00 ± 0.14 | 4.89 ± 0.28 |
| Stomach | 1.90 ± 0.91 | 1.70 ± 0.35 | 1.18 ± 0.27 | 0.82 ± 0.12 | 0.86 ± 0.05 |
| S. intestine | 2.77 ± 0.52 | 2.08 ± 0.28 | 1.89 ± 0.16 | 1.93 ± 0.05 | 2.73 ± 0.09 |
| L. intestine | 1.48 ± 0.30 | 1.84 ± 0.14 | 1.59 ± 0.12 | 1.72 ± 0.23 | 2.05 ± 0.08 |
| Kidneys | 20.1 ± 3.35 | 28.9 ± 3.19 | 40.7 ± 3.41 | 46.0 ± 2.98 | 34.4 ± 0.71 |
| Muscle | 1.09 ± 0.15 | 1.46 ± 0.14 | 1.51 ± 0.23 | 1.46 ± 0.12 | 1.52 ± 0.16 |
| Bone | 2.33 ± 0.34 | 2.22 ± 0.50 | 2.64 ± 0.45 | 2.42 ± 0.13 | 2.75 ± 0.20 |
| Skin (ears) | 2.35 ± 0.34 | 3.61 ± 0.61 | 3.91 ± 0.21 | 2.78 ± 0.17 | 3.00 ± 0.28 |
| Skin (shoulder) | 2.77 ± 0.57 | 4.86 ± 0.74 | 4.93 ± 0.68 | 4.77 ± 0.35 | 5.24 ± 0.44 |
| Tumor | 6.12 ± 0.60 | 8.23 ± 0.84 | 8.02 ± 2.00 | 10.5 ± 1.73 | 8.62 ± 1.53 |
| Tumor-to-tissue ratios (rel. u.) | | | | | |
| Tumor/Blood | 0.21 ± 0.03 | 0.48 ± 0.07 | 0.52 ± 0.13 | 0.73 ± 0.13 | 0.41 ± 0.07 |
| Tumor/Liver | 0.61 ± 0.11 | 1.14 ± 0.15 | 1.1 ± 0.3 | 1.5 ± 0.3 | 1.07 ± 0.19 |
| Tumor/S.I. | 2.2 ± 0.5 | 4.0 ± 0.7 | 4.2 ± 1.1 | 5.4 ± 0.9 | 3.2 ± 0.6 |
| Tumor/L.I. | 4.1 ± 0.9 | 4.5 ± 0.6 | 5.0 ± 1.3 | 6.1 ± 1.3 | 4.2 ± 0.8 |
| Tumor/Kidney | 0.30 ± 0.06 | 0.28 ± 0.04 | 0.20 ± 0.05 | 0.23 ± 0.04 | 0.25 ± 0.04 |
| Tumor/Muscle | 5.6 ± 0.9 | 5.6 ± 0.8 | 5.3 ± 1.6 | 7.2 ± 1.3 | 5.7 ± 1.2 |
| Tumor/Bone | 2.6 ± 0.5 | 3.7 ± 0.9 | 3.0 ± 0.9 | 4.3 ± 0.8 | 3.1 ± 0.6 |

Figure 69

| Tissue | 6 h (n=6) |
|---|---|
| Blood | 5.34 ± 2.40 |
| Heart | 0.73 ± 0.15 |
| Lungs | 0.91 ± 0.15 |
| Liver | 5.59 ± 0.72 |
| Spleen | 0.24 ± 0.06 |
| Pancreas | 0.21 ± 0.04 |
| Stomach | 0.46 ± 0.08 |
| S. Intestine | 2.13 ± 0.20 |
| L. Intestine | 1.15 ± 0.18 |
| Kidneys | 10.1 ± 1.1 |
| Muscle | 0.15 ± 0.03 |
| Bone | 0.079 ± 0.014 |
| Skin | 0.39 ± 0.07 |
| Brain | 0.151 ± 0.018 |
| U87MG Tumor | 0.49 ± 0.23 |

Figure 70

| Tissue | 6 h (n=6) | | |
|---|---|---|---|
| Blood | 10.7 | ± | 0.9 |
| Heart | 4.17 | ± | 0.42 |
| Lungs | 4.57 | ± | 0.81 |
| Liver | 4.34 | ± | 0.88 |
| Spleen | 2.30 | ± | 0.34 |
| Pancreas | 1.30 | ± | 0.24 |
| Stomach | 0.70 | ± | 0.24 |
| S. Intestine | 1.20 | ± | 0.21 |
| L. Intestine | 0.50 | ± | 0.09 |
| Kidneys | 17.4 | ± | 2.5 |
| Muscle | 0.88 | ± | 0.08 |
| Bone | 1.27 | ± | 0.11 |
| Skin | 2.43 | ± | 0.30 |
| Brain | 0.38 | ± | 0.04 |
| U87MG Tumor | 3.97 | ± | 0.56 |
| Tumor-to-tissue ratios (rel. u.) | | | |
| Tumor/Blood | 0.37 | ± | 0.06 |
| Tumor/Liver | 0.9 | ± | 0.2 |
| Tumor/S. I. | 3.3 | ± | 0.7 |
| Tumor/L. I. | 7.9 | ± | 1.8 |
| Tumor/Kidney | 0.23 | ± | 0.05 |
| Tumor/Muscle | 4.5 | ± | 0.8 |
| Tumor/Bone | 3.1 | ± | 0.5 |
| Tumor/Brain | 10.5 | ± | 1.9 |

Figure 71

SEQUENCE LISTING

```
Sequence total quantity: 15
SEQ ID NO: 1            moltype = AA  length = 36
FEATURE                 Location/Qualifiers
REGION                  1..36
                        note = Description of Artificial Sequence: Synthetic
                         polypeptide
source                  1..36
                        mol_type = protein
                        organism = synthetic construct
SEQUENCE: 1
ACEQNPIYWA RYADWLFTTP LLLLDLALLV DADEGT                                    36

SEQ ID NO: 2            moltype = AA  length = 27
FEATURE                 Location/Qualifiers
REGION                  1..27
                        note = Description of Artificial Sequence: Synthetic peptide
source                  1..27
                        mol_type = protein
                        organism = synthetic construct
SEQUENCE: 2
ACDDQNPWRA YLDLLFPTDT LLLDLLW                                              27

SEQ ID NO: 3            moltype = AA  length = 28
FEATURE                 Location/Qualifiers
REGION                  1..28
                        note = Description of Artificial Sequence: Synthetic peptide
source                  1..28
                        mol_type = protein
                        organism = synthetic construct
SEQUENCE: 3
ADDQNPWRAY LDLLFPTDTL LLDLLWCG                                             28

SEQ ID NO: 4            moltype = AA  length = 25
FEATURE                 Location/Qualifiers
REGION                  1..25
                        note = Description of Artificial Sequence: Synthetic peptide
source                  1..25
                        mol_type = protein
                        organism = synthetic construct
SEQUENCE: 4
ACEEQNPWAR YLEWLFPTET LLLEL                                                25

SEQ ID NO: 5            moltype = AA  length = 36
FEATURE                 Location/Qualifiers
```

```
                                    -continued
REGION                  1..36
                        note = Description of Artificial Sequence: Synthetic
                         polypeptide
source                  1..36
                        mol_type = protein
                        organism = synthetic construct
VARIANT                 2
                        note = Residue attached to an
                         1,4,7-triazacyclononane-1,4-bis-acetic acid-7-acetyl group
                         optionally chelating a radionuclide via a covalent bond or
                         covalent linker with a heteroatom of the side chain
SEQUENCE: 5
ACEQNPIYWA RYADWLFTTP LLLLDLALLV DADEGT                                    36

SEQ ID NO: 6            moltype = AA  length = 27
FEATURE                 Location/Qualifiers
REGION                  1..27
                        note = Description of Artificial Sequence: Synthetic peptide
source                  1..27
                        mol_type = protein
                        organism = synthetic construct
VARIANT                 2
                        note = Residue attached to an
                         1,4,7-triazacyclononane-1,4-bis-acetic acid-7-acetyl group
                         optionally chelating a radionuclide via a covalent bond or
                         covalent linker with a heteroatom of the side chain
SEQUENCE: 6
ACDDQNPWRA YLDLLFPTDT LLLDLLW                                              27

SEQ ID NO: 7            moltype = AA  length = 28
FEATURE                 Location/Qualifiers
REGION                  1..28
                        note = Description of Artificial Sequence: Synthetic peptide
source                  1..28
                        mol_type = protein
                        organism = synthetic construct
VARIANT                 27
                        note = Residue attached to an
                         1,4,7-triazacyclononane-1,4-bis-acetic acid-7-acetyl group
                         optionally chelating a radionuclide via a covalent bond or
                         covalent linker with a heteroatom of the side chain
SEQUENCE: 7
ADDQNPWRAY LDLLFPTDTL LLDLLWCG                                             28

SEQ ID NO: 8            moltype = AA  length = 25
FEATURE                 Location/Qualifiers
REGION                  1..25
                        note = Description of Artificial Sequence: Synthetic peptide
source                  1..25
                        mol_type = protein
                        organism = synthetic construct
VARIANT                 2
                        note = Residue attached to an
                         1,4,7-triazacyclononane-1,4-bis-acetic acid-7-acetyl group
                         optionally chelating a radionuclide via a covalent bond or
                         covalent linker with a heteroatom of the side chain
SEQUENCE: 8
ACEEQNPWAR YLEWLFPTET LLLEL                                                25

SEQ ID NO: 9            moltype = AA  length = 36
FEATURE                 Location/Qualifiers
REGION                  1..36
                        note = Description of Artificial Sequence: Synthetic
                         polypeptide
source                  1..36
                        mol_type = protein
                        organism = synthetic construct
SITE                    1
                        note = 1,4,7-Triazacyclononane-1,4,7-triacetic acid
                         modified residue
SEQUENCE: 9
ACEQNPIYWA RYADWLFTTP LLLLDLALLV DADEGT                                    36

SEQ ID NO: 10           moltype = AA  length = 27
FEATURE                 Location/Qualifiers
REGION                  1..27
                        note = Description of Artificial Sequence: Synthetic peptide
source                  1..27
                        mol_type = protein
```

-continued

```
                    organism = synthetic construct
SITE                1
                    note = 1,4,7-Triazacyclononane-1,4,7-triacetic acid
                     modified residue
SEQUENCE: 10
ACDDQNPWRA YLDLLFPTDT LLLDLLW                                            27

SEQ ID NO: 11           moltype = AA   length = 25
FEATURE                 Location/Qualifiers
REGION                  1..25
                        note = Description of Artificial Sequence: Synthetic peptide
source                  1..25
                        mol_type = protein
                        organism = synthetic construct
SITE                    1
                        note = 1,4,7-Triazacyclononane-1,4,7-triacetic acid
                         modified residue
SEQUENCE: 11
ACEEQNPWAR YLEWLFPTET LLLEL                                              25

SEQ ID NO: 12           moltype = AA   length = 36
FEATURE                 Location/Qualifiers
REGION                  1..36
                        note = Description of Artificial Sequence: Synthetic
                         polypeptide
source                  1..36
                        mol_type = protein
                        organism = synthetic construct
SITE                    2
                        note = 1,4,7-Triazacyclononane-1,4-bis-acetic
                         acid-7-maleimidoethylacetamide modified residue
SEQUENCE: 12
ACEQNPIYWA RYADWLFTTP LLLLDLALLV DADEGT                                  36

SEQ ID NO: 13           moltype = AA   length = 27
FEATURE                 Location/Qualifiers
REGION                  1..27
                        note = Description of Artificial Sequence: Synthetic peptide
source                  1..27
                        mol_type = protein
                        organism = synthetic construct
SITE                    2
                        note = 1,4,7-Triazacyclononane-1,4-bis-acetic
                         acid-7-maleimidoethylacetamide modified residue
SEQUENCE: 13
ACDDQNPWRA YLDLLFPTDT LLLDLLW                                            27

SEQ ID NO: 14           moltype = AA   length = 28
FEATURE                 Location/Qualifiers
REGION                  1..28
                        note = Description of Artificial Sequence: Synthetic peptide
source                  1..28
                        mol_type = protein
                        organism = synthetic construct
SITE                    27
                        note = 1,4,7-Triazacyclononane-1,4-bis-acetic
                         acid-7-maleimidoethylacetamide modified residue
SEQUENCE: 14
ADDQNPWRAY LDLLFPTDTL LLDLLWCG                                           28

SEQ ID NO: 15           moltype = AA   length = 25
FEATURE                 Location/Qualifiers
REGION                  1..25
                        note = Description of Artificial Sequence: Synthetic peptide
source                  1..25
                        mol_type = protein
                        organism = synthetic construct
SITE                    2
                        note = 1,4,7-Triazacyclononane-1,4-bis-acetic
                         acid-7-maleimidoethylacetamide modified residue
SEQUENCE: 15
ACEEQNPWAR YLEWLFPTET LLLEL                                              25
```

RADIOLABELED LIGANDS FOR TARGETED PET/SPECT IMAGING AND METHODS OF THEIR USE

CROSS-REFERENCE TO RELATED APPLICATIONS

This application is a continuation of U.S. application Ser. No. 16/321,429, filed Jan. 28, 2019, which is the U.S. National Stage Entry of International Application No. PCT/US2017/044555, which claims the benefit of and priority to U.S. Application No. 62/368,991, filed Jul. 29, 2016, the content of each of which is incorporated herein by reference in their entirety.

STATEMENT OF GOVERNMENT SUPPORT

This invention was made with government support under CA186721, CA138468, and CA008748, awarded by the National Institutes of Health. The government has certain rights in the invention.

TECHNICAL FIELD

The present technology relates generally to compositions including a modified pH (low) insertion peptide and methods of using the same in diagnostic imaging to detect acidic tissues, such as cancer, in a subject.

SEQUENCE LISTING

The instant application contains a Sequence Listing which has been submitted electronically in XML format and is hereby incorporated by reference in its entirety. Said XML copy, created Jan. 10, 2024, is named 115872-1532_SL.xml and is 25,733 bytes in size.

BACKGROUND

The following description of the background of the present technology is provided simply as an aid in understanding the present technology and is not admitted to describe or constitute prior art to the present technology.

Cancer cells generally prefer the glycolytic pathway of energy production due to their deregulated proliferative machinery and survival needs, thus resulting in excess acidity. To maintain homeostasis, cancer cells release lactic acid formed during glycolysis to the extracellular environment. Lactic acid release lowers the extracellular pH immediately surrounding these cells relative to the pH of normal tissues. Due to the differential in pH gradients, a probe marking these acidic regions in rapidly proliferating tissues can potentially discriminate cancerous tissues from normal tissue.

Thus, there is a need for novel diagnostic compositions that exhibit (a) high tumoral uptake and prolonged retention in tumors, and (b) minimal accumulation in non-tumor tissue for use in PET and SPECT imaging methods to detect tumor cells.

SUMMARY OF THE PRESENT TECHNOLOGY

In one aspect, the present disclosure provides a compound or pharmaceutically acceptable salt thereof, where the compound includes a pH (low) insertion peptide ("pHLIP") configured to localize to an extracellular environment having a pH that is lower than 7.4, wherein the pHLIP includes a C-terminus and an N-terminus; and $X^1$ covalently attached to a heteroatom of a side chain of an amino acid residue of the pHLIP, where the amino acid residue is from 0, 1, 2, 3, 4, 5, or 6 residues from the C-terminus or the N-terminus.

In the composition, $X^1$ is of Formula I

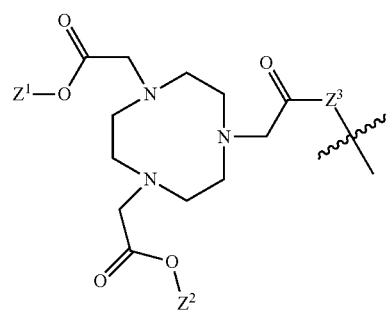

(I)

where $Z^1$ and $Z^2$ are each independently a lone pair of electrons (i.e. providing an oxygen anion) or H; and $Z^3$ is —NH-alkylene-, —NH—CH$_2$CH$_2$-((poly(alkylene glycol))-,

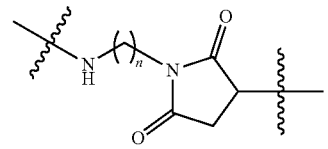

where n is 1, 2, 3, 4, 5, 6, 7, or 8, or a bond.

In a related aspect, a complex is provided that includes any embodiment of the composition described herein and a radionuclide. In such a complex, $X^1$ may be of Formula II

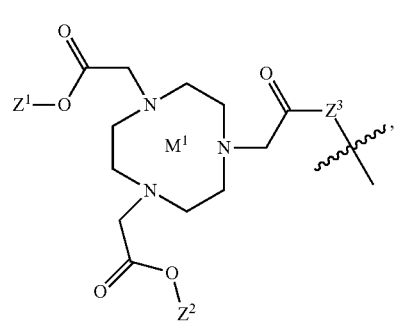

(II)

wherein $M^1$ is $^{60}$Cu$^{2+}$, $^{61}$Cu$^{2+}$, $^{62}$Cu$^{2+}$, $^{64}$Cu$^{2+}$, $^{67}$Cu$^{2+}$, [$^{18}$F]—AlF$^{2+}$, $^{67}$Ga$^{3+}$, $^{68}$Ga$^{3+}$, $^{69}$Ga$^{3+}$, or $^{71}$Ga$^{3+}$.

In another related aspect of the present technology, a composition is provided that includes any one of the aspects and embodiments of compounds and/or complexes and a pharmaceutically acceptable carrier. In a further related aspect, a pharmaceutical composition is provided, the pharmaceutical composition including an effective amount of any one of the embodiments of the complexes described herein for imaging a tissue comprising an extracellular environment having a pH that is lower than 7.4 and a pharmaceutically acceptable carrier.

In an aspect, the present disclosure provides a method for detecting solid tumors in a subject in need thereof comprising (a) administering to the subject an effective amount of a complex of any embodiment described herein, wherein the complex is configured to localize to a solid tumor having an acidic pH environment; and (b) detecting the presence of solid tumors in the subject by detecting radioactive levels emitted by the complex that are higher than a reference value.

In another aspect, the present disclosure provides a method for detecting acidic diseased tissue in a subject in need thereof comprising (a) administering to the subject an effective amount of a complex of any embodiment described herein, wherein the complex is configured to localize to an extracellular environment having a pH that is lower than 7.4; and (b) detecting the presence of acidic diseased tissue in the subject by detecting radioactive levels emitted by the complex that are higher than a reference value.

Also disclosed herein are kits containing components suitable for diagnosing, e.g., cancer, in a patient. In one aspect, the kits comprise at least one compound or complex of the present technology, instructions for use, and optionally at least one radionuclide.

BRIEF DESCRIPTION OF THE DRAWINGS

FIG. 3B shows the maximum intensity projections (MIPs) for 12 tracer compounds at 4 h and the slices at the level of the tumor for the [$^{18}$F]—AlF-NO2A-cys pHLIP complexes with a maximum value of 15% ID/g. Only ex vivo biodistribution data was obtained for $^{64}$Cu-NOTA-Var7.

FIG. 4A: Amount of complex population in State II is measured on the y-axis. FIG. 4B: pH-dependence parameters are used to calculate the percent of inserted complex population at various pH levels. These transitions were measured in the presence of physiological levels of free magnesium and calcium ions (0.65 mM and 1.25 mM, respectively).

FIG. 12A shows the images of the uptake of U87MG tumors xenografted in the skull (U87MG*) or flank (U87MG) on male nude mice and GSC 5-22 tumors orthotopically xenografted behind an intact BBB in IRC-SCID male mice at 4 h post injection. The U87MG* tumors did not infiltrate the brain and only the portion of the tumor that was in the skull bone and protruding from the skull showed uptake. The arrowheads in FIG. 12A indicate where the tumor is located in the mouse. FIG. 12B shows the complex biodistribution of six male nude mice with flank U87MG xenografted tumors.

(FIG. 15A) PC3 at 4 h; (FIG. 15B) PC3 at 24 h; (FIG. 15C) LNCaP at 4 and 24 h.

FIG. 21 shows the general specific activities of exemplary compositions of the present technology, where the notes are as follows: $^a$Approximated from the amount of total peptide added; $^b$Calculated from the UV/vis standard concentration curve; $^c$In a separate experiment, a specific activity of 1656 μCi/nmol was attained, but the lower specific activity material was used in the studies in order to be comparable throughout.

FIG. 22 shows the tissue uptake (mean % ID±SD) of $^{64}Cu$-NOTA-WT administered via the lateral tail vein in female, BALB/c mice with orthotopic 4T1 breast cancer allografts implanted into the mammary fat pad.

FIG. 23 shows the tissue uptake (mean % ID/g±SD) of $^{64}Cu$-NOTA-WT administered via the lateral tail vein in female, BALB/c mice with orthotopic 4T1 breast cancer allografts implanted into the mammary fat pad.

FIG. 25 shows the tissue uptake (mean % ID±SD) of $^{64}Cu$-NOTA-Var3 administered via the lateral tail vein in female, BALB/c mice with orthotopic 4T1 breast cancer allografts implanted into the mammary fat pad.

FIG. 26 shows the tissue uptake (mean % ID/g±SD) of $^{64}Cu$-NOTA-Var3 administered via the lateral tail vein in female, BALB/c mice with orthotopic 4T1 breast cancer allografts implanted into the mammary fat pad.

FIG. 28 shows the tissue uptake (mean % ID±SD) of $^{64}Cu$-NOTA-Var7 administered via the lateral tail vein in female, BALB/c mice with orthotopic 4T1 breast cancer allografts implanted into the mammary fat pad.

FIG. 29 shows the tissue uptake (mean % ID/g±SD) of $^{64}Cu$-NOTA-Var7 administered via the lateral tail vein in female, BALB/c mice with orthotopic 4T1 breast cancer allografts implanted into the mammary fat pad.

FIG. 31 shows the tissue uptake (mean % ID±SD) of [$^{18}F$]—AlF-NOTA-WT administered via the lateral tail vein in female, BALB/c mice with orthotopic 4T1 breast cancer allografts implanted into the mammary fat pad.

FIG. 32 shows the tissue uptake (mean % ID/g±SD) of [$^{18}F$]—AlF-NOTA-WT administered via the lateral tail vein in female, BALB/c mice with orthotopic 4T1 breast cancer allografts implanted into the mammary fat pad.

FIG. 34 shows the tissue uptake (mean % ID±SD) of [$^{18}F$]—AlF-NOTA-Var3 administered via the lateral tail vein in female, BALB/c mice with orthotopic 4T1 breast cancer allografts implanted into the mammary fat pad.

FIG. 35 shows the tissue uptake (mean % ID/g±SD) of [$^{18}F$]—AlF-NOTA-Var3 administered via the lateral tail vein in female, BALB/c mice with orthotopic 4T1 breast cancer allografts implanted into the mammary fat pad.

FIG. 37 shows the tissue uptake (mean % ID±SD) of [$^{18}F$]—AlF-NOTA-Var7 administered via the lateral tail vein in female, BALB/c mice with orthotopic 4T1 breast cancer allografts implanted into the mammary fat pad.

FIG. 38 shows the tissue uptake (mean % ID/g±SD) of [$^{18}F$]—AlF-NOTA-Var7 administered via the lateral tail vein in female, BALB/c mice with orthotopic 4T1 breast cancer allografts implanted into the mammary fat pad.

Figure 40:
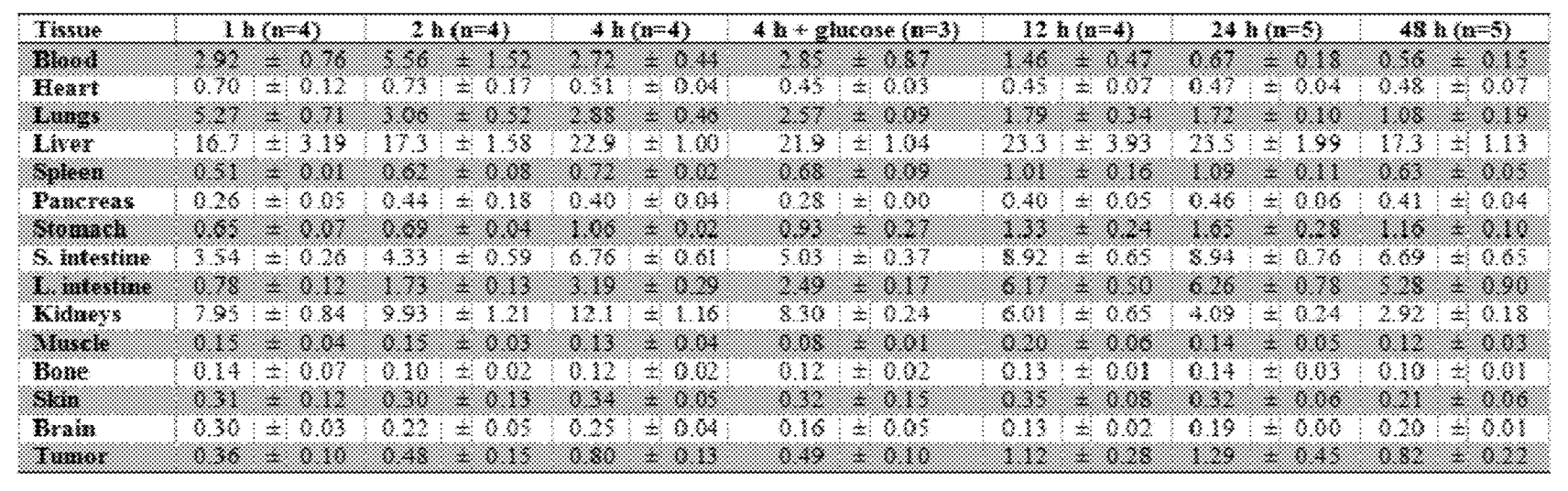

FIG. 40 shows the tissue uptake (mean % ID/g±SD) of $^{64}Cu$-NO2A-cysWT administered via the lateral tail vein in female, BALB/c mice with orthotopic 4T1 breast cancer allografts implanted into the mammary fat pad.

Figure 41:
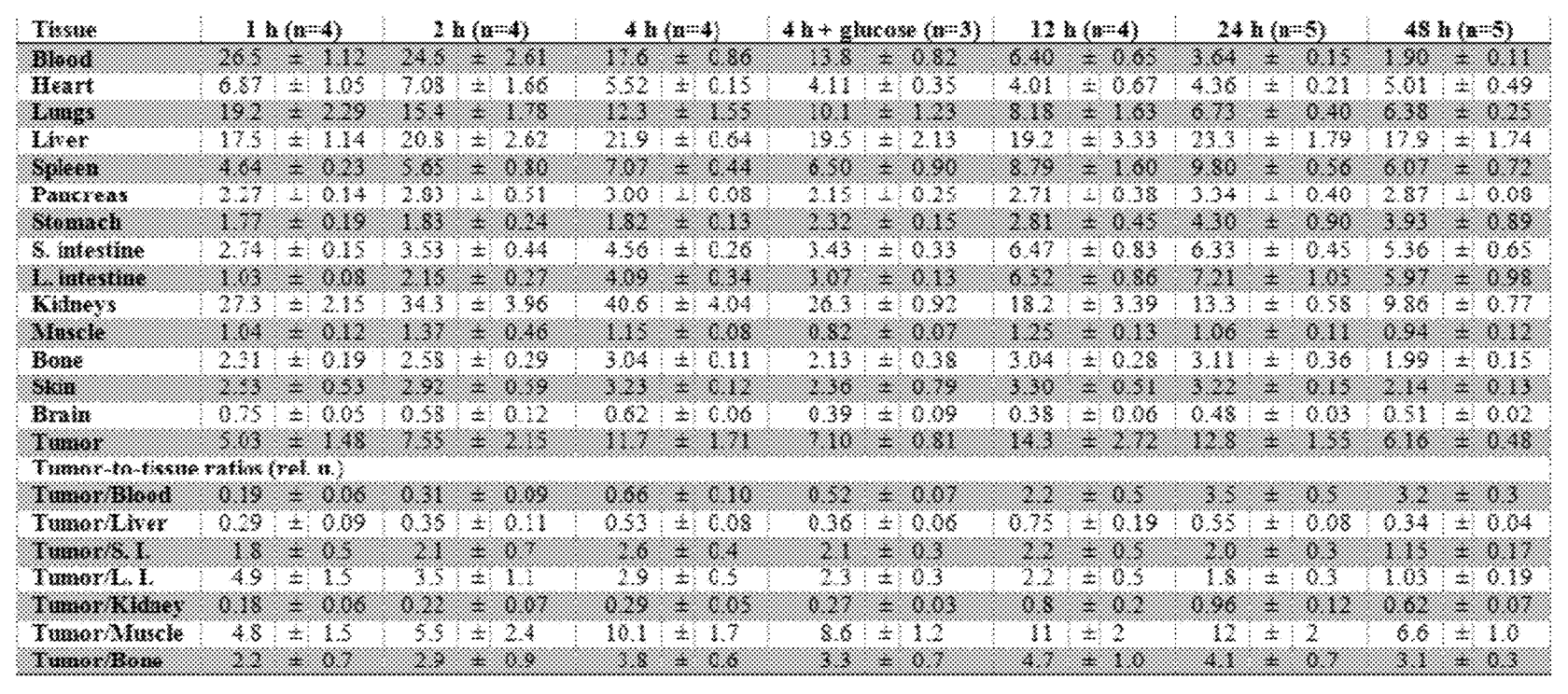

FIG. 41 shows the tissue uptake (mean % ID/g±SD) of $^{64}Cu$-NO2A-cysWT administered via the lateral tail vein in female, BALB/c mice with orthotopic 4T1 breast cancer allografts implanted into the mammary fat pad.

FIG. 43 shows the tissue uptake (mean % ID±SD) of $^{64}$Cu-NO2A-cysVar7 administered via the lateral tail vein in female, BALB/c mice with orthotopic 4T1 breast cancer allografts implanted into the mammary fat pad.

Figure 44:
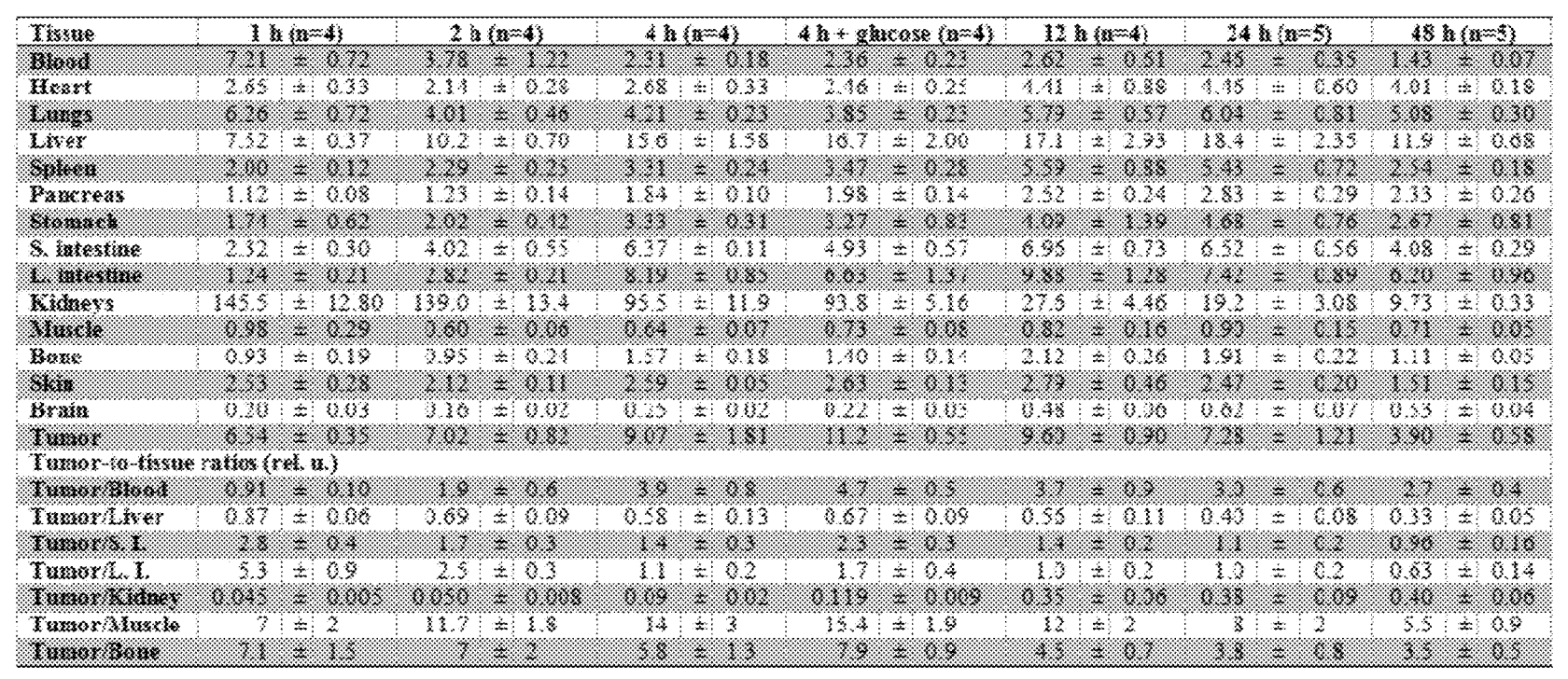

FIG. 44 shows the tissue uptake (mean % ID/g±SD) of $^{64}$Cu-NO2A-cysVar7 administered via the lateral tail vein in female, BALB/c mice with orthotopic 4T1 breast cancer allografts implanted into the mammary fat pad.

FIG. 46 shows the tissue uptake (mean % ID±SD) of [$^{18}$F]—AlF-NO2A-cysWT administered via the lateral tail vein in female, BALB/c mice with orthotopic 4T1 breast cancer allografts implanted into the mammary fat pad.

FIG. 47 shows the tissue uptake (mean % ID/g±SD) of [$^{18}$F]—AlF-NO2A-cysWT administered via the lateral tail vein in female, BALB/c mice with orthotopic 4T1 breast cancer allografts implanted into the mammary fat pad.

FIG. 49 shows the tissue uptake (mean % ID±SD) of [$^{18}$F]—AlF-NO2A-cysVar7 administered via the lateral tail vein in female, BALB/c mice with orthotopic 4T1 breast cancer allografts implanted into the mammary fat pad.

Figure 50:
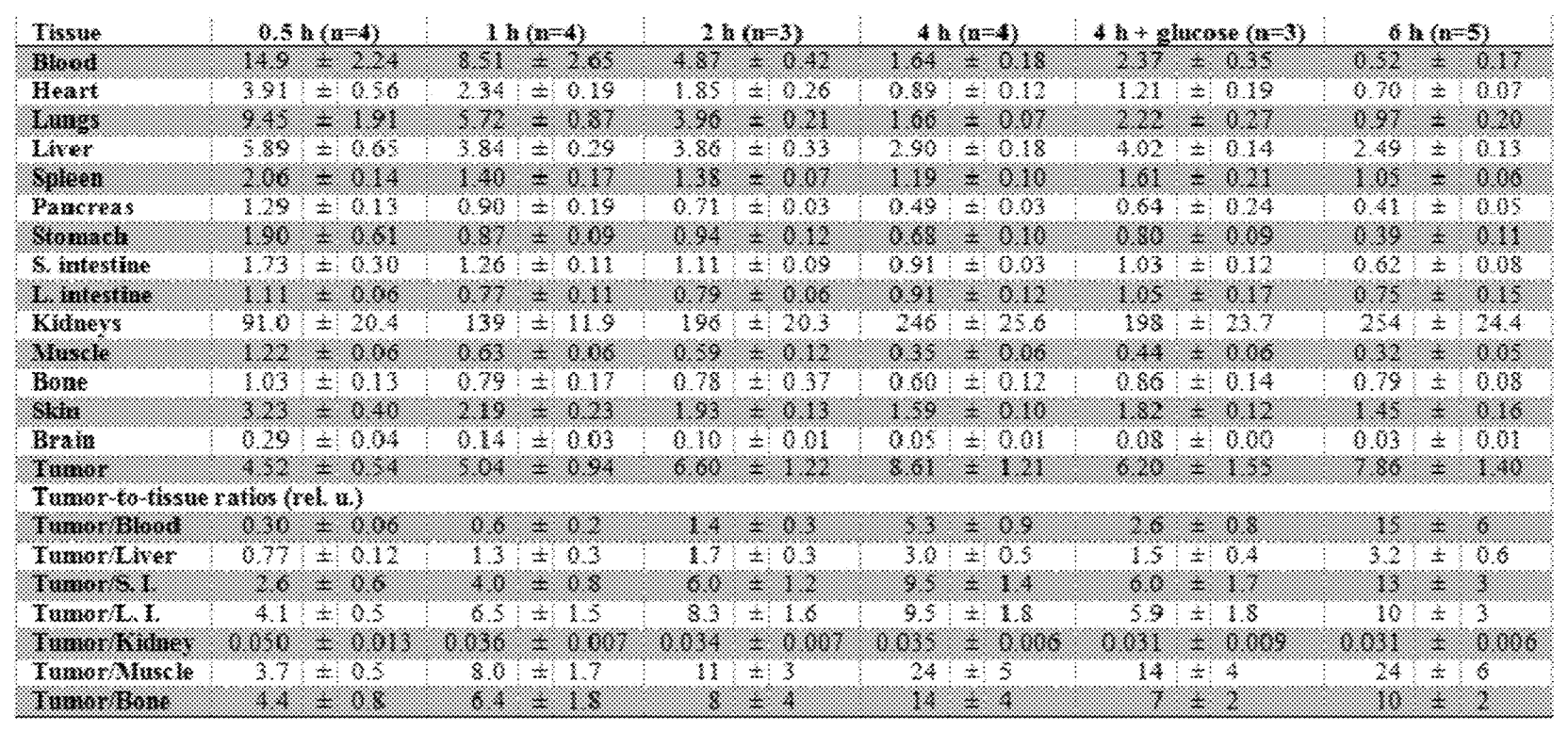

FIG. 50 shows the tissue uptake (mean % ID/g±SD) of [$^{18}$F]—AlF-NO2A-cysVar7 administered via the lateral tail vein in female, BALB/c mice with orthotopic 4T1 breast cancer allografts implanted into the mammary fat pad.

Figure 52:
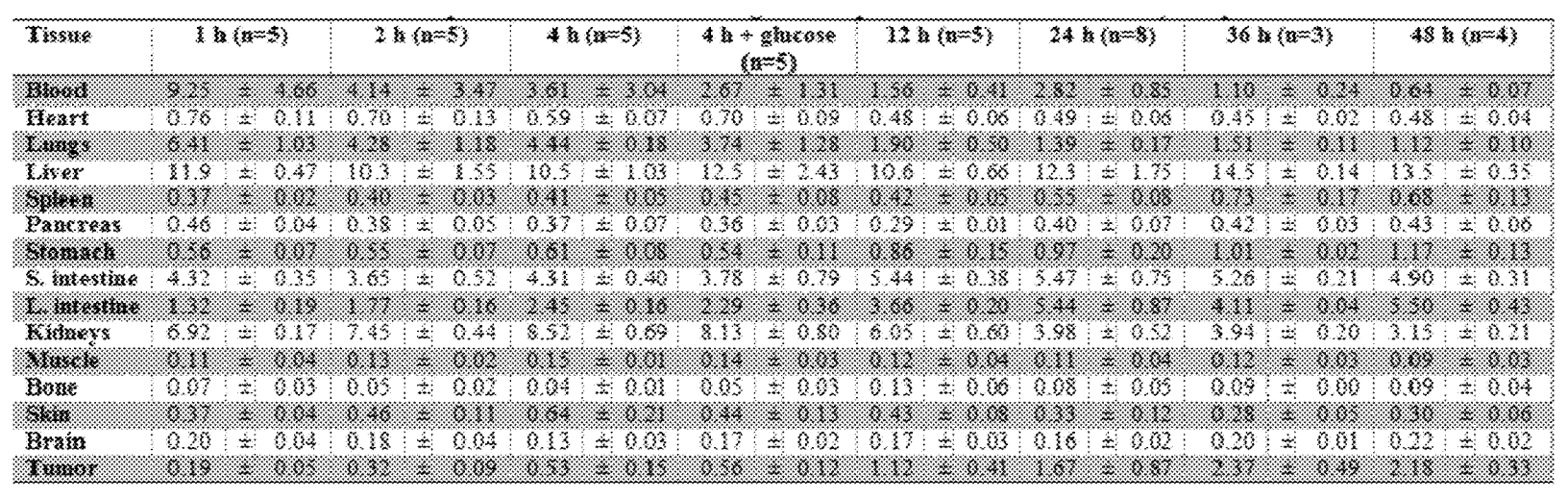

FIG. 52 shows the tissue uptake (mean % ID±SD) of $^{64}$Cu-NO2A-cys Var3 administered via the lateral tail vein in female, BALB/c mice with orthotopic 4T1 breast cancer allografts implanted into the mammary fat pad.

Figure 53:
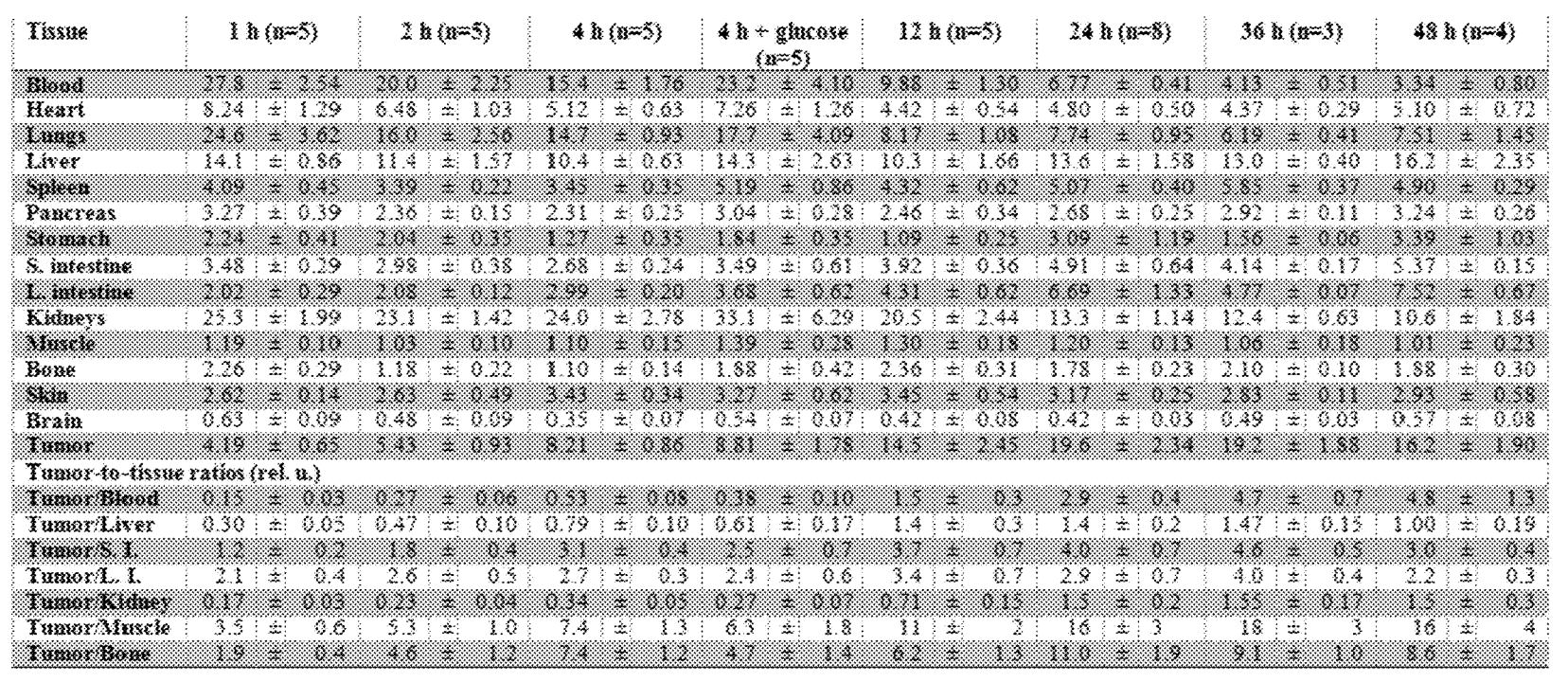

FIG. 53 shows the tissue uptake (mean % ID/g±SD) of $^{64}$Cu-NO2A-cysVar3 administered via the lateral tail vein in female, BALB/c mice with orthotopic 4T1 breast cancer allografts implanted into the mammary fat pad.

FIG. 55 shows the tissue uptake (mean % ID±SD) of [$^{18}$F]—AlF-NO2A-cysVar3 administered via the lateral tail vein in female, BALB/c mice with orthotopic 4T1 breast cancer allografts implanted into the mammary fat pad.

Figure 56:
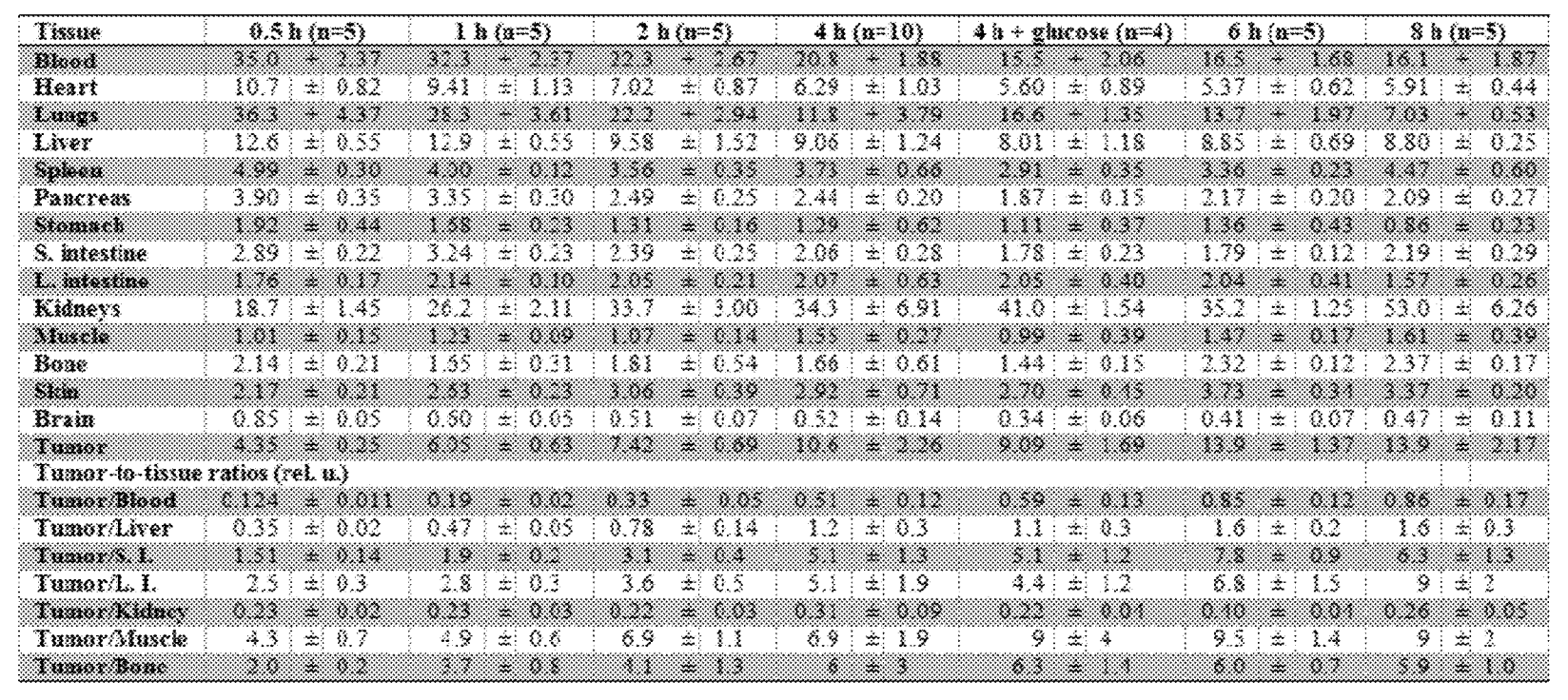

FIG. 56 shows the tissue uptake (mean % ID/g±SD) of [$^{18}$F]—AlF-NO2A-cysVar3 administered via the lateral tail vein in female, BALB/c mice with orthotopic 4T1 breast cancer allografts implanted into the mammary fat pad.

FIG. 58 shows the tissue uptake (mean % ID±SD) of $^{64}$Cu-NO2A-cys Var3 administered via the lateral tail vein in male, nude mice with shoulder PC3 (prostate cancer) xenografts.

FIG. 59 shows the tissue uptake (mean % ID/g±SD) of $^{64}$Cu-NO2A-cysVar3 administered via the lateral tail vein in male, nude mice with shoulder PC3 (prostate cancer) xenografts.

FIG. 60 shows the tissue uptake (mean % ID±SD) of $^{64}$Cu-NO2A-cysVar3 administered via the lateral tail vein in male, nude mice with shoulder LNCaP (prostate cancer) xenografts.

FIG. 61 shows the tissue uptake (mean % ID/g±SD) of $^{64}$Cu-NO2A-cysVar3 administered via the lateral tail vein in male, nude mice with shoulder LNCaP (prostate cancer) xenografts.

FIG. 62 shows the tissue uptake (mean % ID±SD) of $^{64}$Cu-NO2A-cysVar3 administered via the lateral tail vein in female, C57Bl/6 mice with orthotopic B16-F10 (melanoma) allografts.

FIG. 63 shows the tissue uptake (mean % ID/g±SD) of $^{64}$Cu-NO2A-cysVar3 administered via the lateral tail vein in female, C57Bl/6 mice with orthotopic B16-F10 (melanoma) allografts.

FIG. 64 shows the tissue uptake (mean % ID/g±SD) of [$^{18}$F]—AlF-NO2A-cysVar3 administered via the lateral tail vein in male, nude mice with shoulder PC3 (prostate cancer) xenografts.

FIG. 65 shows the tissue uptake (mean % ID/g±SD) of [$^{18}$F]—AlF-NO2A-cysVar3 administered via the lateral tail vein in male, nude mice with shoulder PC3 (prostate cancer) xenografts.

FIG. 66 shows the tissue uptake (mean % ID±SD) of [$^{18}$F]—AlF-NO2A-cysVar3 administered via the lateral tail vein in male, nude mice with shoulder LNCaP (prostate cancer) xenografts.

FIG. 67 shows the tissue uptake (mean % ID/g±SD) of [$^{18}$F]—AlF-NO2A-cysVar3 administered via the lateral tail vein in male, nude mice with shoulder LNCaP (prostate cancer) xenografts.

FIG. 68 shows the tissue uptake (mean % ID±SD) of [$^{18}$F]—AlF-NO2A-cysVar3 administered via the lateral tail vein in female, C57Bl/6 mice with orthotopic B16-F10 (melanoma) allografts and one group of female, BALB/c mice with orthotopic B16-F10 (melanoma) allografts at 6 h in the rightmost column and further indicated by the asterisk (*).

FIG. 69 shows the tissue uptake (mean % ID/g±SD) of [$^{18}$F]—AlF-NO2A-cysVar3 administered via the lateral tail vein in female, C57Bl/6 mice with orthotopic B16-F10 (melanoma) allografts and one group of female, BALB/c mice with orthotopic B16-F10 (melanoma) allografts at 6 h in the rightmost column and further indicated by the asterisk (*).

FIG. 70 shows the tissue uptake (mean % ID±SD) of [$^{18}$F]—AlF-NO2A-cysVar3 administered via the lateral tail vein in male, nude mice with U87MG xenografted flank tumors at 6 h.

FIG. 71 shows the tissue uptake (mean % ID/g±SD) of [$^{18}$F]—AlF-NO2A-cysVar3 administered via the lateral tail vein in male, nude mice with U87MG xenografted flank tumors at 6 h.

DETAILED DESCRIPTION

Figure 1:
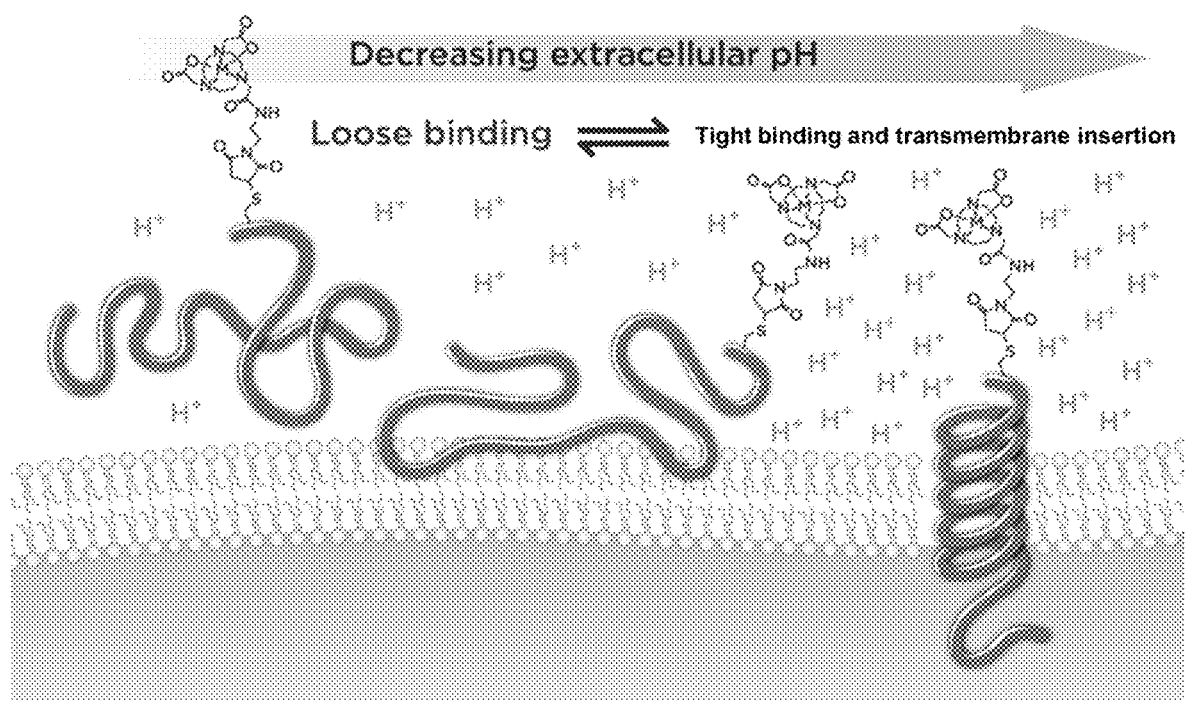
FIG. 1 shows the three folding states of pH (low) insertion peptides ("pHLIPs") in decreasing extracellular pH: unfolded and unbound peptide in solution (State I), unfolded peptide loosely interacting with the membrane lipid bilayer at physiological pH (State II), and folded peptide in alpha-helical conformation inserted across the membrane at low extracellular pH (State III).

It is to be appreciated that certain aspects, modes, embodiments, variations and features of the present methods are described below in various levels of detail in order to provide a substantial understanding of the present technology.

In practicing the present methods, many conventional techniques in molecular biology, protein biochemistry, cell biology, microbiology and recombinant DNA are used. See, e.g., Sambrook and Russell eds. (2001) *Molecular Cloning: A Laboratory Manual*, 3rd edition; the series Ausubel et al. eds. (2007) *Current Protocols in Molecular Biology*; the series *Methods in Enzymology* (Academic Press, Inc., N.Y.); MacPherson et al. (1991) *PCR 1: A Practical Approach* (IRL Press at Oxford University Press); MacPherson et al. (1995) *PCR 2: A Practical Approach*; Harlow and Lane eds. (1999) *Antibodies, A Laboratory Manual*; Freshney (2005) *Culture of Animal Cells: A Manual of Basic Technique*, 5th edition; Gait ed. (1984) *Oligonucleotide Synthesis*; U.S. Pat. No. 4,683,195; Hames and Higgins eds. (1984) *Nucleic Acid Hybridization*; Anderson (1999) *Nucleic Acid Hybridization*; Hames and Higgins eds. (1984) *Transcription and Translation; Immobilized Cells and Enzymes* (IRL Press (1986)); Perbal (1984) *A Practical Guide to Molecular Cloning*; Miller and Calos eds. (1987) *Gene Transfer Vectors for Mammalian Cells* (Cold Spring Harbor Laboratory); Makrides ed. (2003) *Gene Transfer and Expression in Mammalian Cells*; Mayer and Walker eds. (1987) *Immunochemical Methods in Cell and Molecular Biology* (Academic Press, London); and Herzenberg et al. eds (1996) *Weir's Handbook of Experimental Immunology*.

The present disclosure provides compounds, complexes, and compositions that include modified pH (low) insertion peptides that exhibit high tumoral uptake, prolonged tumor retention, and minimal accumulation in non-target organs and tissues. These complexes and compositions are useful as diagnostic imaging agents because they permit diagnostic imaging over a wider-range of times, rather than shorter time points (e.g., fludeoxyglucose F 18 ("$^{18}$F-FDG"), a radiopharmaceutical used in the medical imaging modality positron emission tomography) or much longer time points (e.g., radiolabeled antibodies) in order to detect acidic tissues, such as cancerous cells. The present disclosure provides a comparison of the pharmacokinetic properties of exemplary compounds of the present technology that chelate with different PET and SPECT radionuclides in various cancer models (e.g., an orthotopic breast cancer model (murine 4T1 mammary adenocarcinoma, a model of triple-negative human stage IV breast cancer), melanoma, prostate, and brain tumor models). Radiolabels that are incorporated into the compositions of the present technology may have different half-lives: the SPECT isotope $^{67}$Ga has a long half-life of 3.26 days, $^{64}$Cu has a moderately short half-life of 12.7 hours, whereas the half-life of $^{18}$F and $^{68}$Ga are 109.8 min and 67.7 min respectively. Unlike conventional nucleophilic $^{18}$F labeling of small organic molecules, using a chelator to coordinate the aluminum center of [$^{18}$F]—AlF can be done in aqueous solution.

Definitions

Unless defined otherwise, all technical and scientific terms used herein generally have the same meaning as commonly understood by one of ordinary skill in the art to which this technology belongs. As used in this specification and the appended claims, the singular forms "a", "an" and "the" include plural referents unless the content clearly dictates otherwise. For example, reference to "a cell" includes a combination of two or more cells, and the like. Generally, the nomenclature used herein and the laboratory procedures in cell culture, molecular genetics, organic chemistry, analytical chemistry, biochemistry and hybridization described below are those well-known and commonly employed in the art.

As used herein, the term "about" in reference to a number is generally taken to include numbers that fall within a range of 1%, 5%, or 10% in either direction (greater than or less than) of the number unless otherwise stated or otherwise evident from the context (e.g., except where such number would be less than 0% or exceed 100% of a possible value).

As used herein, the "administration" of an agent or drug to a subject includes any route of introducing or delivering to a subject a compound to perform its intended function. Administration can be carried out by any suitable route, including orally, intranasally, parenterally (intravenously, intramuscularly, intraperitoneally, intralesionally, or subcutaneously), rectally, topically, intraarterially, intrathecally, or via inhalation or via introduction into the cerebrospinal fluid. Administration includes self-administration and the administration by another.

As used herein, the term "amino acid" includes naturally-occurring amino acids and synthetic amino acids, as well as amino acid analogues that function in a manner similar to the naturally-occurring amino acids. Naturally-occurring amino acids are those encoded by the genetic code, as well as those amino acids that are later modified, e.g., hydroxyproline, Y-carboxyglutamate, and O-phosphoserine. Amino acids can be referred to herein by either their commonly known three letter symbols or by the one-letter symbols recommended by the IUPAC-IUB Biochemical Nomenclature Commission.

As used herein, the terms "polypeptide," "peptide," and "protein" are used interchangeably herein to mean a polymer comprising two or more amino acids joined to each other by peptide bonds or modified peptide bonds, i.e., peptide isosteres. Polypeptide refers to both short chains, commonly referred to as peptides, glycopeptides or oligomers, and to longer chains, generally referred to as proteins. Polypeptides may contain amino acids other than the 20 gene-encoded amino acids. Polypeptides include amino acid sequences modified either by natural processes, such as post-translational processing, or by chemical modification techniques that are well known in the art. In any embodiment herein, the peptides included in the compounds and complexes of the present technology may include only D-amino acids.

As used herein, the term "cancer" refers to a malignant neoplasm or tumor (Stedman's Medical Dictionary, 25th ed.; Hensly ed.; Williams & Wilkins: Philadelphia, 1990). Exemplary cancers include acoustic neuroma; adenocarcinoma; adrenal gland cancer; anal cancer; angiosarcoma (e.g., lymphangiosarcoma, lymphangioendotheliosarcoma, hemangiosarcoma); appendix cancer; benign monoclonal gammopathy; biliary cancer (e.g., cholangiocarcinoma); bladder cancer; breast cancer (e.g., adenocarcinoma of the breast, papillary carcinoma of the breast, mammary cancer, medullary carcinoma of the breast); brain cancer (e.g., meningioma, glioblastomas, glioma (e.g., astrocytoma, oligodendroglioma), medulloblastoma); bronchus cancer; carcinoid tumor; cervical cancer (e.g., cervical adenocarcinoma); choriocarcinoma; chordoma; craniopharyngioma; connective tissue cancer; epithelial carcinoma; ependymoma; endotheliosarcoma (e.g., Kaposi's sarcoma, multiple idiopathic hemorrhagic sarcoma); endometrial cancer (e.g., uterine cancer, uterine sarcoma); esophageal cancer (e.g., adenocarcinoma of the esophagus, Barrett's adenocarcinoma); Ewing's sarcoma; eye cancer (e.g., intraocular melanoma, retinoblastoma); familiar hypereosinophilia; gall bladder cancer; gastric cancer (e.g., stomach adenocarcinoma); gastrointestinal stromal tumor (GIST); germ cell cancer; head and neck cancer (e.g., head and neck squamous cell carcinoma, oral cancer (e.g., oral squamous cell carcinoma), throat cancer (e.g., laryngeal cancer, pharyngeal cancer, nasopharyngeal cancer, oropharyngeal cancer)); hematopoietic cancers (e.g., leukemia such as acute lymphocytic leukemia (ALL) (e.g., B cell ALL, T cell ALL), acute myelocytic leukemia (AML) (e.g., B cell AML, T cell AML), chronic myelocytic leukemia (CML) (e.g., B cell CML, T cell CML), and chronic lymphocytic leukemia (CLL) (e.g., B cell CLL, T cell CLL)); lymphoma such as Hodgkin lymphoma (HL) (e.g., B cell HL, T cell HL) and non Hodgkin lymphoma (NHL) (e.g., B cell NHL such as diffuse large cell lymphoma (DLCL) (e.g., diffuse large B cell lymphoma), follicular lymphoma, chronic lymphocytic leukemia/small lymphocytic lymphoma (CLL/SLL), mantle cell lymphoma (MCL), marginal zone B cell lymphomas (e.g., mucosa associated lymphoid tissue (MALT) lymphomas, nodal marginal zone B cell lymphoma, splenic marginal zone B cell lymphoma), primary mediastinal B cell lymphoma, Burkitt lymphoma, lymphoplasmacytic lymphoma (e.g., Waldenström's macroglobulinemia), hairy cell leukemia (HCL), immunoblastic large cell lymphoma, precursor B lymphoblastic lymphoma and primary central nervous system (CNS) lymphoma; and T cell NHL such as precursor T lymphoblastic lymphoma/leukemia, peripheral T cell lymphoma (PTCL) (e.g., cutaneous T cell lymphoma (CTCL) (e.g., mycosis fungoides, Sezary syndrome), angioimmunoblastic T cell lymphoma, extranodal natural killer T cell lymphoma, enteropathy type T cell lymphoma, subcutaneous panniculitis like T cell lymphoma, and anaplastic large cell lymphoma); a mixture of one or more leukemia/lymphoma as described above; and multiple myeloma (MM)), heavy chain disease (e.g., alpha chain disease, gamma chain disease, mu chain disease); hemangioblastoma; hypopharynx cancer; inflammatory myofibroblastic tumors; immunocytic amyloidosis; kidney cancer (e.g., nephroblastoma a.k.a. Wilms' tumor, renal cell carcinoma); liver cancer (e.g., hepatocellular cancer (HCC), malignant hepatoma); lung cancer (e.g., bronchogenic carcinoma, small cell lung cancer (SCLC), non small cell lung cancer (NSCLC), adenocarcinoma of the lung); leiomyosarcoma (LMS); mastocytosis (e.g., systemic mastocytosis); muscle cancer; myelodysplastic syndrome (MDS); mesothelioma; myeloproliferative disorder (MPD) (e.g., polycythemia vera (PV), essential thrombocytosis (ET), agnogenic myeloid metaplasia (AMM) a.k.a. myelofibrosis (MF), chronic idiopathic myelofibrosis, chronic myelocytic leukemia (CML), chronic neutrophilic leukemia (CNL), hypereosinophilic syndrome (HES); neuroblastoma; neurofibroma (e.g., neurofibromatosis (NF) type 1 or type 2, schwannomatosis); neuroendocrine cancer (e.g., gastroenteropancreatic neuroendocrine tumor (GEP NET), carcinoid tumor); osteosarcoma (e.g., bone cancer); ovarian cancer (e.g., cystadenocarcinoma, ovarian embryonal carcinoma, ovarian adenocarcinoma); papillary adenocarcinoma; pancreatic cancer (e.g., pancreatic adenocarcinoma, intraductal papillary mucinous neoplasm (IPMN), Islet cell tumors); penile cancer (e.g., Paget's disease of the penis and scrotum); pinealoma; primitive neuroectodermal tumor (PNT); plasma cell neoplasia; paraneoplastic syndromes; intraepithelial neoplasms; prostate cancer (e.g., prostate adenocarcinoma); rectal cancer; rhabdomyosarcoma; salivary gland cancer; skin cancer (e.g., squamous cell carcinoma (SCC), keratoacanthoma (KA), melanoma, basal cell carcinoma (BCC)); small bowel cancer (e.g., appendix cancer); soft tissue sarcoma (e.g., malignant fibrous histiocytoma (MFH), liposarcoma, malignant peripheral nerve sheath tumor (MPNST), chondrosarcoma, fibrosarcoma, myxosarcoma); sebaceous gland carcinoma; small intestine cancer; sweat gland carcinoma; synovioma; testicular cancer (e.g., seminoma, testicular embryonal carcinoma); thyroid cancer (e.g., papillary carcinoma of the thyroid, papillary thyroid carcinoma (PTC), medullary thyroid cancer); urethral cancer; vaginal cancer; and vulvar cancer (e.g., Paget's disease of the vulva).

As used herein, a "control" is an alternative sample used in an experiment for comparison purpose. A control can be "positive" or "negative."

As used herein, "radiolabel" refers to a moiety comprising a radioactive isotope of at least one element. Exemplary suitable radiolabels include but are not limited to those described herein. In some embodiments, a radiolabel is one used in positron emission tomography (PET). In some embodiments, a radiolabel is one used in single-photon emission computed tomography (SPECT). In some embodiments, radioisotopes comprise $^{18}$F (in the form of [$^{18}$F]—AlF$^{2+}$), $^{60}$Cu$^{2+}$, $^{61}$Cu$^{2+}$, $^{62}$Cu$^{2+}$, $^{64}$Cu$^{2+}$, $^{67}$Cu$^{2+}$, $^{67}$Ga$^{3+}$, $^{68}$Ga$^{3+}$, $^{69}$Ga$^{3+}$, or $^{71}$Ga$^{3+}$.

As used herein, the term "sample" refers to clinical samples obtained from a subject or isolated microorganisms. In certain embodiments, a sample is obtained from a biological source (i.e., a "biological sample"), such as tissue, bodily fluid, or microorganisms collected from a subject. Sample sources include, but are not limited to, mucus, sputum, bronchial alveolar lavage (BAL), bronchial wash (BW), whole blood, bodily fluids, cerebrospinal fluid (CSF), urine, plasma, serum, or tissue.

As used herein, the terms "subject," "individual," or "patient" are used interchangeably and refer to an individual organism, a vertebrate, a mammal, or a human. In certain embodiments, the individual, patient or subject is a human.

In general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group is substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, aryloxy, aralkyloxy, heterocyclyl, heterocyclylalkyl, heterocyclyloxy, and heterocyclylalkoxy groups; carbonyls (oxo); carboxylates; esters; urethanes; oximes; hydroxylamines; alkoxyamines; aralkoxyamines; thiols; sulfides; sulfoxides; sulfones; sulfonyls; pentafluorosulfanyl (i.e., SF$_5$), sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Substituted ring groups such as substituted cycloalkyl, aryl, heterocyclyl and heteroaryl groups also include rings and ring systems in which a bond to a hydrogen atom is replaced with a bond to a carbon atom. Therefore, substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some embodiments, from 1 to 8, 1 to 6, or 1 to 4 carbon atoms. Alkyl groups may be substituted or unsubstituted. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above, and include without limitation haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

Groups described herein having two or more points of attachment (i.e., divalent, trivalent, or polyvalent) within the compound of the present technology are designated by use of the suffix, "ene." For example, divalent alkyl groups are alkylene groups, divalent aryl groups are arylene groups, divalent heteroaryl groups are divalent heteroarylene groups, and so forth. Substituted groups having a single point of attachment to the compound of the present technology are not referred to using the "ene" designation. Thus, e.g., chloroethyl is not referred to herein as chloroethylene.

The term "halogen" or "halo" as used herein refers to bromine, chlorine, fluorine, or iodine. In some embodiments, the halogen is fluorine. In other embodiments, the halogen is chlorine or bromine.

The term "hydroxyl" as used herein can refer to —OH or its ionized form, —O$^-$. A "hydroxyalkyl" group is a hydroxyl-substituted alkyl group, such as HO—CH$_2$—.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

Pharmaceutically acceptable salts of compounds described herein are within the scope of the present technology and include acid or base addition salts which retain the desired pharmacological activity and is not biologically undesirable (e.g., the salt is not unduly toxic, allergenic, or irritating, and is bioavailable). When the compound of the present technology has a basic group, such as, for example, an amino group, pharmaceutically acceptable salts can be formed with inorganic acids (such as hydrochloric acid, hydroboric acid, nitric acid, sulfuric acid, and phosphoric acid), organic acids (e.g., alginate, formic acid, acetic acid, trifluoroacetic acid, benzoic acid, gluconic acid, fumaric acid, oxalic acid, tartaric acid, lactic acid, maleic acid, citric acid, succinic acid, malic acid, methanesulfonic acid, benzenesulfonic acid, naphthalene sulfonic acid, and p-toluenesulfonic acid) or acidic amino acids (such as aspartic acid and glutamic acid). When the compound of the present technology has an acidic group, such as for example, a carboxylic acid group, it can form salts with metals, such as alkali and alkaline earth metals (e.g., Na$^+$, Li$^+$, K$^+$, Ca$^{2+}$, Mg$^{2+}$, Zn$^{2+}$), ammonia or organic amines (e.g., dicyclohexylamine, trimethylamine, triethylamine, pyridine, picoline, ethanolamine, diethanolamine, triethanolamine) or basic amino acids (e.g., arginine, lysine and ornithine). Such salts can be prepared in situ during isolation and purification of the compounds or by separately reacting the purified compound in its free base or free acid form with a suitable acid or base, respectively, and isolating the salt thus formed.

Those of skill in the art will appreciate that compounds of the present technology may exhibit the phenomena of tautomerism, conformational isomerism, geometric isomerism and/or stereoisomerism. As the formula drawings within the specification and claims can represent only one of the possible tautomeric, conformational isomeric, stereochemical or geometric isomeric forms, it should be understood that the present technology encompasses any tautomeric, conformational isomeric, stereochemical and/or geometric isomeric forms of the compounds having one or more of the utilities described herein, as well as mixtures of these various different forms.

"Tautomers" refers to isomeric forms of a compound that are in equilibrium with each other. The presence and concentrations of the isomeric forms will depend on the environment the compound is found in and may be different depending upon, for example, whether the compound is a solid or is in an organic or aqueous solution. For example, in aqueous solution, quinazolinones may exhibit the following isomeric forms, which are referred to as tautomers of each other:

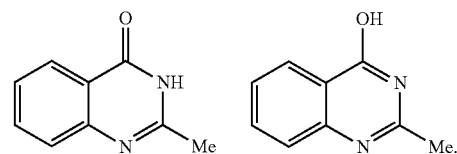

As another example, guanidines may exhibit the following isomeric forms in protic organic solution, also referred to as tautomers of each other:

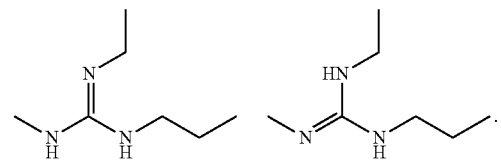

Because of the limits of representing compounds by structural formulas, it is to be understood that all chemical formulas of the compounds described herein represent all tautomeric forms of compounds and are within the scope of the present technology.

Stereoisomers of compounds (also known as optical isomers) include all chiral, diastereomeric, and racemic forms of a structure, unless the specific stereochemistry is expressly indicated. Thus, compounds used in the present technology include enriched or resolved optical isomers at any or all asymmetric atoms as are apparent from the depictions. Both racemic and diastereomeric mixtures, as well as the individual optical isomers can be isolated or synthesized so as to be substantially free of their enantiomeric or diastereomeric partners, and these stereoisomers are all within the scope of the present technology.

The compounds of the present technology may exist as solvates, especially hydrates. Hydrates may form during manufacture of the compounds or compositions comprising the compounds, or hydrates may form over time due to the hygroscopic nature of the compounds. Compounds of the present technology may exist as organic solvates as well, including DMF, ether, and alcohol solvates among others. The identification and preparation of any particular solvate is within the skill of the ordinary artisan of synthetic organic or medicinal chemistry Compositions of the Present Technology pH (low) insertion peptides represent a unique class of delivery agents that can target acidic malignant tissue. Without being bound by theory, the molecular mechanism of targeting is based on the pH-dependent formation of a transmembrane alpha helix, which is accompanied by the insertion of pH (low) insertion peptides into the cellular membrane in environments with relatively low extracellular pH. FIG. 1 shows three folding states of pH (low) insertion peptides in decreasing extracellular pH: unfolded and unbound peptide in solution (State I), unfolded peptide loosely interacting with the membrane lipid bilayer at physiological pH (State II), and folded peptide in alpha-helical conformation inserted across the membrane at low extracellular pH (State III).

In an aspect, a compound or pharmaceutically acceptable salt thereof is provided, where the compound includes a pH (low) insertion peptide ("pHLIP") configured to localize to an extracellular environment having a pH that is lower than 7.4, wherein the pHLIP comprises a C-terminus and an N-terminus; and $X^1$ covalently attached to a heteroatom of a side chain of an amino acid residue of the pHLIP, where the amino acid residue is from 0, 1, 2, 3, 4, 5, or 6 residues from the C-terminus or the N-terminus. An amino acid residue that is 0 residues from the N-terminus will be understood to mean the amino acid residue is the N-terminal residue. Similarly, an amino acid residue that is 0 residues from the C-terminus will be understood to mean the amino acid residue is the C-terminal residue. The extracellular environment may have a pH that is lower than 7.1. For example, the extracellular environment may have a pH that is 7.1, 7.0, 6.9, 6.8, 6.6, 6.4, 6.2, 6.0, 5.8, 5.6, 5.4, 5.2, 5.0, 4.8, 4.6, 4.4, 4.2, 4.0, 3.8, 3.6, 3.4, 3.2, 3.0, 2.8, 2.6, 2.4, 2.2, 2.0, 1.8, 1.6, 1.4, 1.2, 1.0, or any range including and/or in between any two of these values. A tissue may include the extracellular environment. Such tissues include, but are not limited to, atherosclerotic plaques, ischemic myocardium, tissues impacted by stroke, and cancer tissues (such as solid tumors). Exemplary cancer tissues include, but are not limited to, breast cancer, colorectal cancer, cervical cancer, ovarian cancer, liver cancer, bladder cancer, hepatoma, hepatocellular carcinoma, brain tumors, lung cancer, gastric or stomach cancer, pancreatic cancer, thyroid cancer, kidney or renal cancer, prostate cancer, melanoma, sarcomas, carcinomas, Wilms tumor, endometrial cancer, glioblastoma, squamous cell cancer, astrocytomas, salivary gland carcinoma, vulvar cancer, penile carcinoma, and head-and-neck cancer; the cancer tissue may be breast cancer, a brain tumor, prostate cancer, melanoma, or a metastatic cancer thereof.

In the composition, $X^1$ is of Formula I

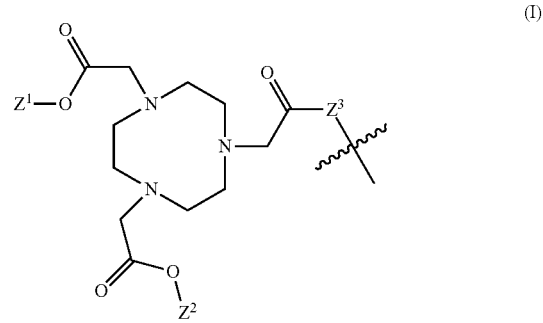

where $Z^1$ and $Z^2$ are each independently a lone pair of electrons (i.e. providing an oxygen anion) or H; and $Z^3$ is —NH-alkylene-, —NH—CH$_2$CH$_2$-((poly(alkylene glycol))-,

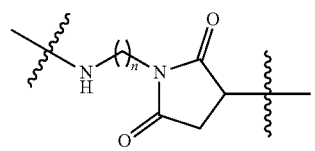

where n is 1, 2, 3, 4, 5, 6, 7, or 8, or a bond. $Z^3$ may be —NH—(CH$_2$)$_m$—, —NH—CH$_2$CH$_2$—(O—CH$_2$CH$_2$)$_p$—,

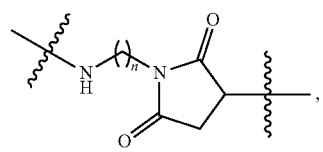

or a bond, where n is 1, 2, 3, 4, 5, 6, 7, or 8; m is 1, 2, 3, 4, 5, 6, 7, or 8; and p is 1, 2, 3, 4, 5, 6, 7, or 8. In any embodiment herein, $X^1$ may be of Formula Ia

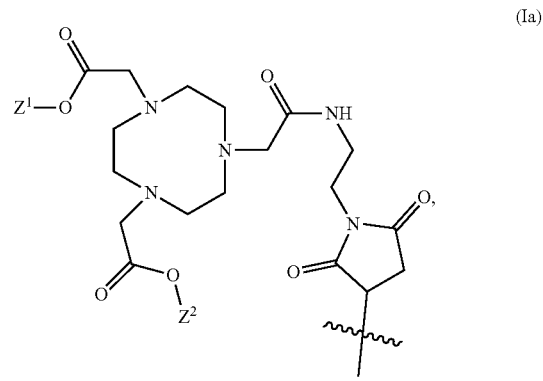

where $Z^1$ and $Z^2$ are each independently a lone pair of electrons (i.e. providing an oxygen anion) or H.

The pHLIP may be any one described in U.S. Pat. Nos. 8,076,451, 8,703,909, 8,846,081, 9,676,823, and 9,289,508, each of which are incorporated herein by reference for any and all purposes, as well as U.S. Patent Application Nos. 2015/0086617 and 2016/0256560, each of which are incorporated herein by reference for any and all purposes. The amino acid residue of the pHLIP (to which heteroatom of the side chain $X^1$ is covalently attached) may be a cysteine or lysine. In any embodiment herein, the $X^1$ may be covalently attached to a sulfur atom of a cysteine residue of the pHLIP or is covalently attached to a ε-nitrogen atom of a lysine residue the pHLIP. For sake a clarity, a representation of the amino acid lysine is provided below indicating the ε-nitrogen atom.

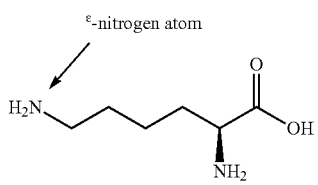

In any embodiment herein, the pHLIP may be

```
                                            (SEQ ID NO: 1)
ACEQNPIYWARYADWLFTTPLLLLDLALLVDADEGT, (SEQ ID NO: 2)
ACDDQNPWRAYLDLLFPTDTLLLDLLW, (SEQ ID NO: 3)
ADDQNPWRAYLDLLFPTDTLLLDLLWCG,
or (SEQ ID NO: 4)
ACEEQNPWARYLEWLFPTETLLLEL.
```

In any embodiment herein, the composition of the present technology may be AC(X$^1$)EQNPIYWARY-ADWLFTTPLLLLDLALLVDADEGT (SEQ ID NO:5), AC(X$^1$)DDQNPWRAYLDLLFPTDTLLLDLLW (SEQ ID NO:6), ADDQNPWRAYLDLLFPTDTLLLDLLWC(X$^1$)G (SEQ ID NO:7), AC(X$^1$)EEQNPWARYLEWLFPTETLL-LEL (SEQ ID NO:8), or a pharmaceutically acceptable salt of any one of these. For example, the composition may be AC(X$^1$)DDQNPWRAYLDLLFPTDTLLLDLLW (SEQ ID NO:6), or ADDQNPWRAYLDLLFPTDTLLLDLLWC(X$^1$)G (SEQ ID NO:7) where $X^1$ is of Formula Ia.

In a related aspect, a complex is provided that includes any embodiment of the composition described herein and a radionuclide. In such a complex, $X^1$ may be of Formula II

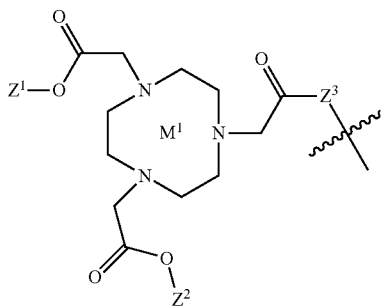

where $Z^1$ and $Z^2$ are each independently a lone pair of electrons (i.e. providing an oxygen anion) or H; $Z^3$ is —NH-alkylene-, —NH—CH$_2$CH$_2$-((poly(alkylene glycol))-,

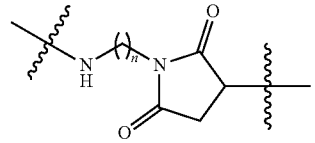

where n is 1, 2, 3, 4, 5, 6, 7, or 8, or a bond; and $M^1$ is $^{60}$Cu$^{2+}$, $^{61}$Cu$^{2+}$, $^{62}$Cu$^{2+}$, $^{64}$Cu$^{2+}$, $^{67}$Cu$^{2+}$, [$^{18}$F]—AlF$^{2+}$, $^{67}$Ga$^{3+}$, $^{68}$Ga$^{3+}$, $^{69}$Ga$^{3+}$, or $^{71}$Ga$^{3+}$. In any embodiment herein, $X^1$ may be of Formula IIa

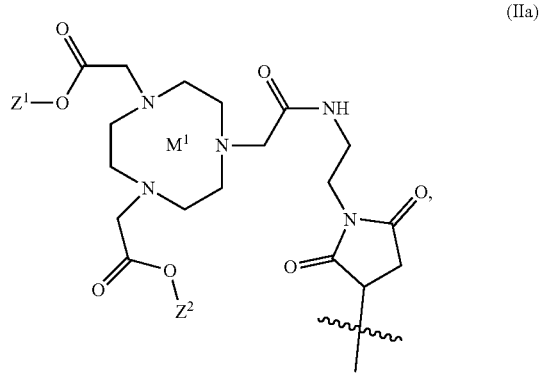

where $Z^1$ and $Z^2$ are each independently a lone pair of electrons (i.e. providing an oxygen anion) or H; and $M^1$ is $^{60}$Cu$^{2+}$, $^{61}$Cu$^{2+}$, $^{62}$Cu$^{2+}$, $^{64}$Cu$^{2+}$, $^{67}$Cu$^{2+}$, [$^{18}$F]—AlF$^{2+}$, $^{67}$Ga$^{3+}$, $^{68}$Ga$^{3+}$, $^{69}$Ga$^{3+}$, or $^{71}$Ga$^{3+}$. For example, the complex may be AC(X$^1$)DDQNPWRAYLDLLFPTDTLLLD-LLW (SEQ ID NO:6), or ADDQNPWRAYLDLL-FPTDTLLLDLLWC(X$^1$)G (SEQ ID NO:7) where $X^1$ is of Formula IIa and $M^1$ is [$^{18}$F]—AlF$^{2+}$.

In another related aspect of the present technology, a composition is provided that includes any one of the aspects and embodiments of compounds and/or complexes and a pharmaceutically acceptable carrier. As used herein, a "pharmaceutically acceptable carrier" includes carriers and/or excipients. In a further related aspect, a pharmaceutical composition is provided, the pharmaceutical composition including an effective amount of any one of the embodiments of the complexes described herein for imaging a tissue comprising an extracellular environment having a pH that is lower than 7.4 (or any value or range disclosed herein) and a pharmaceutically acceptable carrier. The tissue may be an atherosclerotic plaque, an ischemic myocardium, a tissue impacted by stroke, and/or a cancer tissue (such as a solid tumor). Exemplary cancer tissues (and exemplary solid tumors of such tissues) include, but are not limited to, breast cancer, colorectal cancer, cervical cancer, ovarian cancer, liver cancer, bladder cancer, hepatoma, hepatocellular carcinoma, brain tumors, lung cancer, gastric or stomach cancer, pancreatic cancer, thyroid cancer, kidney or renal cancer, prostate cancer, melanoma, sarcomas, carcinomas, Wilms tumor, endometrial cancer, glioblastoma, squamous cell cancer, astrocytomas, salivary gland carcinoma, vulvar cancer, penile carcinoma, and head-and-neck cancer; the cancer tissue may be breast cancer, a brain tumor, prostate cancer, melanoma, or a metastatic cancer thereof. Such compositions and pharmaceutical compositions may be used in any method described herein.

"Effective amount" refers to the amount of a complex required to produce a desired effect, such as a quantity of a complex of the present technology necessary to be detected by the detection method chosen. For example, an effective amount of a complex of the present technology includes an amount sufficient to enable detection of binding of the complex to a target of interest including, but not limited to, one or more of an atherosclerotic plaque, an ischemic myocardium, a tissue impacted by stroke, and/or a cancer tissue (such as a solid tumor). Another example of an effective amount includes amounts or dosages that are capable of providing a detectable positron emission and/or gamma ray emission from positron emission and annihilation (above background) in a subject with a tissue comprising an extracellular environment having a pH that is lower than 7.4, such as, for example, statistically significant emission above background. As used herein, a "subject" or "patient" is a mammal, such as a cat, dog, rodent or primate. Typically the subject is a human, and, preferably, a human suffering from or suspected of suffering from a condition that includes a tissue including an extracellular environment having a pH that is lower than 7.4 as described herein. The term "subject" and "patient" may be used interchangeably.

The instant present technology provides pharmaceutical compositions and medicaments comprising any of the compounds or complexes disclosed herein and a pharmaceutically acceptable carrier or one or more excipients or fillers (collectively, such carriers, excipients, fillers, etc., will be referred to as "pharmaceutically acceptable carriers" unless a more specific term is used). The compositions may be used in the methods and imagings described herein. Such compositions and medicaments include an effective amount of any complex as described herein for imaging one or more of the herein-described tissues. The pharmaceutical composition may be packaged in unit dosage form. For example, the unit dosage form is effective in imaging a tissue including an extracellular environment having a pH that is lower than 7.4 when administered to a subject.

The pharmaceutical compositions and medicaments may be prepared by mixing one or more compounds or complexes of the present technology, pharmaceutically acceptable salts thereof, stereoisomers thereof, tautomers thereof, or solvates thereof, with pharmaceutically acceptable carriers, excipients, binders, diluents or the like to image disorders associated with a tissue that includes an extracellular environment having a pH that is lower than 7.4 when administered to a subject. The compounds and complexes described herein may be used to prepare formulations and medicaments for imaging a variety of disorders associated with a tissue comprising an extracellular environment having a pH that is lower than 7.4. Such compositions can be in the form of, for example, granules, powders, tablets, capsules, syrup, suppositories, injections, emulsions, elixirs, suspensions or solutions. The instant compositions can be formulated for various routes of administration, for example, by oral, parenteral, topical, rectal, nasal, vaginal administration, or via implanted reservoir. Parenteral or systemic administration includes, but is not limited to, subcutaneous, intravenous, intraperitoneal, and intramuscular, injections. The following dosage forms are given by way of example and should not be construed as limiting the instant present technology.

For oral, buccal, and sublingual administration, powders, suspensions, granules, tablets, pills, capsules, gelcaps, and caplets are acceptable as solid dosage forms. These can be prepared, for example, by mixing one or more compounds or complexes of the instant present technology, or pharmaceutically acceptable salts or tautomers thereof, with at least one additive such as a starch or other additive. Suitable additives are sucrose, lactose, cellulose sugar, mannitol, maltitol, dextran, starch, agar, alginates, chitins, chitosans, pectins, tragacanth gum, gum arabic, gelatins, collagens, casein, albumin, synthetic or semi-synthetic polymers or glycerides. Optionally, oral dosage forms can contain other ingredients to aid in administration, such as an inactive diluent, or lubricants such as magnesium stearate, or preservatives such as paraben or sorbic acid, or anti-oxidants such as ascorbic acid, tocopherol or cysteine, a disintegrating agent, binders, thickeners, buffers, sweeteners, flavoring agents or perfuming agents. Tablets and pills may be further treated with suitable coating materials known in the art.

Liquid dosage forms for oral administration may be in the form of pharmaceutically acceptable emulsions, syrups, elixirs, suspensions, and solutions, which may contain an inactive diluent, such as water. Pharmaceutical formulations and medicaments may be prepared as liquid suspensions or solutions using a sterile liquid, such as, but not limited to, an oil, water, an alcohol, and combinations of these. Pharmaceutically suitable surfactants, suspending agents, emulsifying agents, may be added for oral or parenteral administration.

As noted above, suspensions may include oils. Such oils include, but are not limited to, peanut oil, sesame oil, cottonseed oil, corn oil and olive oil. Suspension preparation may also contain esters of fatty acids such as ethyl oleate, isopropyl myristate, fatty acid glycerides and acetylated fatty acid glycerides. Suspension formulations may include alcohols, such as, but not limited to, ethanol, isopropyl alcohol, hexadecyl alcohol, glycerol and propylene glycol. Ethers, such as but not limited to, poly(ethyleneglycol), petroleum hydrocarbons such as mineral oil and petrolatum; and water may also be used in suspension formulations.

Injectable dosage forms generally include aqueous suspensions or oil suspensions which may be prepared using a suitable dispersant or wetting agent and a suspending agent. Injectable forms may be in solution phase or in the form of a suspension, which is prepared with a solvent or diluent. Acceptable solvents or vehicles include sterilized water, Ringer's solution, or an isotonic aqueous saline solution. An isotonic solution will be understood as isotonic with the subject. Alternatively, sterile oils may be employed as solvents or suspending agents. Typically, the oil or fatty acid is non-volatile, including natural or synthetic oils, fatty acids, mono-, di- or tri-glycerides.

For injection, the pharmaceutical formulation and/or medicament may be a powder suitable for reconstitution with an appropriate solution as described above. Examples of these include, but are not limited to, freeze dried, rotary dried or spray dried powders, amorphous powders, granules, precipitates, or particulates. For injection, the formulations may optionally contain stabilizers, pH modifiers, surfactants, bioavailability modifiers and combinations of these.

Complexes of the present technology may be administered to the lungs by inhalation through the nose or mouth. Suitable pharmaceutical formulations for inhalation include solutions, sprays, dry powders, or aerosols containing any appropriate solvents and optionally other compounds such as, but not limited to, stabilizers, antimicrobial agents, antioxidants, pH modifiers, surfactants, bioavailability modifiers and combinations of these. The carriers and stabilizers vary with the requirements of the particular complex, but typically include nonionic surfactants (Tweens, Pluronics, or polyethylene glycol), innocuous proteins like serum albumin, sorbitan esters, oleic acid, lecithin, amino acids such as glycine, buffers, salts, sugars or sugar alcohols. Aqueous and nonaqueous (e.g., in a fluorocarbon propellant) aerosols are typically used for delivery of complexes of the present technology by inhalation.

Dosage forms for the topical (including buccal and sublingual) or transdermal administration of complexes of the present technology include powders, sprays, ointments, pastes, creams, lotions, gels, solutions, and patches. The active component may be mixed under sterile conditions with a pharmaceutically-acceptable carrier or excipient, and with any preservatives, or buffers, which may be required. Powders and sprays can be prepared, for example, with excipients such as lactose, talc, silicic acid, aluminum hydroxide, calcium silicates and polyamide powder, or mixtures of these substances. The ointments, pastes, creams and gels may also contain excipients such as animal and vegetable fats, oils, waxes, paraffins, starch, tragacanth, cellulose derivatives, polyethylene glycols, silicones, bentonites, silicic acid, talc and zinc oxide, or mixtures thereof. Absorption enhancers can also be used to increase the flux of the compounds and complexes of the present technology across the skin. The rate of such flux can be controlled by either providing a rate controlling membrane (e.g., as part of a transdermal patch) or dispersing the compound and/or complex in a polymer matrix or gel.

Besides those representative dosage forms described above, pharmaceutically acceptable excipients and carriers are generally known to those skilled in the art and are thus included in the instant present technology. Such excipients and carriers are described, for example, in "Remingtons Pharmaceutical Sciences" Mack Pub. Co., New Jersey (1991), which is incorporated herein by reference.

The formulations of the present technology may be designed to be short-acting, fast-releasing, long-acting, and sustained-releasing as described below. Thus, the pharmaceutical formulations may also be formulated for controlled release or for slow release.

The instant compositions may also comprise, for example, micelles or liposomes, or some other encapsulated form, or may be administered in an extended release form to provide a prolonged storage and/or delivery effect. Therefore, the pharmaceutical formulations and medicaments may be compressed into pellets or cylinders and implanted intramuscularly or subcutaneously as depot injections or as implants such as stents. Such implants may employ known inert materials such as silicones and biodegradable polymers.

Specific dosages may be adjusted depending on conditions of disease, the age, body weight, general health conditions, sex, and diet of the subject, dose intervals, administration routes, excretion rate, and combinations of drugs. Any of the above dosage forms containing effective amounts are well within the bounds of routine experimentation and therefore, well within the scope of the instant present technology.

Those skilled in the art are readily able to determine an effective amount by simply administering a complex of the present technology to a patient in increasing amounts until, for example, statistically significant resolution (via, e.g., positron emission tomography) of a tissue comprising an extracellular environment having a pH that is lower than 7.4 is achieved. The complexes of the present technology may be administered to a patient at dosage levels in the range of about 0.1 to about 1,000 mg per day. For a normal human adult having a body weight of about 70 kg, a dosage in the range of about 0.01 to about 100 mg per kg of body weight per day is sufficient. The specific dosage used, however, can vary or may be adjusted as considered appropriate by those of ordinary skill in the art. For example, the dosage can depend on a number of factors including the requirements of the patient, the severity of the condition being imaged, and the pharmacological activity of the complex being used. The determination of optimum dosages for a particular patient is well known to those skilled in the art. Various assays and model systems can be readily employed to determine the effectiveness of a complex according to the present technology.

The complexes of the present technology can also be administered to a patient along with other conventional imaging agents that may be useful in the imaging of a tissue that includes an extracellular environment having a pH that is lower than 7.4. Such tissues include, but are not limited to, an atherosclerotic plaque, an ischemic myocardium, a tissue impacted by stroke, and/or a cancer tissue (such as a solid tumor). Exemplary cancer tissues (and exemplary solid tumors of such tissues) include, but are not limited to, breast cancer, colorectal cancer, cervical cancer, ovarian cancer, liver cancer, bladder cancer, hepatoma, hepatocellular carcinoma, brain tumors, lung cancer, gastric or stomach cancer, pancreatic cancer, thyroid cancer, kidney or renal cancer, prostate cancer, melanoma, sarcomas, carcinomas, Wilms tumor, endometrial cancer, glioblastoma, squamous cell cancer, astrocytomas, salivary gland carcinoma, vulvar cancer, penile carcinoma, and head-and-neck cancer; the cancer tissue may be breast cancer, a brain tumor, prostate cancer, melanoma, or a metastatic cancer thereof. Thus, a pharmaceutical composition of the present technology may further include an imaging agent different than the complex of the present technology. The administration may include oral administration, parenteral administration, or nasal administration. In any of these embodiments, the administration may be intravenously, intramuscularly, intraarterially, intrathecally, intracapsularly, intradermally, intraperitoneally, intralesionally, subcutaneously, intracerebroventricularly, orally, intranasally, rectally, topically, or via inhalation. The methods of the present technology may also include administering, either sequentially or in combination with one or more complexes of the present technology, a conventional imaging agent in an amount that can potentially or synergistically be effective for the imaging of a tissue comprising an extracellular environment having a pH that is lower than 7.4.

In an aspect, a complex of the present technology is administered to a patient in an amount or dosage suitable for imaging. Generally, a unit dosage comprising a complex of the present technology will vary depending on patient considerations. Such considerations include, for example, age, protocol, condition, sex, extent of disease, contraindications, concomitant therapies and the like. An exemplary unit dosage based on these considerations can also be adjusted or modified by a physician skilled in the art. For example, a unit dosage for a patient comprising a complex of the present technology can vary from $1 \times 10^{-4}$ g/kg to 1 g/kg, preferably, $1 \times 10^{-3}$ g/kg to 1.0 g/kg. Dosage of a complex of the present technology can also vary from 0.01 mg/kg to 100 mg/kg or, preferably, from 0.1 mg/kg to 10 mg/kg.

The terms "associated" and/or "binding" can mean a chemical or physical interaction, for example, between a compound or complex of the present technology and a target of interest. Examples of associations or interactions include covalent bonds, ionic bonds, hydrophilic-hydrophilic interactions, hydrophobic-hydrophobic interactions and complexes. Associated can also refer generally to "binding" or "affinity" as each can be used to describe various chemical or physical interactions. Measuring binding or affinity is also routine to those skilled in the art. For example, complexes of the present technology can bind to or interact with a target of interest or precursors, portions, fragments and peptides thereof and/or their deposits.

Diagnostic Methods of the Present Technology

In one aspect, the present disclosure provides a method for detecting solid tumors in a subject in need thereof comprising (a) administering to the subject an effective amount of a complex of any embodiment described herein, wherein the complex is configured to localize to a solid tumor having an acidic pH environment (that is, an extracellular environment having a pH that is lower than 7.4); and (b) detecting the presence of solid tumors in the subject by detecting radioactive levels emitted by the complex that are higher than a reference value. In some embodiments, the subject is human. In some embodiments, the environment of the solid tumor has a pH value that is 7.1, 7.0, 6.9, 6.8, 6.7, 6.6, 6.5, 6.4, 6.3, 6.2, 6.1, 6.0 or lower. For example, the extracellular environment of the solid tumor may have a pH that is 7.1, 7.0, 6.9, 6.8, 6.6, 6.4, 6.2, 6.0, 5.8, 5.6, 5.4, 5.2, 5.0, 4.8, 4.6, 4.4, 4.2, 4.0, 3.8, 3.6, 3.4, 3.2, 3.0, 2.8, 2.6, 2.4, 2.2, 2.0, 1.8, 1.6, 1.4, 1.2, 1.0, or any range including and/or in between any two of these values.

In some embodiments of the methods disclosed herein, the radioactive levels emitted by the complex are detected using positron emission tomography or single photon emission computed tomography.

Additionally or alternatively, in some embodiments of the methods disclosed herein, the subject is diagnosed with, is at risk for, or is suspected of having cancer. The cancer may be selected from the group consisting of breast cancer, colorectal cancer, cervical cancer, ovarian cancer, liver cancer, bladder cancer, hepatoma, hepatocellular carcinoma, brain tumors, lung cancer, gastric or stomach cancer, pancreatic cancer, thyroid cancer, kidney or renal cancer, prostate cancer, melanoma, sarcomas, carcinomas, Wilms tumor, endometrial cancer, glioblastoma, squamous cell cancer, astrocytomas, salivary gland carcinoma, vulvar cancer, penile carcinoma, and head-and-neck cancer; the cancer may be breast cancer, a brain tumor, prostate cancer, melanoma, or a metastatic cancer thereof.

Additionally or alternatively, in some embodiments of the methods disclosed herein, the complex is administered intravenously, intramuscularly, intraarterially, intrathecally, intracapsularly, intradermally, intraperitoneally, intralesionally, transtracheally, subcutaneously, intracerebroventricularly, orally, intranasally, rectally, topically, or via inhalation. In certain embodiments, the complex is administered into the cerebral spinal fluid or blood of the subject. In some embodiments of the methods disclosed herein, the radioactive levels emitted by the complex are detected between 1 to 48 hours after the complex is administered. For example, the radioactive levels emitted by the complex may be detected at 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, or 48 hours (or any subrange therein) after the complex is administered.

In certain embodiments of the methods disclosed herein, the radioactive levels emitted by the complex are expressed as the percentage injected dose per gram tissue (% ID/g). The reference value may be calculated by measuring the radioactive levels present in non-tumor (normal) tissues, and computing the average radioactive levels present in non-tumor (normal) tissues±standard deviation. In some embodiments, the reference value is the standard uptake value (SUV). See Thie J A, *J Nucl Med.* 45(9): 1431-4 (2004). In some embodiments, the ratio of radioactive levels between a tumor and normal tissue is about 2:1, 3:1, 4:1, 5:1, 6:1, 7:1, 8:1, 9:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1 or 100:1.

The effectiveness of such a complex may be determined by computing the area under the curve (AUC) tumor:AUC normal tissue ratio. In some embodiments, the complex has an area under the curve (AUC) tumor:AUC normal tissue ratio of about 2:1, 3:1, 4:1, 5:1, 6:1, 7:1, 8:1, 9:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1 or 100:1.

In another aspect, the present disclosure provides a method for detecting acidic diseased tissue in a subject in need thereof comprising (a) administering to the subject an effective amount of a complex of any embodiment described herein, wherein the complex is configured to localize to an extracellular environment having a pH that is lower than 7.4; and (b) detecting the presence of acidic diseased tissue (that is, a tissue with an extracellular environment having a pH that is lower than 7.4) in the subject by detecting radioactive levels emitted by the complex that are higher than a reference value. In some embodiments, the subject is human. Examples of acidic diseased tissue include atherosclerotic plaques, ischemic myocardium, tissues impacted by stroke, and tumors. In some embodiments, the extracellular environment of the acidic diseased tissue has a pH value that is 7.3, 7.2, 7.1, 7.0, 6.9, 6.8, 6.7, 6.6, 6.5, 6.4, 6.3, 6.2, 6.1, 6.0 or lower. For example, the extracellular environment of the tissue may have a pH that is 7.1, 7.0, 6.9, 6.8, 6.6, 6.4, 6.2, 6.0, 5.8, 5.6, 5.4, 5.2, 5.0, 4.8, 4.6, 4.4, 4.2, 4.0, 3.8, 3.6, 3.4, 3.2, 3.0, 2.8, 2.6, 2.4, 2.2, 2.0, 1.8, 1.6, 1.4, 1.2, 1.0, or any range including and/or in between any two of these values. The radioactive levels emitted by the complex are expressed as the percentage injected dose per gram tissue (% ID/g).

In some embodiments of the methods disclosed herein, the radioactive levels emitted by the complex are detected using positron emission tomography or single photon emission computed tomography.

Additionally or alternatively, in some embodiments of the methods disclosed herein, the complex is administered intravenously, intramuscularly, intraarterially, intrathecally, intracapsularly, intraorbitally, intradermally, intraperitoneally, intralesionally, subcutaneously, intracerebroventricularly, orally, rectally, topically, vaginally, or via inhalation. In some embodiments of the methods disclosed herein, the radioactive levels emitted by the complex are detected between 1 to 48 hours after the complex is administered. For example, the radioactive levels emitted by the complex may be detected at 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, or 48 hours (or any subrange therein) after the complex is administered.

Kits

The present technology provides kits containing components suitable for diagnosing in a patient a tissue that includes an extracellular environment having a pH that is lower than 7.4, such as an atherosclerotic plaque, an ischemic myocardium, a tissue impacted by stroke, and/or a cancer tissue (such as a solid tumor). In one aspect, the kits include at least one compound or complex of the present technology disclosed herein, instructions for use, and optionally at least one radionuclide. The compound or complex may be provided in the form of a prefilled syringe or autoinjection pen containing a sterile, liquid formulation or lyophilized preparation of the compound or complex (e.g., Kivitz et al., *Clin. Ther.* 28:1619-29 (2006)).

Additionally or alternatively, in some embodiments of the kits of the present technology, the at least one radionuclide includes is selected from among $^{60}Cu^{2+}$, $^{61}Cu^{2+}$, $^{62}Cu^{2+}$, $^{64}Cu^{2+}$, $^{67}Cu^{2+}$, $[^{18}F]$—$AlF^{2+}$, $^{67}Ga^{3+}$, $^{68}Ga^{3+}$, $^{69}Ga^{3+}$, or $^{71}Ga^{3+}$.

If the kit components are not formulated for oral administration, a device capable of delivering the kit components through some other route may be included. Examples of such devices include syringes (for parenteral administration) or inhalation devices. The kit components may be packaged together or separated into two or more containers. In some embodiments, the containers may be vials that contain sterile, lyophilized formulations of a compound or complex of the present technology that are suitable for reconstitution. A kit may also contain one or more buffers suitable for reconstitution and/or dilution of other reagents. Other containers that may be used include, but are not limited to, a pouch, tray, box, tube, or the like. Kit components may be packaged and maintained sterilely within the containers.

EXAMPLES

Example 1: Materials and Methods for Generating the Compounds and Complexes of the Present Technology General. Synthesis of the D-amino acid versions of several NOTA-derivatized pHLIPs were provided by CS Bio (Menlo Park, CA) under instruction of the inventors with >95% purity (combination of both chelators (FIGS. 2A and 2B) with NO2A attached to two positions on Var3 (FIGS. 2B and 2C) and peptide sequences to form the complexes in Table 1: NOTA-WT, NOTA-Var3, NOTA-Var7, NO2A-cysWT, NO2A-cys Var3, NO2A-cysVar7, and NO2A-$C^{27}$Var3). In general, the NOTA-derivatized pHLIPs were synthesized via solid-phase synthesis of the peptide, subsequent removal of the thiol-protecting group, addition of the NO2A-NHS ester (Maleimido-mono-amide-NOTA, B-622, Macrocyclics, Plano, TX, USA), followed by cleavage from the resin before purification and analysis. In the instance of the NOTA-pHLIPs, the peptide was synthesized via solid-phase peptide synthesis and the p-SCN-Bn-NOTA (B-605, Macrocyclics, Plano, TX, USA) was added to react with the N-terminus of the peptide prior to cleaving from the resin. All other chemicals were purchased from commercial suppliers without further purification unless otherwise stated.

Figure 2A:
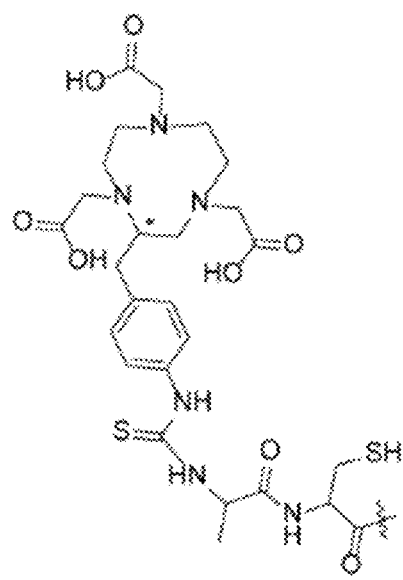
FIG. 2A shows the chelator NOTA-pHLIP.
Figure 2B:
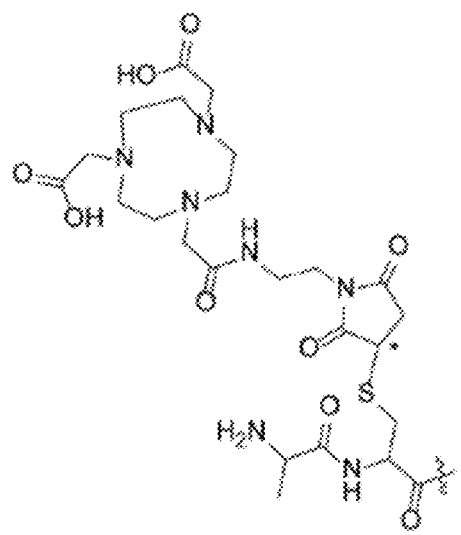
FIG. 2B shows the chelator NO2A-cyspHLIP where the NO2A chelator is attached to the pHLIP through a cysteine at the N-terminus.

Table 1 shows pHLIP sequences from N-terminus and C-terminus with abbreviated name used in FIGS. 2A and 2B. NO2A-cysVar3 or NO2A-$C^2$Var3 is the NO2A-Var3 with the NO2A attached to a cysteine on the N-terminal (extracellular) portion of the peptide. The superscripted 2 represents the cysteine's residue number in the particular pHLIPsequence. NO2A-$C^{27}$Var3 is the NO2A-Var3 with the NO2A attached to a cysteine on the C-terminal (intracellular) portion of the peptide. The superscripted 27 represents the cysteine's residue number in the particular pHLIP sequence.

TABLE 1

| Name(s) | Peptide Sequence* |
|---|---|
| NOTA-WT | (NOTA)-ACEQNPIYWARYADWLFTTPLL LLDLALLVDADEGT (SEQ ID NO: 9) |
| NOTA-Var3 | (NOTA)-ACDDQNPWRAYLDLLFPTDTLL LDLLW (SEQ ID NO: 10) |
| NOTA-Var7 | (NOTA)-ACEEQNPWARYLEWLFPTETLL LEL (SEQ ID NO: 11) |
| NO2A-cysWT (NO2A-$C^2$WT) | AC(NO2A)EQNPIYWARYADWLFTTPLLL LDLALLVDADEGT (SEQ ID NO: 12) |
| NO2A-cysVar3** (NO2A-$C^2$Var3) | AC(NO2A)DDQNPWRAYLDLLFPTDTLLL DLLW (SEQ ID NO: 13) |
| NO2A-$C^{27}$Var3 | ADDQNPWRAYLDLLFPTDTLLLDLLWC (NO2A)G (SEQ ID NO: 14) |
| NO2A-cysVar7** (NO2A-$C^2$Var7) | AC(NO2A)EEQNPWARYLEWLFPTETLLL EL (SEQ ID NO: 15) |

*NO2A is listed in Macrocyclic's catalog (B-622) as the name: Maleimido-mono-amide-NOTA.
NO2A is also known as 1,4,7-Triazacyclononane-1,4-bis-acetic acid-7-maleimidoethylacetamide.
**In prior literature, Var3 was referred to as Short3D and Var7 was referred to as Short3E.

Labeling methods for $^{64}$Cu-NOTA-pHLIP. Following a preparation similar to Zeglis et al., *J. Nuc. Med.* 54(8):1389-1396 (2013), 3.13-11.26 mCi (116-417 MBq) of $^{64}$Cu in 0.1 M HCl (2.5-6.0 µL, 1.86×10$^4$-1.25×10$^4$ mCi/µmol, Washington University, St. Louis, MO) was added to 150 µL of 100 mM NH$_4$OAc buffer (pH~5.5). An aliquot (25-37 µL) of NOTA-PHILIP derivative (0.46-0.63 mM) in DMSO was added to the pH adjusted $^{64}$Cu solution. The solution was placed on a thermomixer (Eppendorf, Hamberg, Germany) at 80° C. for 15 min at 1100 rpm. An aliquot of the crude product mixture was HPLC-analyzed (5-95% acetonitrile in water (with 0.1% trifluoroacetic acid) over 15 min, Jupiter C-18 column, Phenomenex, 250 mm×4.6 mm, 5 µm, 300 Å) to ensure that product was present ($^{64}$Cu-NOTA-pHLIP eluted at 10.3 min; $^{64}$Cu-NO2A-cyspHLIP eluted at 13.1 min). The remainder of the reaction mixture was separated using a pretreated Oasis HLB Plus Light or C18 Sep-Pak Light cartridge (Waters, Milford, MA). Free and unbound $^{64}$Cu was removed by washing the cartridge with 5 mL of water. The pure $^{64}$Cu-labeled NOTA-pHLIP derivatives were then eluted with 1 mL ethanol in 0.1 mL fractions. The ethanolic fractions with the highest activities were combined and diluted with sterile phosphate buffered saline (PBS) to provide <10% ethanol in the solution before HPLC analysis (Jupiter C-18, 5 µm, 300 Å, 250×4.6 mm, Phenomenex; 5-95% AcN in water with 0.1% TFA over 15 min at 1 mL/min) to ensure that no free $^{64}$Cu was present. The radiochemical purity of the species was always >93% and the specific activity (using the original amount of compound added to the reaction mixture) was estimated to be 56.0-318.4 µCi/nmol (3.05-11.8 GBq/µmol). The reaction yielded 1.29-9.54 mCi (47.7-353 MBq) of product with an isolated yield of 40.7-84.7%.

Alternatively, $^{64}$Cu was diluted in a 100 mM NH$_4$OAc buffer (pH~5.5) and reacted with a NOTA-pHLIP derivative at 80° C. for 15 min.

Labeling methods for $[^{18}F]$—AlF-NOTA-PHILIP. Following a modified labeling method described by Dijkgraaf et al., *J. Nuc. Med.* 53(6):947-952 (2012), 52.0-60.8 mCi (1.92-2.25 GBq) of $^{18}$F target water (produced from 180 enriched target water using a GEMS PETtrace-800 cyclotron, Memorial Sloan Kettering Cancer Center, New York, NY) was obtained. The target water was loaded onto a preconditioned chromafix cartridge (30-PS—HCO$_3$, Advanced Biochemical Compounds (ABX), Germany). All of the preconditioning solvents and the elution solution were prepared with metal-free water and trace-metal free reagents. The $^{18}$F was eluted from the cartridge with approximately 100 µL of 0.4 M KHCO$_3$ in metal-free water into a 1.5 mL tube (ThermoFisher Scientific, Waltham, MA). The pH was adjusted to ~4.1 with metal-free acetic acid (Sigma Aldrich, St. Louis, MO). To the pH adjusted solution, 100 µL of acetonitrile was added. If the total activity exceeded 50 mCi (1.85 GBq), the mixture was split between multiple 1.5 mL tubes prior to continuing (~10 mCi/40 nmol reaction). To the aliquoted mixture, 20 µL (40 nmol) of 2 mM AlCl$_3$ in 0.1 M NH$_4$OAc buffer (pH~4.1) was added to each tube. The solution was allowed to react for 5 min at room temperature before 14-17 µL of 4-5 mM NOTA-pHLIP in DMSO (68-75 nmol) was added, the tube capped, and the reaction mixture reacted at 75° C. for 15 minutes in a thermomixer. After reaction, the mixture was diluted with 2 mL of metal-free water. An aliquot of the reaction mixture was HPLC-analyzed (20-95% acetonitrile in water (with 0.1% trifluoroacetic acid) over 15 min with an Atlantis T3, Waters, 250 mm×4.6 mm, 5 µm; Jupiter, Phenomenex, 250 mm×4.6 mm, 5 µm, 300 Å, column) to ensure that product was formed ([$^{18}$F]—AlF-NOTA-WT eluted between 10.1 and 12.1 min; [$^{18}$F]—AlF-NOTA-var3 eluted between 10.2 and 11.4 min; [$^{18}$F]—AlF-NOTA-var7 eluted between 8.2 and 10.3 min; [$^{18}$F]—AlF-NOTA-cysWT eluted between 13 and 16 min; [$^{18}$F]—AlF-NOTA-cysVar3 eluted between 12 and 15 min; [$^{18}$F]—AlF-NOTA-cysVar7 eluted between 12 and 14 min). While the HPLC analysis was being performed, the remainder of the reaction mixture was separated using a pretreated Oasis HLB Plus Light or C18 Sep-Pak Light cartridge (Waters, Milford, MA) eluting first with water (5 mL) to remove any unbound $^{18}$F species and then ethanol (0.1 mL fractions for 4 fractions and then 0.6 mL). The [$^{18}$F]—AlF-NOTA-PHILIP derivatives eluted within the first three fractions in ethanol. The ethanolic solution was diluted with sterile PBS to provide <10% ethanol in the solution before HPLC analysis (Jupiter C-18, 5 µm, 300 Å, 250×4.6 mm, Phenomenex; 5-95% AcN in water with 0.1% TFA over 15 min at 1 mL/min). The radiochemical purity of the species was always >95% and the specific activity (using the original amount of compound added to the reaction mixture) was estimated to be 79.9-178.1 µCi/µmol (2.96-6.60 GBq/µmol). The reaction yielded 6.02-9.24 mCi (223-342 MBq) with an overall, decay-corrected (to beginning of labeling procedure) isolated yield of 2.33-48.6%.

Alternatively, $^{18}$F from the cyclotron target water was concentrated using a chromafix cartridge into 0.1 mL of 0.4 M KHCO$_3$ in metal-free water. The pH was adjusted and 0.1 mL AcN added. To this solution, AlCl$_3$ (80 nmol) in 0.1 M NH$_4$OAc buffer (pH~4.1) was added. After 5 min, the NOTA-pHLIP derivative was added and the reaction mixture reacted at 75° C. for 15 min.

General labeling methods for Cu-NOTA-pHLIP. Approximately 200 µL of 36.4 M Cu(OAc)$_2$ in 0.1 M NH$_4$OAc (pH~5) in metal-free water was added to 5-6 mg of NOTA-pHLIP in approximately 200 µL of DMSO. The mixtures were reacted in a thermomixer at 50° C. for 1 h, and then filtered through a 0.2 µm filter. The filter was washed with an additional 1 mL of 50% AcN in water and 2 mL of water, sequentially. The combined filtrate was HPLC purified (10-95% AcN in water over 30 min with a Jupiter C-18 column, 5 µm, 300 Å, 250×4.6 mm, Phenomenex). The collected fraction (14.5-15.5 min for Cu-NOTA-WT, 13.9-15 min for Cu-NOTA-Var3, 13.2-14.1 min for Cu-NOTA-Var7, 12.2-13.5 min for Cu-NO2A-cysWT, 13-15.3 min for Cu-NO2A-cysVar3, and 12.5-16 min Cu-NO2A-cysVar7) was lyophilized.

General labeling methods for AlF-NOTA-PHILIP: Sodium fluoride (19.8 mg, 0.47 mmol) was dissolved in 150 µL of 0.1 M NH$_4$OAc in metal-free water (pH~4.1). The resulting solution was added to 13.7 mg AlCl$_3$ (0.057 mmol) with 50 µL of 0.1 M NH$_4$OAc buffer (pH~4.1). The AlF$_3$ solution (60 µL) was added to approximately 7 mg of NOTA-pHLIP dissolved in 60 µL of EtOH. The reaction mixtures were reacted at 50° C. on a thermomixer for 1 h before being HPLC purified (10-95% AcN in water over 30 min with a Jupiter column, 5 µm, 300 Å, 250×4.6 mm, Phenomenex). The collected fraction (14.7-16.5 min for AlF-NOTA-WT, 13.8-15.4 min for AlF-NOTA-Var3, 13-14.6 min for AlF-NOTA-Var7, 12.5-17.5 min for AlF-NO2A-cysWT and AlF-NO2A-cysVar3, and 12-16 min AlF-NO2A-cysVar7) was lyophilized.

General labeling methods for $^{67}$Ga-NOTA-pHLIP. $^{67}$Ga-citrate was obtained from Nuclear Diagnostic Products (Rockaway, NJ), trapped on a silica cartridge, washed with metal-free water, and eluted from the cartridge in 0.2 mL of 0.4 M HCl. The pH was adjusted to approximately pH 4 with 1.0 M Na$_2$CO$_3$ and metal-free acetic acid. The reaction was diluted with 0.2 mL AcN and a DMSO solution of NOTA-pHLIP added. The reaction mixture was heated at 75-80° C. for 15 min. The reaction mixture was diluted with water, loaded on a pretreated C18 cartridge (Waters, Milford, MA), eluted with water (to remove unlabeled Ga), and the desired product eluted with EtOH. The ethanolic solution was diluted to <10% with sterile PBS for animal injections and HPLC analysis (all >95% R.C.P.). The biodistribution of the radioconjugates were evaluated at 1, 2, 4, and 24 h p.i. ($^{67}$Ga) in 4T1 orthotopic tumor-bearing BALB/c female mice. PET/CT (2 and 4 h p.i.) and SPECT/CT (6 and 24 h p.i.) imaging studies were carried out.

General labeling methods for $^{68}$Ga-NOTA-pHLIP. $^{68}$Ga was eluted from a $^{68}$Ge/$^{68}$Ga generator in approximately 0.5 mL of 0.5 M KOH. The pH of the eluant was adjusted to approximately 4 with metal-free acetic acid. The NOTA-pHLIP was added in a DMSO solution and the reaction reacted at 80° C. for 15 min. The reaction mixture was diluted with water, loaded on a pretreated C18 cartridge (Waters, Milford, MA), eluted with water (to remove unlabeled Ga), and the desired product eluted with EtOH. The ethanolic solution was diluted to <10% with sterile PBS for animal injections and HPLC analysis (all >95% R.C.P.). The biodistribution of the radioconjugates were evaluated at 2 and 4 h p.i. ($^{68}$Ga) in 4T1 orthotopic tumor-bearing BALB/c female mice. PET/CT (2 and 4 h p.i.) and SPECT/CT (6 and 24 h p.i.) imaging studies were carried out.

4T1 cell culture. The 4T1 cells derived from spontaneous breast tumor in a BALB/c mouse (Karmanos Cancer Institute, Detroit, MI) were cultured in Dulbecco's modified Eagle's high glucose media with 10% FCS, 2 mM L-glutamine, penicillin, and streptomycin. The 4T1 cells derived from ATCC (Manassas, VA) were cultured in RPMI-1640 medium modified to contain 2 mM L-glutamine, 10 mM HEPES, 1 mM sodium pyruvate, 4.5 g/L glucose, 1.5 g/L NaHCO$_3$, penicillin, and streptomycin.

4T1 orthotopic BALB/c mouse model. The cells were removed from the flasks, concentrated, and resuspended in minimal media for cell counting. The cells were then diluted to contain approximately 1 million cells in 30 µL of media (for orthotopic allografts). Following an MSKCC Institutional Animal Care and Use Committee approved protocol, 8-10 week old BALB/c mice (Charles River Laboratories, Wilmington, MA) were surgically implanted with one million 4T1 cancer cells into the first or the last mammary fat pad of the right side of the animal using aseptic surgical techniques and sterile staple closures while the mice were under anesthetic. Additionally, mice were given injections of meloxicam (24 h pain killer) in the scruff and bupivacaine intradermally prior to surgical incisions. One day post surgery, the mice were again given meloxicam and checked to ensure that the closure was healing. Two and three days post surgery, the mice were checked to ensure that the animals were healthy and recovering well from the surgery. Five to seven days post surgery, the staples were removed. Five to nine days post surgery, the mice were injected with 50-75 µCi (0.9-0.4 nmol) of the respective radiopharmaceutical for in vivo biodistribution or 500-600 µCi (9-11 nmol) for in vivo imaging. The mice receiving $^{64}$Cu-NOTA-pHLIP were sacrificed at 1, 2, 4, 12, 24, 36, and 48 h; the mice receiving [$^{18}$F]—AlF-NOTA-pHLIP were sacrificed at 0.5, 1, 2, 4, 6 and 8 h. The 4T1 tumors in this study were purposely used 5-9 days after inoculation to ensure lower tumoral pH.

PC3 cell culture. The prostate cancer PC3 cells, derived from a human bone metastasis, were purchased from ATCC (Manassas, VA) and cultured in F-12K Medium (Kaighn's Modification of Ham's F-12 Medium) with, 10% FCS, 2 mM L-glutamine, 1.5 g/L NaHCO$_3$, penicillin, and streptomycin.

PC3 shoulder nude mouse xenografts. The cells were removed from the flasks, concentrated, and resuspended in minimal media for cell counting. The cells were then diluted to contain approximately 3 million cells in 150 µL of 1:1 media and matrigel (for shoulder xenografts). Following an MSKCC Institutional Animal Care and Use Committee approved protocol, 150 µL of the cell suspension was injected subcutaneously in 6-9 week old nude male mice (CRL). Mice were used in studies at 3 weeks post inoculation. The mice were injected with 50-75 µCi (0.9-0.4 nmol) of the respective radiopharmaceutical for in vivo biodistribution or 500-600 µCi (9-11 nmol) for in vivo imaging. The mice receiving $^{64}$Cu-NOTA-cysVar3 were sacrificed at 1, 4, 12, 24, and 48 h; the mice receiving [$^{18}$F]—AlF-NOTA-cys Var3 were sacrificed at 1, 4, 6 and 8 h.

LNCaP cell culture. The LNCaP cells, prostate cancer derived from a human supraclavicular lymph node metastasis, were purchased from ATCC (Manassas, VA) and cultured in RPMI-1640 medium modified to contain 2 mM L-glutamine, 10 mM HEPES, 1 mM sodium pyruvate, 4.5 g/L glucose, and 1.5 g/L NaHCO$_3$, penicillin, and streptomycin.

LNCaP shoulder nude mouse xenografts. The cells were removed from the flasks, concentrated, and resuspended in minimal media for cell counting. The cells were then diluted to contain approximately 3-6 million cells in 150 µL of 1:1 media and matrigel (or shoulder xenografts). Following an MSKCC Institutional Animal Care and Use Committee approved protocol, 150 µL of the cell suspension was injected subcutaneously in 6-8 week old nude male mice (CRL). Mice were used in studies at 3-8 weeks post inoculation. The mice were injected with 50-75 µCi (0.9-0.4 nmol) of the respective radiopharmaceutical for in vivo biodistribution or 500-600 µCi (9-11 nmol) for in vivo imaging. The mice receiving $^{64}$Cu-NOTA-cysVar3 were sacrificed at 1, 4, 12, 24, and 48 h; the mice receiving [$^{18}$F]—AlF-NOTA-cys Var3 were sacrificed at 1, 4, 6 and 8 h.

B16-F10 cell culture. The B16-F10 cells, derived from spontaneous melanoma in a C57Bl/6 mouse, were purchased from ATCC (Manassas, VA) and cultured in Dubelco's modified Eagle's high glucose media with 10% FCS, 4 mM L-glutamine, 1 mM sodium pyruvate, 1.5 g/L NaHCO$_3$, penicillin, and streptomycin.

Orthotopic B16-F10 shoulder allografts. The cells were removed from the flasks, concentrated, and resuspended in minimal media for cell counting. The cells were then diluted to contain approximately 100,000 cells in 100 µL of media (for shoulder allografts). Following an MSKCC Institutional Animal Care and Use Committee approved protocol, C57Bl/6 female mice (CRL) and BALB/c female mice (CRL) were injected with 100 µL of the cell suspension intradermally as per a media substituted protocol from Overwijk & Restifo (*Current Protocols in Immunology*, 2000: 20.1.1-20.1.29). The mice were used in studies at approximately 9-14 days post inoculation. The mice were injected with 50-75 µCi (0.9-0.4 nmol) of the respective radiopharmaceutical for in vivo biodistribution or 500-600 µCi (9-11 nmol) for in vivo imaging. The mice receiving 64Cu-NOTA-cys Var3 were sacrificed at 1, 4, 12, 14.5, and 24 h; the mice receiving [$^{18}$F]—AlF-NOTA-cysVar3 were sacrificed at 1, 4, 6 and 8 h.

U-87 MG cell culture. The human glioblastoma cell line, U-87 MG, was purchased from American Type Culture Collection (ATCC, Manassas, VA) and cultured in Dulbecco's Modified Eagle's Medium with 10% fetal bovine serum, 2 mM L-Glutamine, 1500 mg/L Sodium Bicarbonate, 100 units/mL penicillin G and 100 µg/mL streptomycin (prepared by the MSKCC Media Preparation Core).

U-87 MG shoulder xenografts: The cells were removed from the flasks, concentrated, and resuspended in minimal media for cell counting. The cells were then diluted to contain approximately 1 million cells in 150 µL of 1:1 media and matrigel (or shoulder xenografts). Following an MSKCC Institutional Animal Care and Use Committee approved protocol, 150 µL of the cell suspension was injected subcutaneously in 12 week old nude male mice (CRL). Mice were used in studies at 2-3 weeks post inoculation. The mice were injected with 400-500 µCi (7-10 nmol) for in vivo imaging. The mice were sacrificed at 6 h after imaging (n=6).

General purification. An Oasis HLB Plus Light or C18 Sep-Pak Light cartridge (Waters, Milford, MA) was used to remove unbound activity. The pure radiolabeled NOTA-pHLIP derivatives were eluted with EtOH and diluted with sterile phosphate buffered saline (PBS) with purities >93% before administration to animals.

Animal models. Animal studies were conducted according to MSKCC IACUC-approved animal protocol. 4T1 (orthotopic breast cancer allografts of 1×10$^6$ cells surgically implanted in the mammary fat pad) and B16-F10 (orthotopic melanoma allografts of 1×10$^5$ cells injected intradermally on the shoulder) tumors were orthotopically inoculated in media in female BALB/c and C57Bl/6 mice (Charles River Laboratories (CRL)), respectively. Additionally, PC3 (3×10$^6$ cells) or LNCaP (3-6×10$^6$ cells) tumors were subcutaneously xenografted on the shoulder of athymic nude male mice (CRL). Mice were used once tumor volumes were approximately 90-300 mm$^3$.

In vivo animal PET imaging and biodistribution. Mice were injected with radiolabeled NOTA-pHLIP derivatives i.v. (500-700 µCi/mouse for PET or SPECT imaging studies and 25-100 µCi/mouse for biodistribution studies). All injections were less than 200 µL with <10% EtOH in sterile PBS. PET images were obtained with the mice under anesthesia in an Inveon PET-CT or microPET Focus 120 (Siemens) at 0.5-48 h p.i. All images were analyzed using ASIPro VM (Concorde Microsystems). SPECT images were obtained with the mice under anesthesia in a NanoSPECT/CT Plus at 4-24 h p.i. All SPECT images were reconstructed using HiSPECT and analyzed using InVivoScope. Dissections for ex vivo biodistribution were performed on mice after $CO_2$ asphyxiation or cervical dislocation while anesthetized at reported time points. Weight of the syringe prior to injection and after injection was used to determine the mass of injectate. Activity of the syringe prior to injection and after injection was used to determine the percent of injectate administered. The mass injected was corrected by the percent of radioactivity injected. Four to five aliquots (10 µL) were weighed and counted as internal standards for each study. All of the collected organs were counted using an automatic gamma counter (Wizard 3", PerkinElmer, Waltham, MA). The total injected dose was found as the mass injected dose×fraction radioactivity injected×internal standard average counts/g. The percent injected dose (% ID) was determined as the counts for the tissue×100/total injected dose. The % ID/g was calculated as the % ID/tissue weight. The average and standard deviation of the % ID and % ID/g was determined using normal methods (n−1) for each set of mice.

Ex vivo autoradiography, staining, and microscopy. Tumors were excised from the mice, embedded into Tissue-Plus® O.C.T. (Scigen, Gardena, CA), stored at −20° C. until sectioning, and cut in sequential 10 µm sections. Select sections were exposed to autoradiography film (Fujifilm, GE Healthcare) for 1-3 days and read using a typhoon photographic film scanner (GE Healthcare). Additionally, sections were stained with H&E for gross tumor microscopy and then scanned.

Biophysical studies. Biophysical studies were conducted on nonradioactive standards of the NOTA-pHLIP and NO2A-cyspHLIP compounds. All experiments were conducted with a 5 µM to 1 mM complex to lipid ratio. State I (complex with no liposomes in solution) and State II (complex in the presence of liposomes) were measured at pH 8; for State III (complex in presence of liposomes), the pH of solution was dropped to pH 4 using 2 M HCl. Experiments were conducted in 10 mM phosphate buffer (Sigma Aldrich, St. Louis, MO) either without additional ions or in the presence of physiological levels of free magnesium and calcium (0.65 mM and 1.25 mM, respectively).

Liposome preparation. Large unilamellar vesicles were prepared by extrusion. 1-Palmitoyl-2-oleoyl-sn-glycero-3-phosphocholine (POPC; Avanti Polar Lipids), dissolved in chloroform at a concentration of 12.5 mg/mL, de-solvated by rotary evaporation, and dried under high vacuum for 2 h. The phospholipid film was then rehydrated in 10 mM phosphate buffer (pH 8.0 with or without ions), vortexed, and extruded 15× through a 50 nm pore.

Steady-state fluorescence. Tryptophan fluorescence spectra were measured using a PC1 ISS spectrofluorometer (Champaign, IL) with temperature control set to 25° C. Fluorescence spectra were recorded with excitation and emission slits set to 1 mm, using an excitation wavelength of 295 nm, with excitation and emission polarizers set to 54.7° and 0°, respectively.

Steady-state circular dichroism. Circular dichroism measurements were taken using a MOS-450 spectrometer (BioLogic SAS, Claix, France) with temperature control set to 25° C. in the range of 190 to 260 nm with step of 1.0 nm.

pH dependence. The pH-dependent insertion of the complex population was investigated using the shift in position of the wavelength of maximum intensity of the tryptophan fluorescence spectra by varying pH conditions between 4 and 8. The pH after addition of HCl was measured using an Orion PerpHecT ROSS Combination pH Micro Electrode and an Orion Dual Star pH and ISE Benchtop Meter (Thermo Fisher Scientific, Waltham, MA). Tryptophan fluorescence spectra were recorded at each pH value and were analyzed using an online protein fluorescence and structural toolkit (PFAST) to obtain the positions of spectral maxima ($\lambda_{max}$). Finally, the positions of $\lambda_{max}$ were plotted as a function of the various pHs and the Henderson-Hasselbalch equation employed to fit the data:

$$\lambda_{max} = \lambda_{max}^2 + \frac{\lambda_{max}^1 - \lambda_{max}^2}{1 + 10^{n(pH-pK)}},$$

where $\lambda_{max}^1$ and $\lambda_{max}^2$ are the positions of spectral maxima at the end and beginning of the State II-State III transition, respectively, n is the cooperativity parameter, and pK is the midpoint of transition.

Figure 2C:
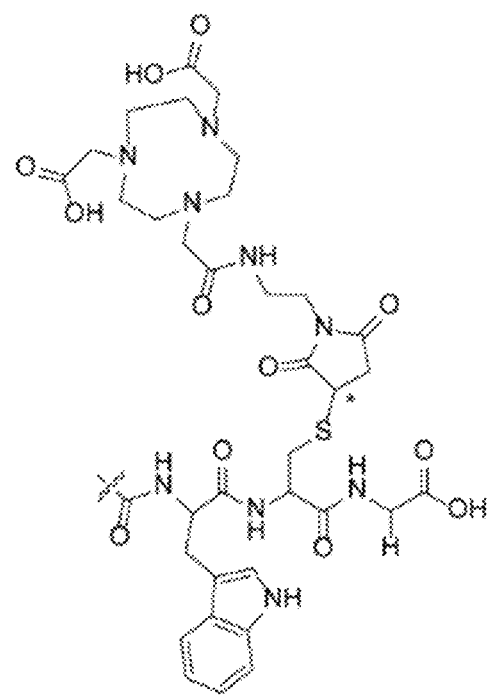
FIG. 2C shows the chelator NO2A-cyspHLIP where the NO2A chelator is attached to the pHLIP through a cysteine at the C-terminus. The chiral centers within the chelator and linker are marked with asterisks.

Results. The NOTA (1,4,7-triazacyclononane-N',N'',N'''-triacetic acid) chelator was conjugated to various pHLIPs in two ways (FIGS. 2A-2C). The NOTA-pHLIP compounds contain NOTA with three carboxylic acid groups conjugated to the N-terminus of the peptide (FIG. 2A). The NO2A-cyspHLIP compounds contain NO2A (1,4,7-Triazacyclononane-1,4-bis-acetic acid-7-maleimidoethylacetamide) with two carboxylic acid groups, where the third group was used to conjugate the chelator to the peptide through the cysteine side chain (FIG. 2B). The $Cu^{2+}$ and $AlF^{2+}$ NOTA complexes have an overall charge of −1 and the $Ga^{3+}$ complexes have an overall neutral charge for the chelator-metal complex with a neutral charge at the N-terminus of the pHLIP. The $Cu^{2+}$ and $AlF^{2+}$ complexes with the NO2A-chelates have an overall neutral charge and the $Ga^{3+}$ complexes have an overall charge of +1 for the chelator-metal complex with the positive charge preserved at the N-terminus of the pHLIP. The four peptide sequences are listed in Table 1.

The $^{64}Cu$ radiolabeling of each of the conjugates was achieved with greater than 60% (isolated) yield with greater than 93% radiochemical purity; the [$^{18}F$]—AlF radiolabeling of each of the conjugates was 4-50% (isolated and decay corrected to start of synthesis) yield with greater than 95% radiochemical purity; the $^{67}Ga$ radiolabeling of each of the conjugates was achieved with greater than 70% (isolated) yield (relative to the amount of $^{67}Ga$ was used to start the synthesis) with greater than 95% radiochemical purity. Table 2 and FIG. 21 lists the specific activity of each radiolabeled complex.

TABLE 2

| Imaging Agent | Specific Activity (µCi/nmol)[a] | Specific Activity (µCi/nmol)[b] |
|---|---|---|
| $^{64}Cu$-NOTA-Var7 | 82.4 | N/A |
| [$^{18}F$]—AlF-NOTA-Var7 | 79.9 | N/A |
| $^{64}Cu$-NOTA-Var3 | 132.8[c] | N/A |
| [$^{18}F$]—AlF-NOTA-Var3 | 101.3 | N/A |
| $^{64}Cu$-NOTA-WT | 116.4 | N/A |
| [$^{18}F$]—AlF-NOTA-WT | 135.9 | N/A |
| $^{67}Ga$-NOTA-Var3 | 63.8-71.7 | N/A |
| $^{64}Cu$-NO2A-cysVar7 | 113.7 | 219.6 |
| [$^{18}F$]—AlF-NO2A-cysVar7 | 55.9 | 178.1 |
| $^{64}Cu$-NO2A-cysVar3 | 45.5-523.3 | 47.5-340.2 |
| [$^{18}F$]—AlF-NO2A-cysVar3 | 31.2-84.2 | 38.9-351.4 |
| $^{64}Cu$-NO2A-cysWT | 215.6 | 99.1 |
| [$^{18}F$]—AlF-NO2A-cysWT | 19.6 | N/A |
| $^{67}Ga$-NO2A-cysVar3 | 51.4-69.4 | N/A |

TABLE 2-continued

| Imaging Agent | Specific Activity (µCi/nmol)[a] | Specific Activity (µCi/nmol)[b] |
|---|---|---|
| $^{68}$Ga-NO2A-cysVar3 | 94.5 | N/A |
| [$^{18}$F]—AlF-NO2A-C$^{27}$Var3 | 85.2 | 187.6 |
| $^{64}$Cu-NO2A-C$^{27}$Var3 | 277.5 | 202.4 |
| $^{67}$Ga-NO2A-C$^{27}$Var3 | 284.0 | N/A |

[a]Approximated from the amount of total peptide added.
[b]Calculated from the UV/vis standard concentration curve.
[c]In a separate experiment, a specific activity of 1656 µCi/nmol was attained, but the lower specific activity material was used in the studies in order to be comparable throughout.

Example 2: In Vitro and In Vivo Studies with the Complexes of the Present Technology This Example demonstrates that the complexes of the present technology are useful in methods for detecting acidic diseased tissues (e.g., solid tumors) in a subject. FIGS. 22-71 further illustrate the advantages of the complexes of the present technology, including in comparison to, e.g., NOTA compounds.

Figure 9:
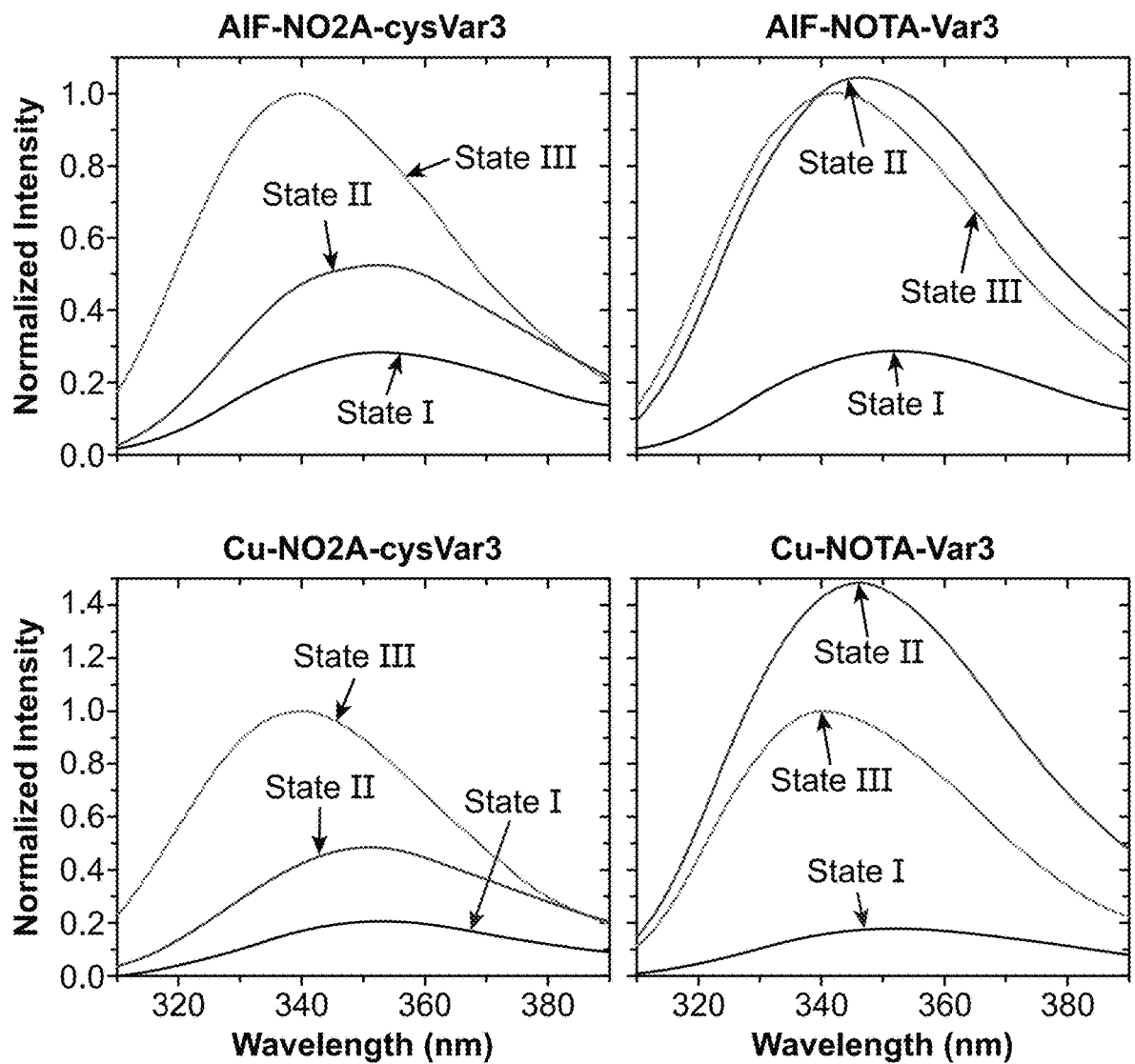
FIG. 9 shows three states of NO2A-cys Var3 and NOTA-Var3 complexes. The complexes were examined under varying conditions for the presence of the three states of pHLIP: State I is the complex in solution at pH 8, State II is the complex in the presence of POPC liposomes at pH 8, and State III is the complex folded and inserted in the lipid membrane when the pH is dropped from pH 8 to pH 4 by the addition of an aliquot of HCl. The concentrations of complex and lipids were 5 μM and 1 mM, respectively.

Biophysical studies. Using 1-palmitoyl-2-oleoyl-sn-glycero-3-phosphocholine (POPC) liposomes as model membranes, a comparative biophysical investigation of the pH-dependent interaction of NOTA-pHLIP and NO2A-cyspHLIP complexes with the lipid bilayer indicated that NOTA complexes adopt unfavorable conformations at the membrane surface at physiological and low pH compared to NO2A complexes. Although biophysical measurements are typically conducted in solutions without the further addition of ions, the performance of these complexes both in the absence and presence of physiological levels of free magnesium and calcium ions was investigated. Wild-type complexes appear to be sensitive to the presence of divalent cations, most likely due to the multiple protonatable aspartic and glutamic acid residues at the inserting end of the peptide, which tend to form divalent complexes with these ions at physiological pH. Plots demonstrating the changes in fluorescence spectra of AlF-NOTA-Var3, Cu-NOTA-Var3, AlF-NO2A-cysVar3, and Cu-NO2A-cysVar3 upon interaction with membranes are shown in FIG. 9.

The ex vivo biodistribution data show that the metallated NOTA-pHLIP variants are quickly cleared via both the hepatobiliary and renal pathways to reduce the overall circulating radioactivity significantly by 12 h post injection. The rapid excretion of the $^{64}$Cu-NOTA-PHILIP variants from the intestines and slow elimination from the kidneys over time indicated that the compounds were not being taken up by the cells within these organs, but were being eliminated via normal peptide metabolic pathways.

Figure 3A:
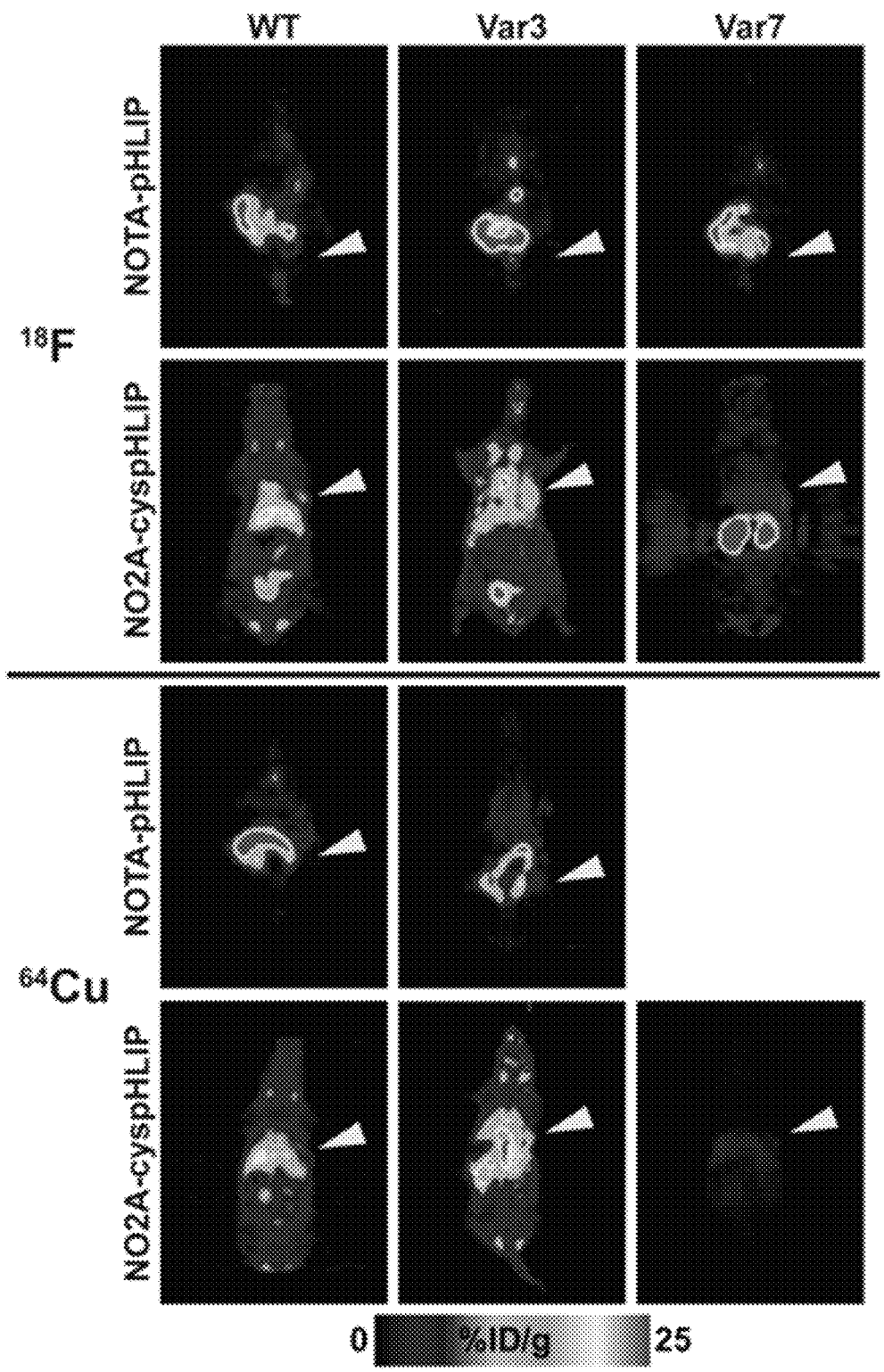
FIG. 3A shows coronal PET image slices at the level of the tumor at 4 hours post injection (h. p.i.) (FIG. 3A).
Figure 3B:
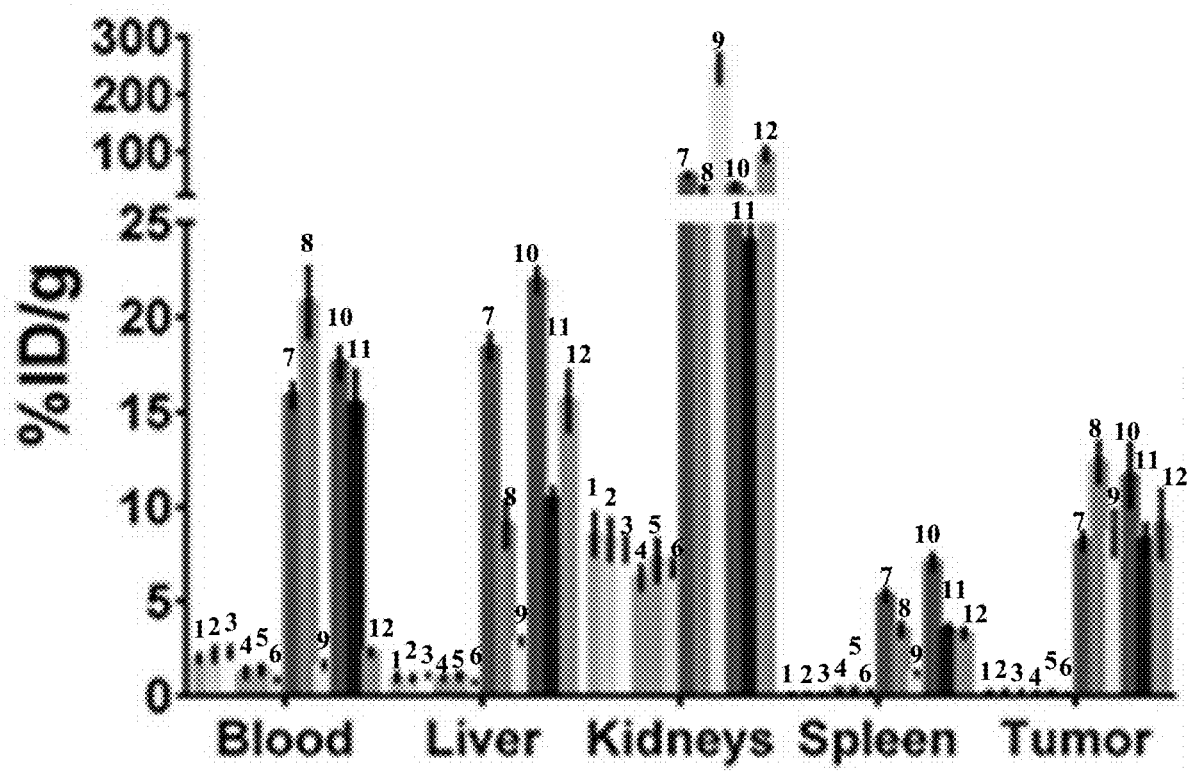
FIG. 3B and FIG. 3C show ex vivo biodistributions in selected organs at 4 and 24 h p.i. respectively, which highlight differences in the distribution of complexes (alternatively referred to "tracers" or "tracer compounds") in BALB/c female mice bearing 4T1 tumor allografts. The arrowheads in FIG. 3A indicate where the tumor is located in the mouse. The selected scale on the PET images does not allow for tumor visualization in the case of the NO2A-cysVar7 complexes.
Figure 3C:
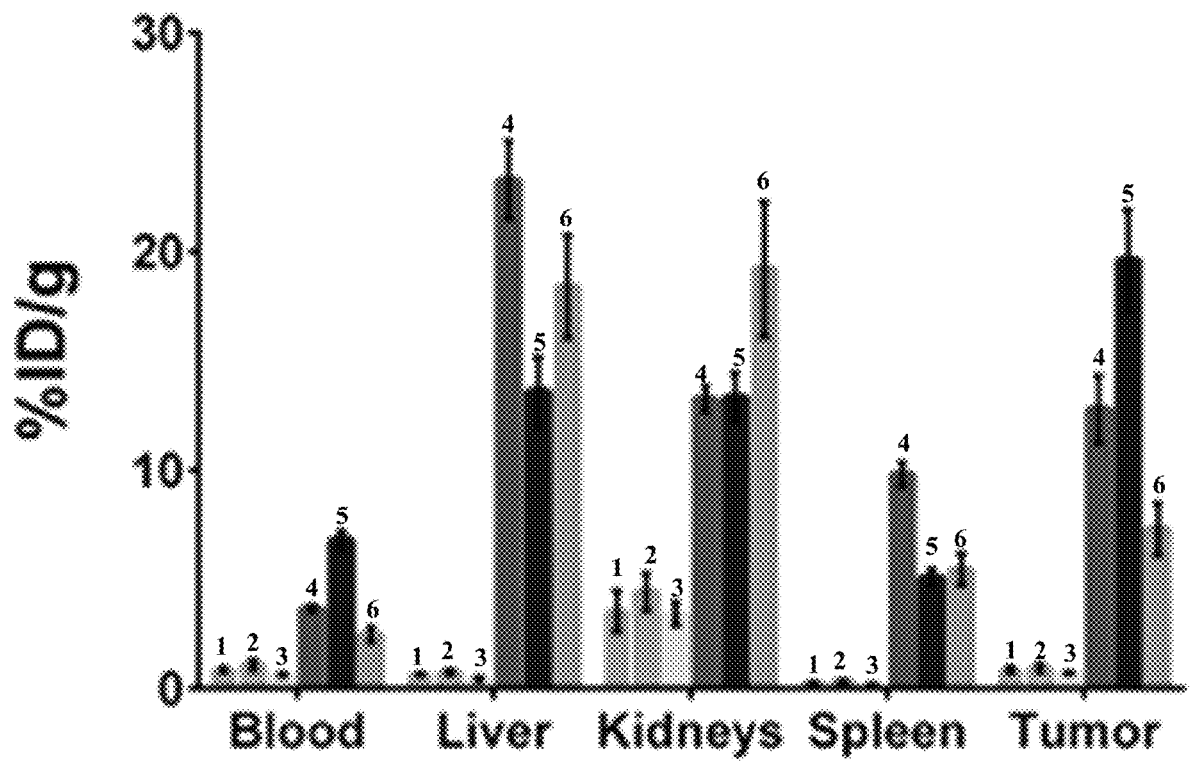

Additionally, when comparing the 2 h ex vivo data for kidneys-to-large intestine ratios [$^{64}$Cu-NOTA-WT is 0.35±0.11; [$^{18}$F]—AlF-NOTA-WT is 0.42±0.03; $^{64}$Cu-NOTA-Var3 is 0.29±0.12; [$^{18}$F]—AlF-NOTA-Var3 is 0.52±0.15; $^{64}$Cu-NOTA-Var7 is 0.32±0.07; [$^{18}$F]-AlF-NOTA-Var7 is 0.55±0.19], there was no significant difference between the excretion pathways of variants radiolabeled with $^{64}$Cu or $^{18}$F. Without wishing to be bound by theory, it is believed that the overall charge of the complexes may improve the elimination of these compounds, while decreasing the likelihood of uptake in low pH environments, such as tumors, which may require more residence time in the blood. FIGS. 3A-3C show the lack of tumor targeting with NOTA-pHLIP complexes. This is consistent with previous studies that described $^{64}$Cu-NOTA-Var7, which showed in vivo localization that was inversely related to measured extracellular pH (pHe), but exhibited limited overall tumor uptake (1.36±0.43% ID/g). See Viola-Villegas et al., *PNAS* 111:7254-7259 (2014).

In contrast, the neutrally- and positively-charged NO2A complexes of the present technology conjugated to the cysteine residue at the N-terminal part of the pHLIP (which preserve their positive charge at the N-terminus) show prolonged blood circulation with slower clearance, consequently leading to better perfusion of the complexes in the tumor microenvironment. FIG. 3B and FIG. 3C show the biodistribution of $^{64}$Cu- and $^{18}$F-NO2A complexes in selected tissues at 4 h and 24 h. The steady increase of the tumoral uptake of each of the NO2A complexes implies slow localization in the tumor site. Var7 complexes exhibit the fastest blood clearance with the highest signal in the kidneys at 4 h p.i. and kidney clearance at later time points. The radiometallated NO2A-cysVar7 complexes had the shortest blood retention with similar tumoral uptake at 4 h compared to the other radiolabeled compounds.

Figure 8A:
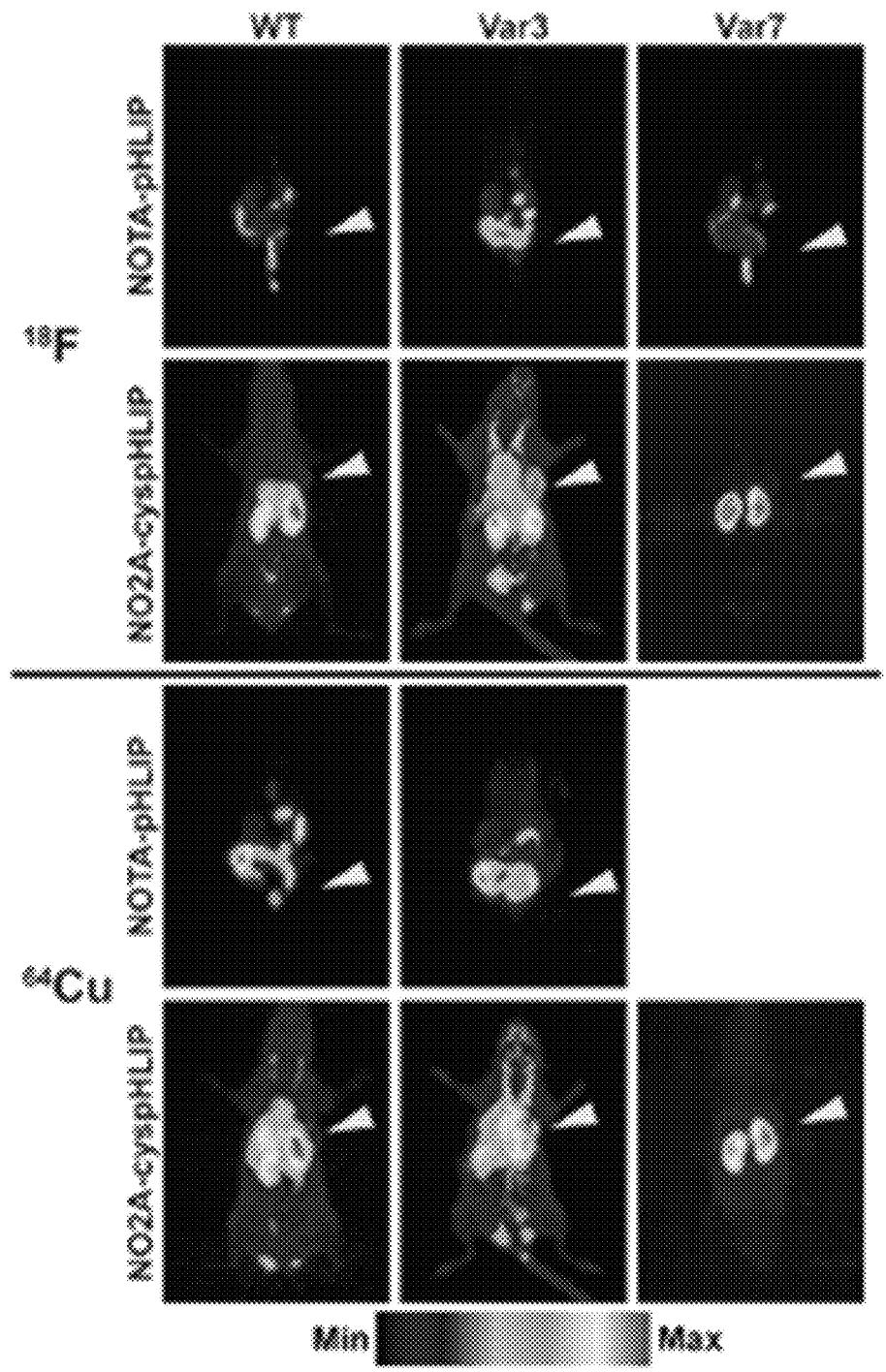
FIGS. 8A and 8B show PET Maximum intensity projection (MIP) showing differences in the tracer distribution at 4 h p.i. for all 12 tracers (FIG. 8A) and the PET imaging slices at 15% ID/g at 4 h p.i. for the [$^{18}$F]—AlF-cyspHLIP complexes in BALB/c female mice bearing 4T1 tumor allografts (FIG. 8B). The arrowheads indicate where the tumor is located in the mouse. The MIPs correspond to the same images shown in FIG. 3A. The slices are the same as those shown in FIG. 3A, just at 15% ID/g. Only ex vivo biodistribution data was obtained for $^{64}$Cu-NOTA-Var7.
Figure 8B:
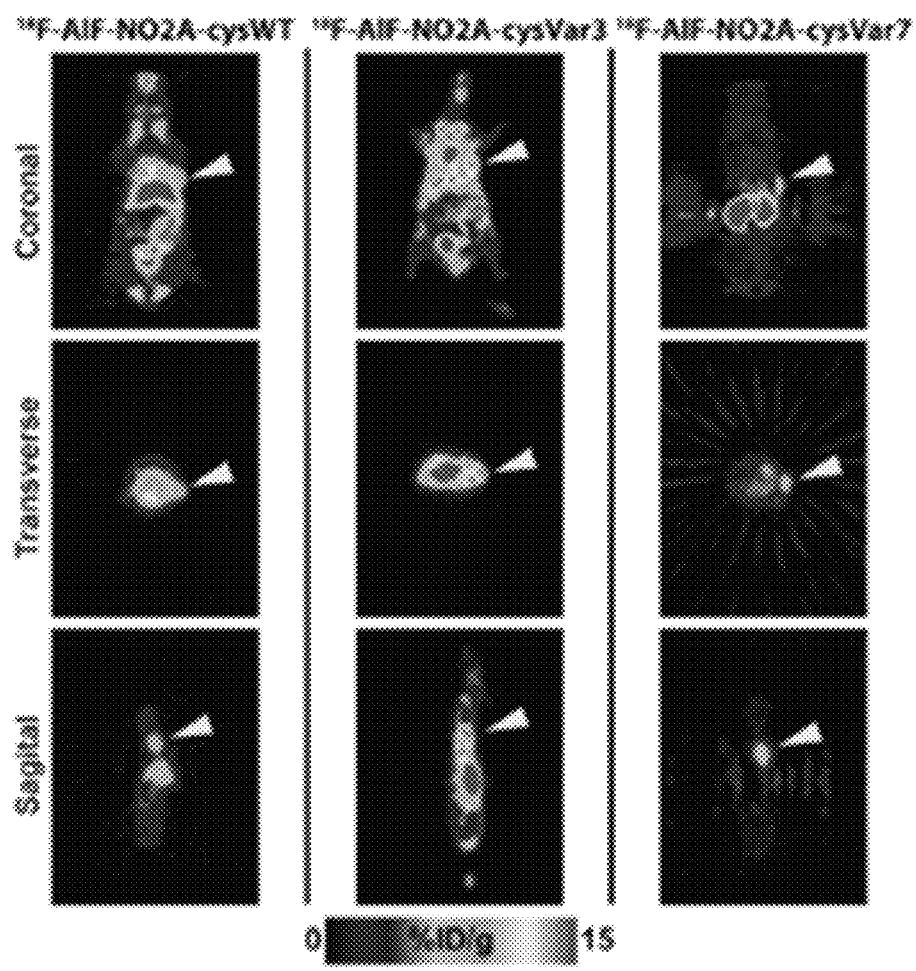

This rapid blood clearance may make the radiometallated NO2A-cysVar7 complexes useful in diagnostic imaging methods that entail shorter imaging times (tumor is visible in the slices at the tumor level in FIGS. 8A-8B) as long as the tumor is sufficiently distant from the kidneys (the major organ visible in the MIP in FIGS. 8A-8B). Without wishing to be bound by theory, it is believed that the rapid clearance of the Var7 complexes may be a function of their physical characteristics. While the Var7 complexes have insertion pKs that are similar to the NO2A-cys Var3 complexes, they are less hydrophobic than the NO2A-cysVar3 complexes, which may account for their faster blood clearance properties (e.g., as indicated by lower amounts of NO2A-cys Var7 complexes in the blood at every time point) and consequently, their lower tumoral uptake.

Figure 10:
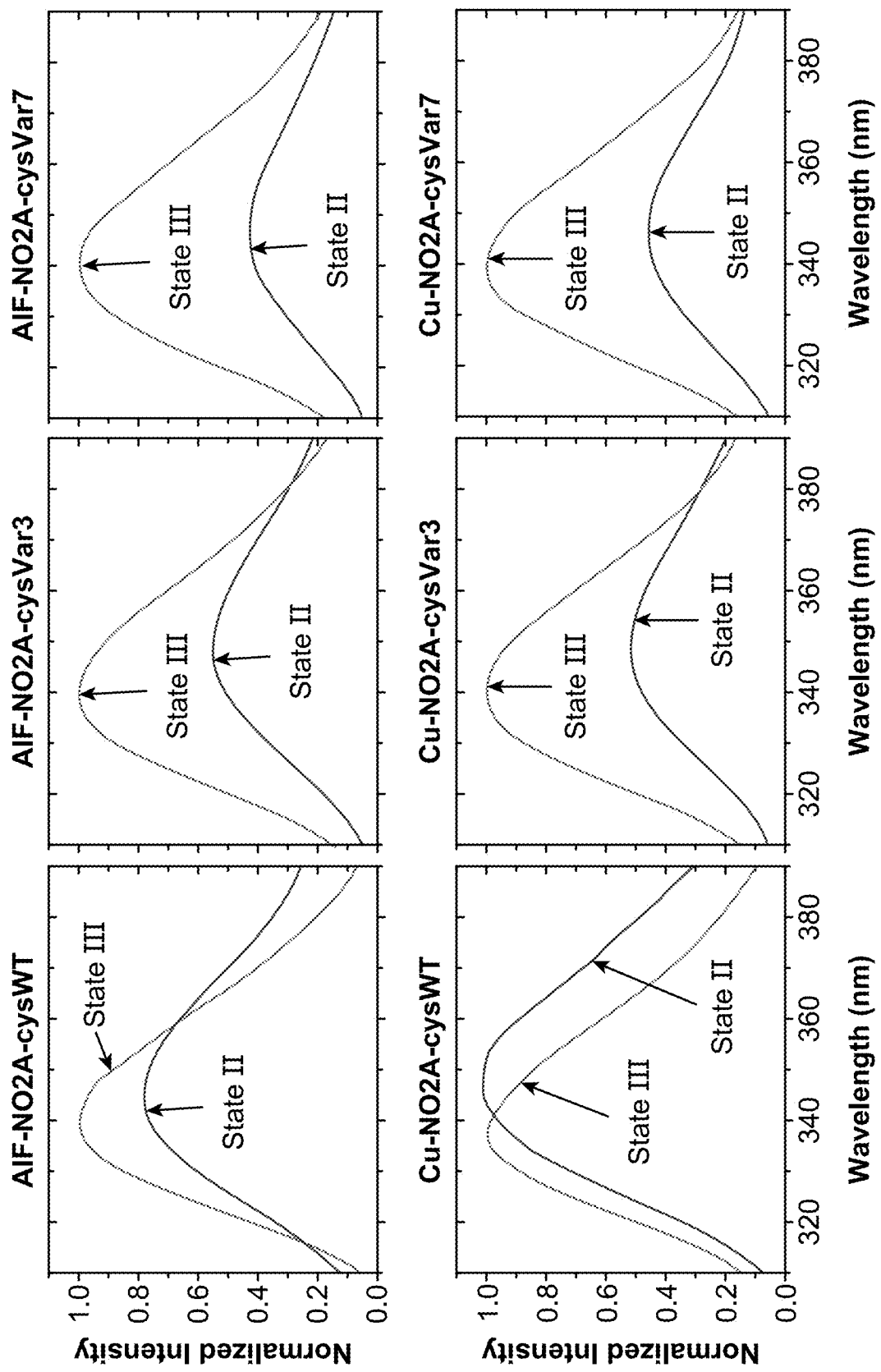
FIG. 10 shows State II and State III of NO2A-cyspHLIP complexes. The complexes were examined in the presence of liposomes under varying pH levels: State II is the complex in the presence of POPC liposomes at pH 8, State III is the complex folded and inserted in the lipid membrane when the pH is dropped from pH 8 to pH 4 by the addition of an aliquot of HCl. The concentrations of complex and lipids were 5 μM and 1 mM, respectively, with physiological levels of free magnesium and calcium ions (0.65 mM and 1.25 mM, respectively).
Figure 11:
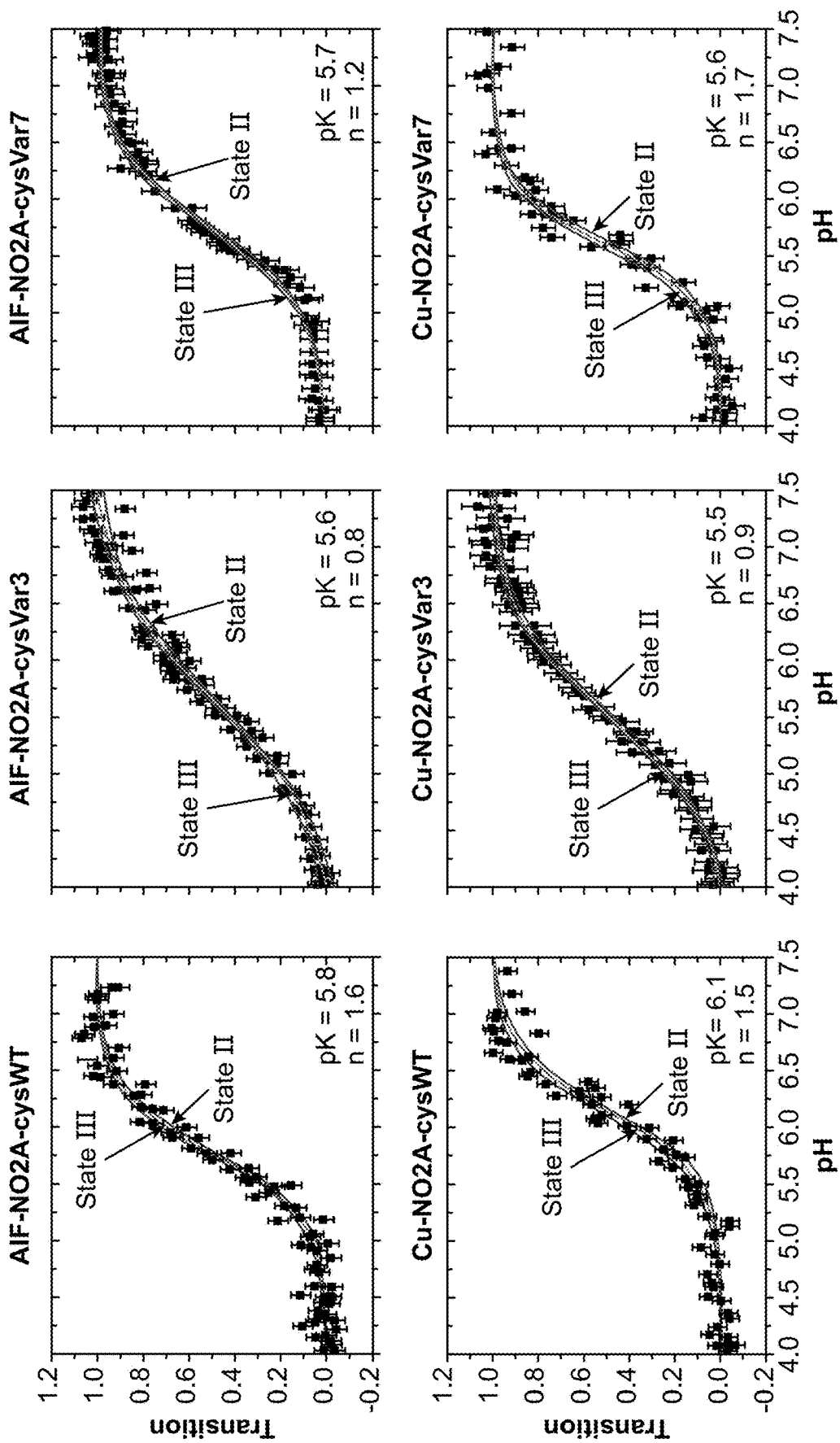
FIG. 11 shows pH dependent bilayer insertion of complexes. Changes in intrinsic complex fluorescence are used to measure the insertion of the complex population as a function of pH (transition from State II, at high pH, to State III, at low pH). The amount of complex population in State II is measured on the y-axis. These experiments were carried out with physiological levels of free magnesium and calcium ions (0.65 mM and 1.25 mM, respectively).

NO2A-cysWT compounds exhibited highest accumulation in liver and spleen compared to NO2A-cysVar3 and NO2A-cysVar7. Both [$^{18}$F]—AlF-NO2A-cysWT and $^{64}$Cu-NO2A-cysWT have slightly higher liver and spleen uptake compared to the corresponding cys Var3 and cysVar7 conjugates. All of the NO2A complexes demonstrate a pH-dependent interaction with the lipid bilayer of the cellular membrane (see FIG. 10 and FIG. 11), but the NO2A-cysWT complexes exhibit the highest affinity to the lipid membrane at physiological pH and slower rate of membrane insertion. Additionally, the pK of transition from the membrane-bound state to the inserted state is higher for NO2A-cysWT complexes compared with NO2A-cysVar3 and NO2A-cysVar7 complexes. This shift in pK is most likely responsible for the higher uptake of the NO2A-cysWT complexes by the liver and spleen.

The $^{64}$Cu-NO2A-cys pHLIP complexes show decreased radioactivity accumulation in the kidney from 4 h p.i. to 24 h p.i., which is due to clearance of the drug rather than uptake; whereas, the liver and spleen uptake remains similar for the two time points. The liver and spleen uptake may be due to loss of the $^{64}$Cu from the chelator, digestion of the radiolabeled complex in vivo, or accumulation of intact radiolabeled complex in these organs.

While not wishing to be bound by theory, it is believed that introduction of a benzene ring in close proximity to the N-terminus of the peptide sequence and using a negatively charged metal complex should be avoided in pHLIPs.

Figures 4A, 4B:
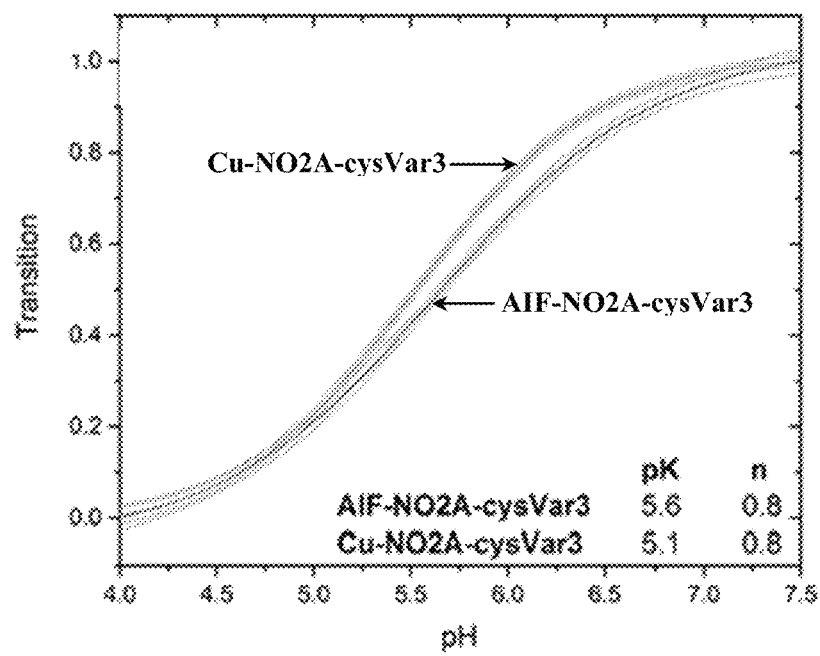
FIGS. 4A and 4B show pH dependent bilayer insertion of NO2A-cysVar3 complexes. Changes in intrinsic complex fluorescence are used to measure the insertion of the complex population as a function of pH (transition from State II, at high pH, to State III, at low pH).

The $^{64}$Cu-NO2A-cysVar3, [$^{18}$F]—AlF-NO2A-cysVar3, $^{67}$Ga-NO2A-cysVar3, and $^{67}$Ga-NO2A-C$^{27}$Var3 have the highest tumoral uptake, prolonged retention in the tumor, and minimal accumulation in other organs based on the ex vivo biodistribution data. FIGS. 4A-4B show the pH-dependent insertion and tabulates the percentage of the NO2A-cysVar3 complex population that is inserted in the membrane at various pHs for the Cu- and F-labeled complexes. The results indicate that less than 5% of the NO2A-cysVar3 complexes should be inserted into the membrane at pH 7.4 (physiological pH), whereas greater than 25% of the NO2A-cysVar3 complexes should be inserted into the cellular membrane at pH 6.0 (the approximate pH at the surface of cancer cells). In addition, the membrane insertion of Var3 and Var7 takes place at a rate two orders of magnitude higher than the rate of insertion of WT.

Figure 5:
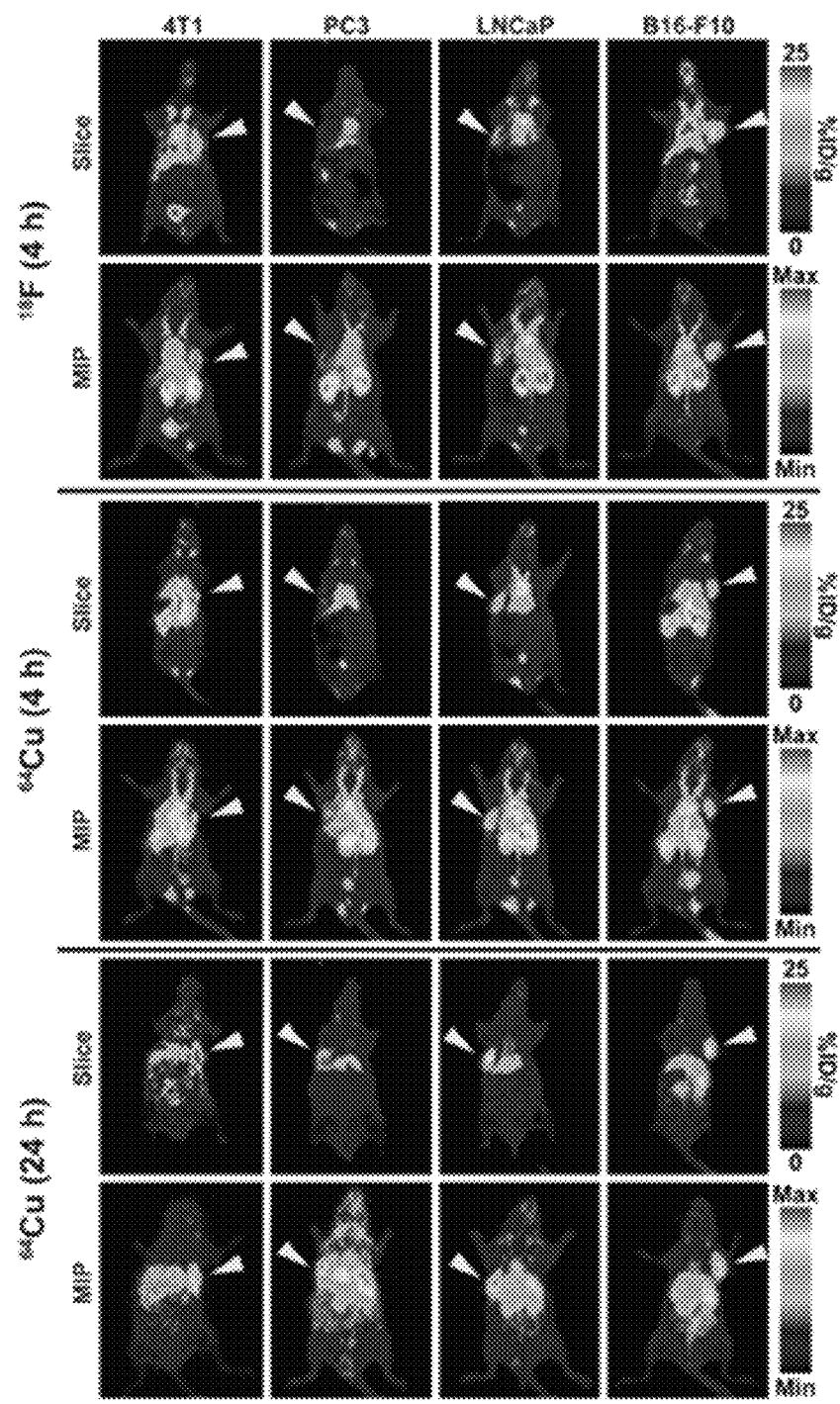
FIG. 5 shows slices and maximum intensity projections (MIP) from PET images showing differences in the radiolabeled NO2A-cys Var3 distribution at 4 and 24 h in BALB/c female mice bearing orthotopic 4T1 tumor allografts, nude male mice bearing shoulder PC3 or LNCaP xenografts, and C57Bl/6 female mice bearing orthotopic B16-F10 tumor allografts. The arrowheads indicate where the tumor is located in the mouse.
Figure 6:
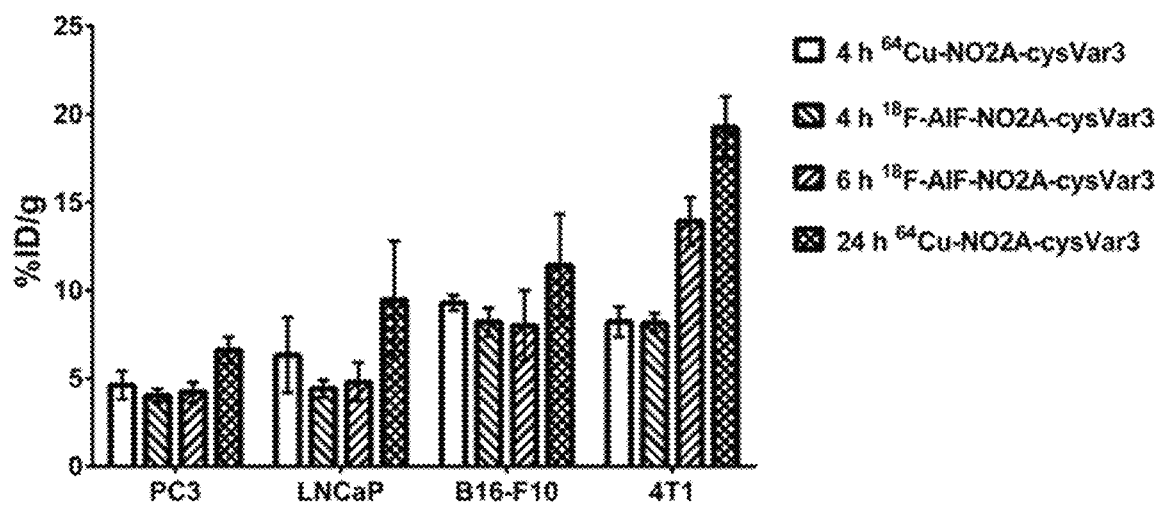
FIG. 6 shows a graph of the ex vivo tumor uptake of the lead radiolabeled NO2A-cysVar3 in various tumor models at 4, 6, and 24 h p.i.

In vivo studies in prostate, melanoma and brain tumor models. The $^{64}$Cu- and [$^{18}$F]—AlF-NO2A-cysVar3 compounds were compared in melanoma and prostate cancer models. FIG. 5 shows the in vivo PET images of the uptake of these two labelled compounds in tumors at 4 and 24 h p.i. The graph in FIG. 6 directly compares the tumoral uptake of these two labelled compounds at 4 h, 6 h, and 24 h p.i. in four of the tumor models investigated in this study. Due to the large variation in tumor size for the LNCaP tumors, the ex vivo data shows a minimal increase in tumoral uptake over the PC3 tumors, but both the murine B16-F10 melanoma tumors and 4T1 breast cancer tumors showed greater uptake of the $^{64}$Cu- and [$^{18}$F]—AlF-NO2A-cysVar3 compounds compared to the human prostate cancer models. The greater uptake in the allografted tumors may indicate that the relative overall tumor environment is less acidic (higher) in the slower growing human cell lines investigated (PC3 and LNCaP), but is more acidic (lower) in the faster growing murine cell lines (B16-F10 and 4T1). $^{64}$Cu-NO2A-cys Var3 and [$^{18}$F]—AlF-NO2A-cysVar3 exhibited a high tumor:background contrast in B16-F10 murine melanoma tumor-bearing mice, which was useful to identify very small tumors (<17 mg; ~4 mm$^3$) in the PET image.

Figure 12A:
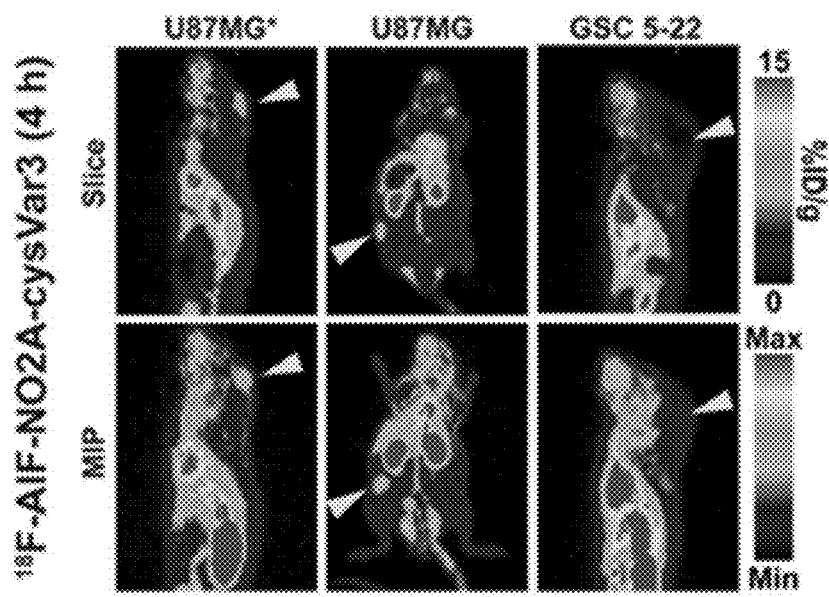
FIGS. 12A and 12B show initial results from the brain tumor uptake study disclosed herein.
Figure 12B:
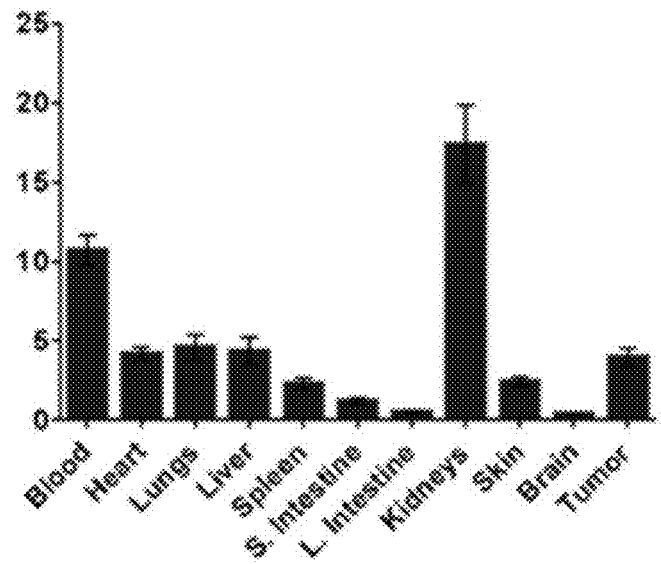

Because of the low uptake of the complexes of the present technology in brain tissue, the [$^{18}$F]—AlF-NO2A-cysVar3 was also evaluated in U87MG tumor-bearing mice. These tumors were implanted into the brain cavity or xenografted subcutaneously on the flank of nude mice. FIG. 12A shows the imaging of these tumors. The uptake in the U87MG tumors that were implanted into the brain cavity showed significant uptake of the tracer in the portion of the tumor that was outside the skull. During necropsy, these tumors did not show significant infiltration of the brain. The ex vivo biodistribution of [$^{18}$F]—AlF-NO2A-cysVar3 at 6 h p.i. in the nude mice with flank tumors is included in FIG. 12B. In order to conclusively determine if the uptake of [$^{18}$F]—AlF-NO2A-cysVar3 was only in the portion of the tumor outside of the skull, a group of mice with GSC 5-22 tumors orthotopically xenografted behind an intact blood-brain barrier (BBB) were obtained. During necropsy, these tumors had infiltrated half of the brain, but there was no uptake observed in the PET image. See FIG. 12A. For the brain tumor models, both an orthotopic and a subcutaneous (flank) brain tumor mouse model indicated that the [$^{18}$F]—AlF-NO2A-cysVar3 was unable to penetrate an intact BBB, but was able to target brain tumors that had developed outside the BBB (FIG. 12A). Thus, the complexes disclosed herein may be useful in identifying metastases and possibly brain tumors in situations of compromised BBBs.

Specific activity investigation. The complexes disclosed herein were prepared to have comparable specific activities (approximately 100 µCi/nmol (3.7 MBq/nmol)) for most of the studies. A few additional studies were conducted with higher and lower specific activities in order to compare the effect of specific activity on tumoral uptake. The data sets were analyzed individually and showed that specific activity did not impact the biodistribution of the tracers, especially tumoral uptake. Thus, all of the data points for similar tumor models were averaged in aggregate (regardless of specific activity) and tabulated in FIGS. 22-71.

Figure 7:
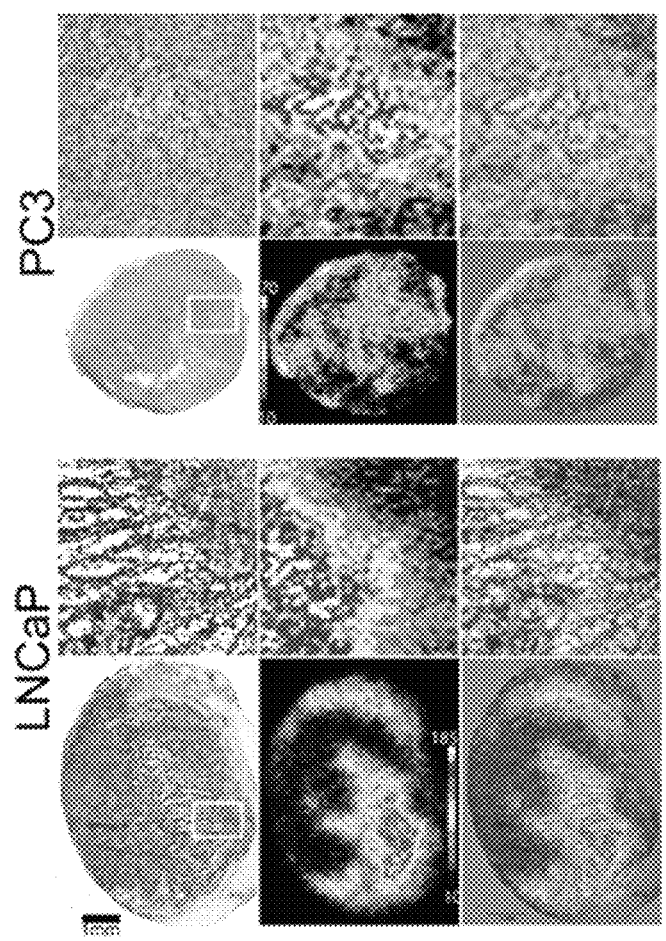
FIG. 7 shows a comparison of uptake in sections of excised tumors from PC3 or LNCaP tumor-bearing male nude mice. The top panels are expansions of the whole tumor sections shown below. The left-most panels are H&E stained, the middle panels are the autoradiography, and the right-most panels are overlays.
Figure 13:
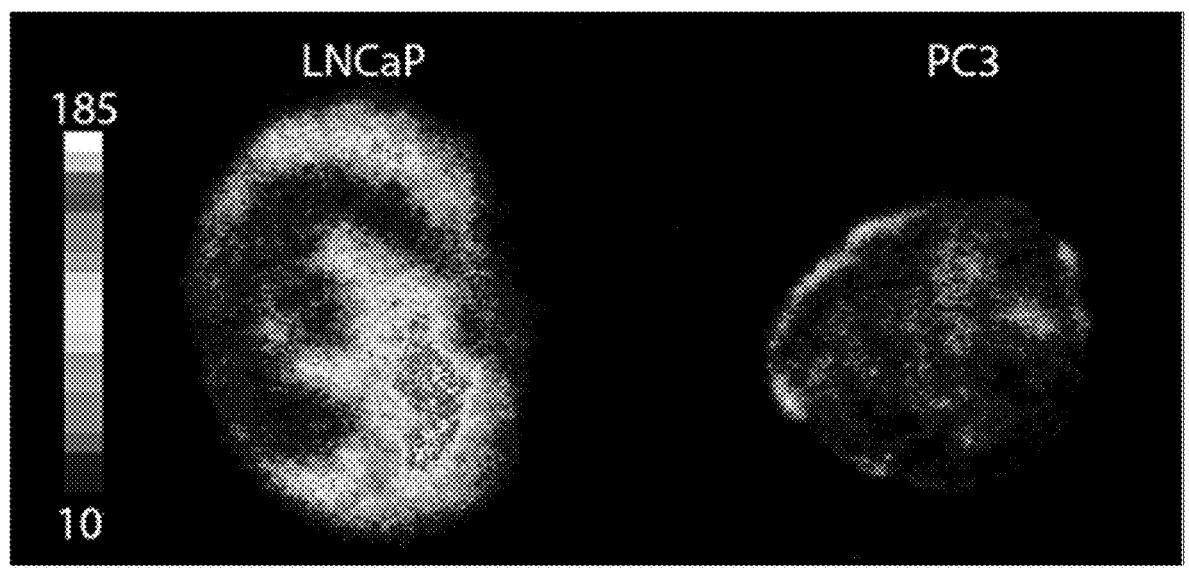
FIG. 13 shows the relative autoradiography of tumor slices from FIG. 7. The slices show the overall difference in uptake of the tracer at 24 h p.i. Both of the slices were on the same autoradiography plate and, therefore, are relative to each other.

Tissue autoradiography results. The uptake of $^{64}$Cu-NO2A-cys Var3 (24 h p.i.) in LNCaP and PC3 tumors was investigated via autoradiography with viable tissue stained with hematoxylin and eosin (H&E) to determine if the uptake was specific to regions showing indications of metabolic stress or necrosis. FIG. 7 shows that the uptake of $^{64}$Cu-NO2A-cys Var3 appears to correlate in part with necrotic regions in LNCaP tumors, but not in PC3 tumors. Without wishing to be bound by theory, it is believed that this observation may be a result of the PC3 tumors having less overall necrosis than the LNCaP tumors in this study. Further, autoradiography result shows increased relative uptake of $^{64}$Cu-NO2A-cysVar3 (24 h p.i.) in LNCaP over PC3 tumors (FIG. 13). H&E staining of tumor sections from 4T1 tumors excised 5-12 days post inoculation showed nonnecrotic tumor tissue; thus, the greater tumoral uptake of the $^{64}$Cu-NO2A-cysVar3 (according to the ex vivo biodistribution data) does not appear to be correlated with necrosis.

In vivo studies in 4T1 tumor models. Direct in vivo evaluation of all twelve complexes disclosed herein was carried out in 4T1 orthotopic (surgically implanted) allografted female BALB/c mice in order to determine which compounds would be translated into clinical studies. FIGS. 3A-3C show the in vivo PET imaging slices at the level of the tumor at 4 h p.i. of eleven of the fifteen complexes tested and the ex vivo biodistribution in selected organs at 4 and 24 h p.i. (% ID/g, mean±S.D.). The corresponding maximum intensity projections (MIPs) from the PET imaging study and the PET imaging slices at the level of the tumor with a lower maximum value for better visualization of the tumor at 4 h p.i. for the [$^{18}$F]—AlF-NO2A-cyspHLIP complexes are shown in FIGS. 8A-8B.

The 4 h ex vivo biodistribution values (% ID/g, mean±S.D.) are collected in Tables 3 and 4 for twelve of the radiopharmaceutical complexes disclosed herein, and the complete biodistribution results for all time points of all fifteen complexes are tabulated in FIGS. 22-71.

Table 3 shows a biodistribution (% ID/g) of six radiolabeled N-terminus derivatized NOTA-pHLIP derivatives in 4T1 allografted female BALB/c mice at 4 h p.i.

TABLE 3

| Tissue | $^{64}$Cu-NOTA-WT (n = 4) | $^{64}$Cu-NOTA-Var3 (n = 5) | $^{64}$Cu-NOTA-Var7 (n = 4) | [$^{18}$F]—AlF-NOTA-WT (n = 5) | [$^{18}$F]—AlF-NOTA-Var3 (n = 4) | [$^{18}$F]—AlF-NOTA-Var7 (n = 5) |
|---|---|---|---|---|---|---|
| Blood | 1.192 ± 0.263 | 1.371 ± 0.244 | 0.833 ± 0.068 | 1.978 ± 0.192 | 2.201 ± 0.374 | 2.292 ± 0.277 |
| Heart | 0.50 ± 0.04 | 0.49 ± 0.05 | 0.35 ± 0.04 | 0.66 ± 0.12 | 0.78 ± 0.08 | 0.78 ± 0.06 |
| Lungs | 1.414 ± 0.083 | 1.420 ± 0.117 | 0.996 ± 0.066 | 2.049 ± 0.211 | 2.217 ± 0.380 | 2.325 ± 0.212 |
| Liver | 0.904 ± 0.097 | 1.034 ± 0.150 | 0.739 ± 0.041 | 0.973 ± 0.213 | 0.923 ± 0.153 | 1.089 ± 0.066 |

TABLE 3-continued

| Tissue | $^{64}$Cu-NOTA-WT (n = 4) | $^{64}$Cu-NOTA-Var3 (n = 5) | $^{64}$Cu-NOTA-Var7 (n = 4) | [$^{18}$F]—AlF-NOTA-WT (n = 5) | [$^{18}$F]—AlF-NOTA-Var3 (n = 4) | [$^{18}$F]—AlF-NOTA-Var7 (n = 5) |
|---|---|---|---|---|---|---|
| Spleen | 0.318 ± 0.023 | 0.340 ± 0.032 | 0.279 ± 0.016 | 0.434 ± 0.058 | 0.469 ± 0.093 | 0.485 ± 0.029 |
| Pancreas | 0.261 ± 0.066 | 0.279 ± 0.041 | 0.198 ± 0.043 | 0.324 ± 0.059 | 0.332 ± 0.020 | 0.373 ± 0.051 |
| Stomach | 0.282 ± 0.080 | 0.194 ± 0.050 | 0.300 ± 0.076 | 0.518 ± 0.152 | 0.482 ± 0.223 | 0.593 ± 0.153 |
| S. intestine | 0.391 ± 0.082 | 0.320 ± 0.042 | 0.307 ± 0.077 | 0.820 ± 0.245 | 0.927 ± 0.152 | 0.776 ± 0.196 |
| L. intestine | 9.96 ± 3.42 | 7.45 ± 2.73 | 7.78 ± 0.61 | 24.06 ± 2.85 | 22.05 ± 2.46 | 22.08 ± 6.02 |
| Kidneys | 6.232 ± 0.613 | 7.165 ± 1.126 | 6.790 ± 0.461 | 8.550 ± 1.138 | 8.237 ± 1.106 | 7.759 ± 0.658 |
| Muscle | 0.166 ± 0.008 | 0.171 ± 0.017 | 0.118 ± 0.025 | 0.283 ± 0.041 | 0.282 ± 0.055 | 0.325 ± 0.073 |
| Bone | 0.274 ± 0.051 | 0.339 ± 0.018 | 0.229 ± 0.093 | 0.671 ± 0.305 | 0.540 ± 0.119 | 0.571 ± 0.202 |
| Skin | 0.715 ± 0.109 | 0.775 ± 0.102 | 0.563 ± 0.145 | 1.032 ± 0.133 | 1.126 ± 0.115 | 1.377 ± 0.148 |
| Brain | 0.054 ± 0.002 | 0.063 ± 0.011 | 0.042 ± 0.004 | 0.100 ± 0.015 | 0.107 ± 0.023 | 0.118 ± 0.011 |
| Tumor | 0.679 ± 0.025 | 0.649 ± 0.091 | 0.546 ± 0.075 | 1.005 ± 0.232 | 0.923 ± 0.119 | 1.105 ± 0.125 |

Table 4 shows a biodistribution (% ID/g) of six radiolabeled cysteine derivatized NO2A-cyspHLIP derivatives in 4T1 allografted female BALB/c mice at 4 h p.i.

TABLE 4

| Tissue | $^{64}$Cu-NO2A-cysWT (n = 4) | $^{64}$Cu-NO2A-cysVar3 (n = 5) | $^{64}$Cu-NO2A-cysVar7 (n = 4) | [$^{18}$F]—AlF-NO2A-cysWT (n = 4) | [$^{18}$F]—AlF-NO2A-cysVar3 (n = 10) | [$^{18}$F]—AlF-NO2A-cysVar7 (n = 4) |
|---|---|---|---|---|---|---|
| Blood | 17.6 ± 0.86 | 15.4 ± 1.76 | 2.31 ± 0.18 | 15.9 ± 0.63 | 20.8 ± 1.88 | 1.64 ± 0.18 |
| Heart | 5.52 ± 0.15 | 5.12 ± 0.63 | 2.68 ± 0.33 | 4.78 ± 0.53 | 6.29 ± 1.03 | 0.89 ± 0.12 |
| Lungs | 12.3 ± 1.55 | 14.7 ± 0.93 | 4.21 ± 0.23 | 8.73 ± 0.84 | 11.8 ± 3.79 | 1.66 ± 0.07 |
| Liver | 21.9 ± 0.64 | 10.4 ± 0.63 | 15.6 ± 1.58 | 12.6 ± 11.4 | 9.06 ± 1.24 | 2.90 ± 0.18 |
| Spleen | 7.07 ± 0.44 | 3.45 ± 0.35 | 3.31 ± 0.24 | 5.31 ± 0.34 | 3.73 ± 0.66 | 1.19 ± 0.10 |
| Pancreas | 3.00 ± 0.08 | 2.31 ± 0.25 | 1.84 ± 0.10 | 2.10 ± 0.43 | 2.44 ± 0.20 | 0.49 ± 0.03 |
| Stomach | 1.82 ± 0.13 | 1.27 ± 0.35 | 3.33 ± 0.31 | 1.31 ± 0.96 | 1.29 ± 0.62 | 0.68 ± 0.10 |
| S. intestine | 4.56 ± 0.26 | 2.68 ± 0.24 | 6.37 ± 0.11 | 2.85 ± 0.31 | 2.06 ± 0.28 | 0.91 ± 0.03 |
| L. intestine | 4.09 ± 0.34 | 2.99 ± 0.20 | 8.19 ± 0.85 | 1.47 ± 0.14 | 2.07 ± 0.63 | 0.91 ± 0.12 |
| Kidneys | 40.6 ± 4.04 | 24.0 ± 2.78 | 95.5 ± 11.9 | 59.1 ± 3.63 | 34.3 ± 6.91 | 246 ± 25.6 |
| Muscle | 1.15 ± 0.08 | 1.10 ± 0.15 | 0.64 ± 0.07 | 1.23 ± 0.17 | 1.55 ± 0.27 | 0.35 ± 0.06 |
| Bone | 3.04 ± 0.11 | 1.10 ± 0.14 | 1.57 ± 0.18 | 1.94 ± 0.45 | 1.66 ± 0.61 | 0.60 ± 0.12 |
| Skin | 3.23 ± 0.12 | 3.43 ± 0.34 | 2.59 ± 0.05 | 2.85 ± 0.22 | 2.92 ± 0.71 | 1.59 ± 0.10 |
| Brain | 0.62 ± 0.06 | 0.35 ± 0.07 | 0.25 ± 0.02 | 0.34 ± 0.06 | 0.52 ± 0.14 | 0.05 ± 0.01 |
| Tumor | 11.7 ± 1.71 | 8.21 ± 0.86 | 9.07 ± 1.81 | 8.16 ± 0.53 | 10.6 ± 2.26 | 8.61 ± 1.21 |

Figure 16:
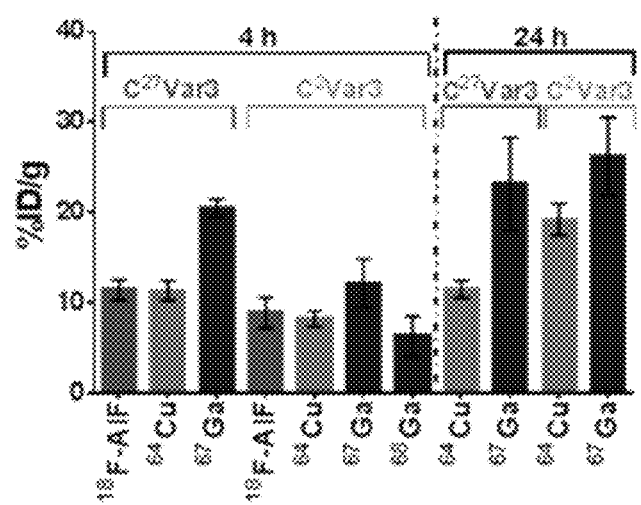
FIG. 16 shows tumoral uptake at 4 and 24 h post-injection in 4T1 tumor-bearing female BALB/c mice with the various isotopes ($^{18}F$, $^{64}Cu$, $^{67/68}Ga$) with the NO2A chelator conjugated to two different ends of the peptide through a cysteine conjugation ($C^2$Var3 and $C^{27}$Var3).
Figure 17:
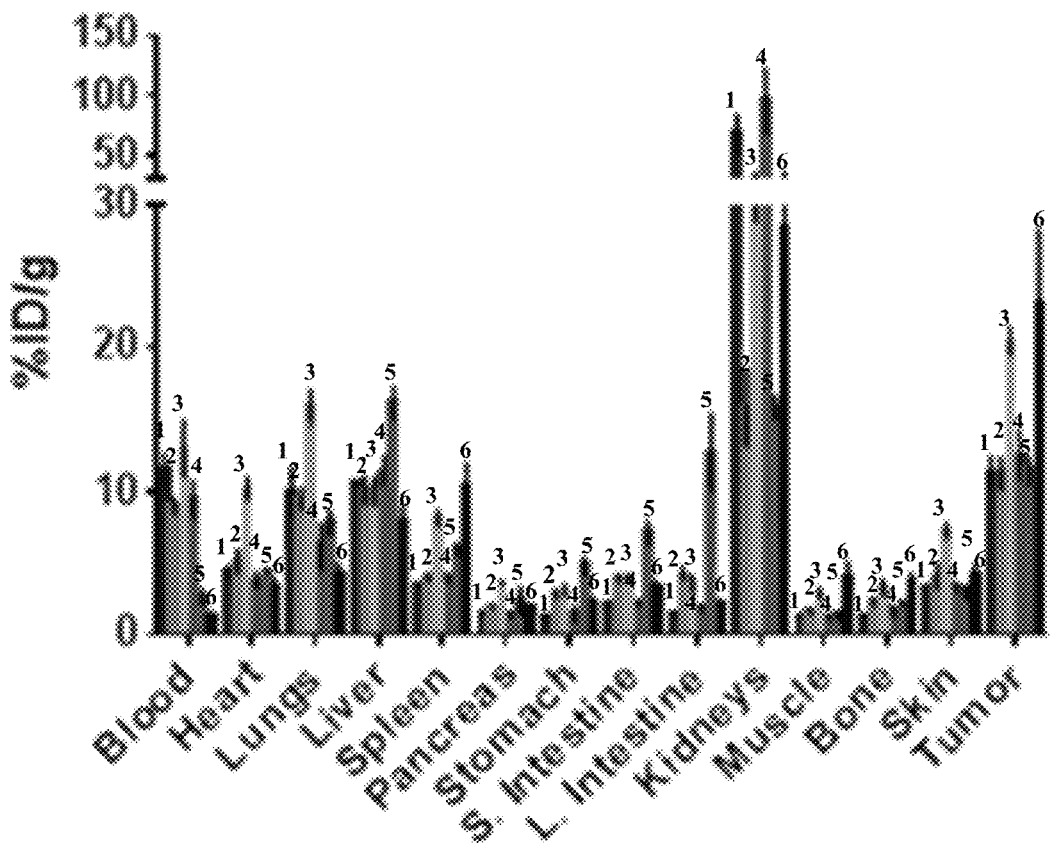
FIG. 17 shows biodistribution (% ID/g) of NO2A-$C^{27}$Var3 labeled compounds in 4T1 tumor-bearing female BALB/c mice at 4, 6, and 24 h post-injection with significant tumoral uptake by the tumor of the $^{67}Ga$ labeled material at 4 and 24 h.

Two positron emitting radionuclides ($^{64}$Cu and $^{18}$F) were used to label the NOTA- and NO2A-derivatized Var3, Var7, and WT peptides for in vivo biodistribution studies in 4T1 orthotopic tumor-bearing BALB/c mice. All of the complexes were radiolabeled with $^{64}$Cu or [$^{18}$F]—AlF in good yield. The in vivo biodistribution of the twelve complexes in 4T1 orthotopic allografted female BALB/c mice indicated that NO2A-cysVar3, radiolabeled with either $^{18}$F (4T1 uptake; 8.9±1.7% ID/g at 4 h p.i.), $^{64}$Cu (4T1 uptake; 8.2±0.9% ID/g at 4 h p.i. and 19.2±1.8% ID/g at 24 h p.i.), $^{67}$Ga-NO2A-cysVar3 (4T1 uptake; 12±3% ID/g at 4 h p.i. and 26±4% ID/g at 24 h p.i.), or $^{67}$Ga-NO2A-C$^{27}$Var3 (4T1 uptake; 20.5±1.0% ID/g at 4 h p.i. and 23±5% ID/g at 24 h p.i.) show superior biodistribution properties (FIGS. 16 and 17).

$^{67}$Ga-NO2A-cys Var3 (positively charged metal complex and positively charged N-terminus) shows a slightly higher tumoral uptake than $^{64}$Cu-NO2A-cysVar3 (neutrally charged metal complex and positively charged N-terminus) at 4 and 24 h.p.i. See FIGS. 16 and 18. However, this was not true for the $^{68}$Ga-NO2A-cysVar3 complex (FIG. 16), which suggests a difference in the complex formation between the different radiolabels and pHLIP complex. Further, $^{67}$Ga-NO2A-C$^{27}$Var3 exhibited higher tumor accumulation at 4 h (see FIGS. 16 and 19B) than $^{68}$Ga-NO2A-cys Var3 complex.

Figure 19A:
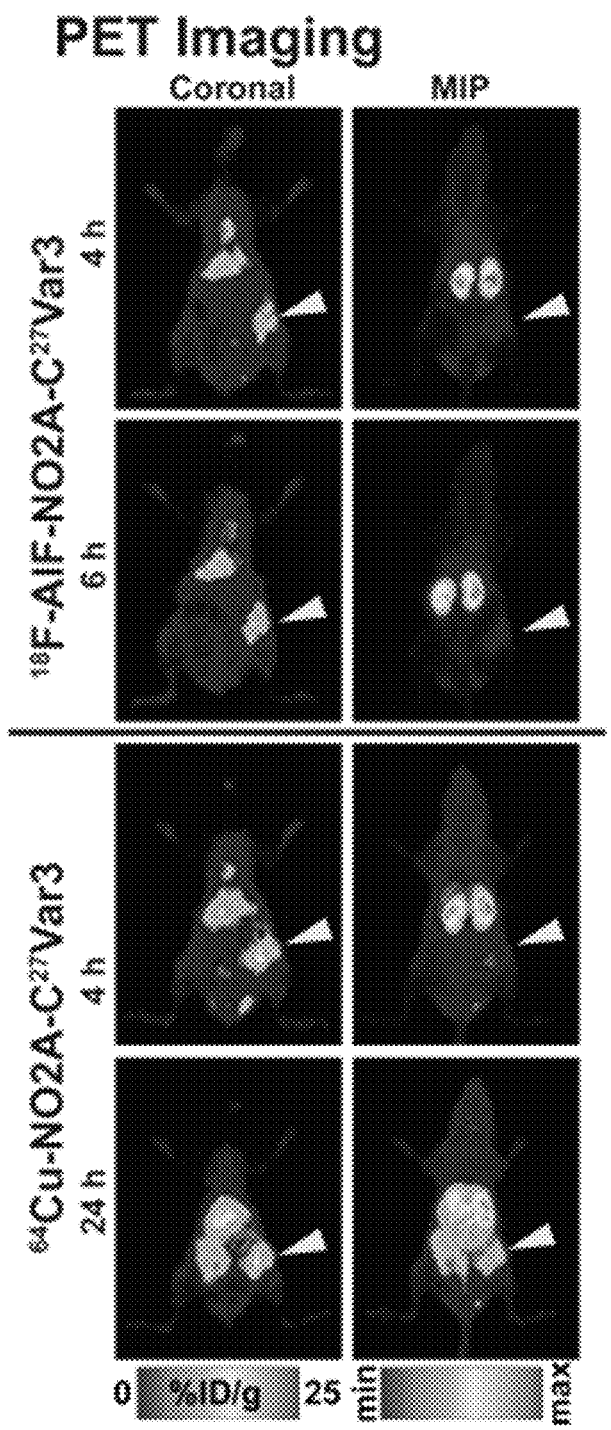
FIGS. 19A and 19B show PET (FIG. 19A) and SPECT/CT (FIG. 19B) imaging of NO2A-$C^{27}$Var3 labeled compounds in 4T1 tumor-bearing female BALB/c mice at 4, 6, and 24 h post-injection. Arrowheads indicate where the tumor is located within the mouse.
Figure 19B:
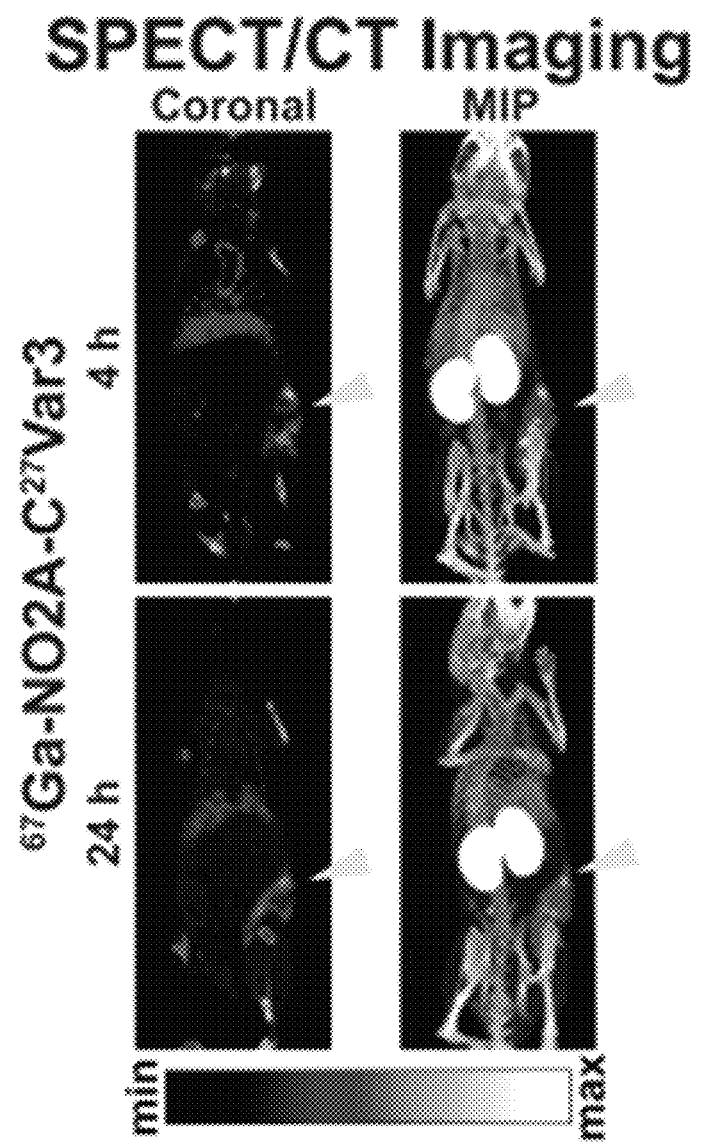

NO2A-C$^{27}$Var3 had much higher kidney uptake compared to the NO2A-C$^2$Var3 complexes (compare FIG. 17 and Table 4) with consistent tumoral uptake (approximately 10% ID/g) at 4, 6, and 24 h post-injection for the neutral complexes (e.g., $^{18}$F and $^{64}$Cu). The $^{64}$Cu-NO2A-C$^{27}$Var3 also showed higher uptake in the small and large intestines at longer time points, which may make imaging with this complex difficult at longer time points (FIG. 19A). Interestingly, $^{67}$Ga-NO2A-C$^{27}$Var3 showed rapid and prolonged tumoral uptake (approximately 20% ID/g) by 4 h post-injection, with low background (non-target tissues not including the kidneys), which allowed visualization of the tumor (FIG. 19B).

Figure 18:
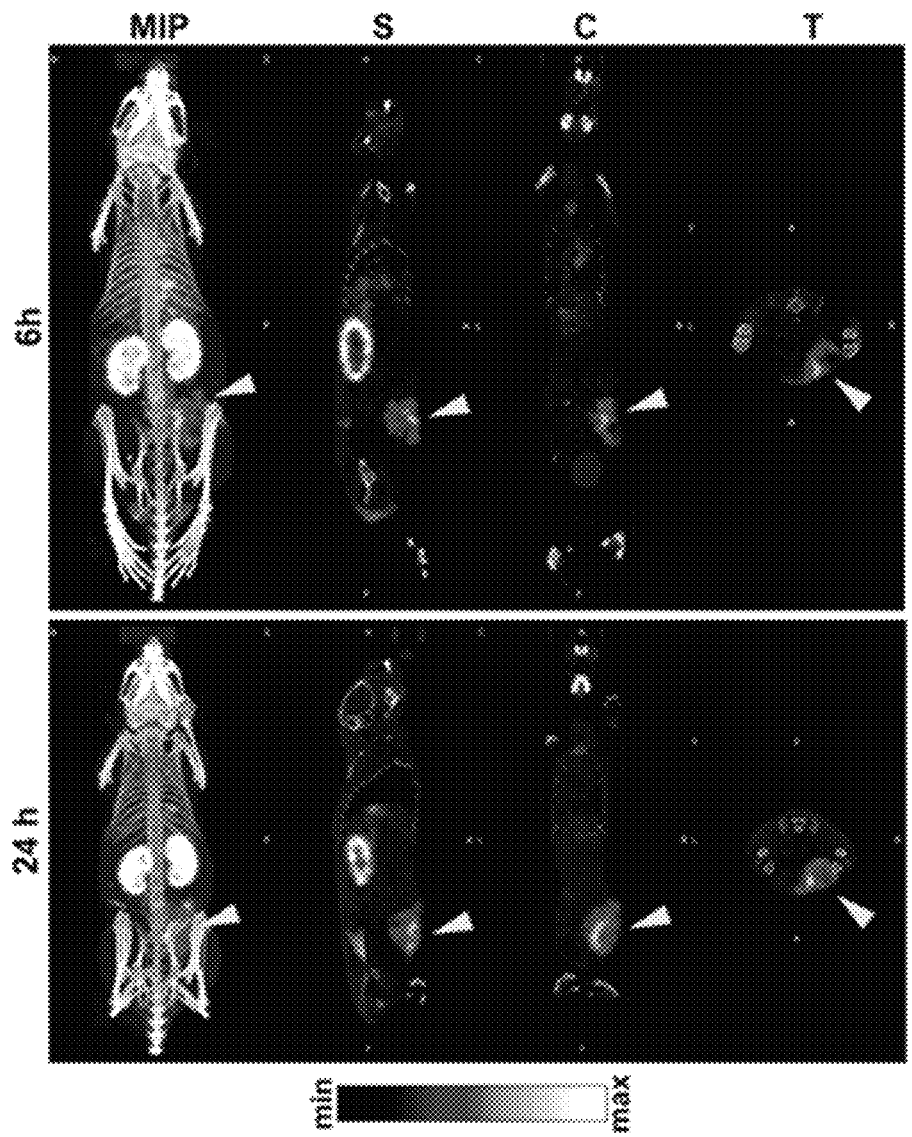
FIG. 18 shows SPECT/CT imaging of $^{67}Ga$-NO2A-cys-Var3 in 4T1 tumor-bearing female BALB/c mice at 4 and 24 h p.i. with significant tumoral uptake. MIP is the maximum intensity projection. S, sagittal; C, coronal; and T, transverse, slices at the level of the tumor. The arrowheads indicate the position of the tumor.
Figure 20:
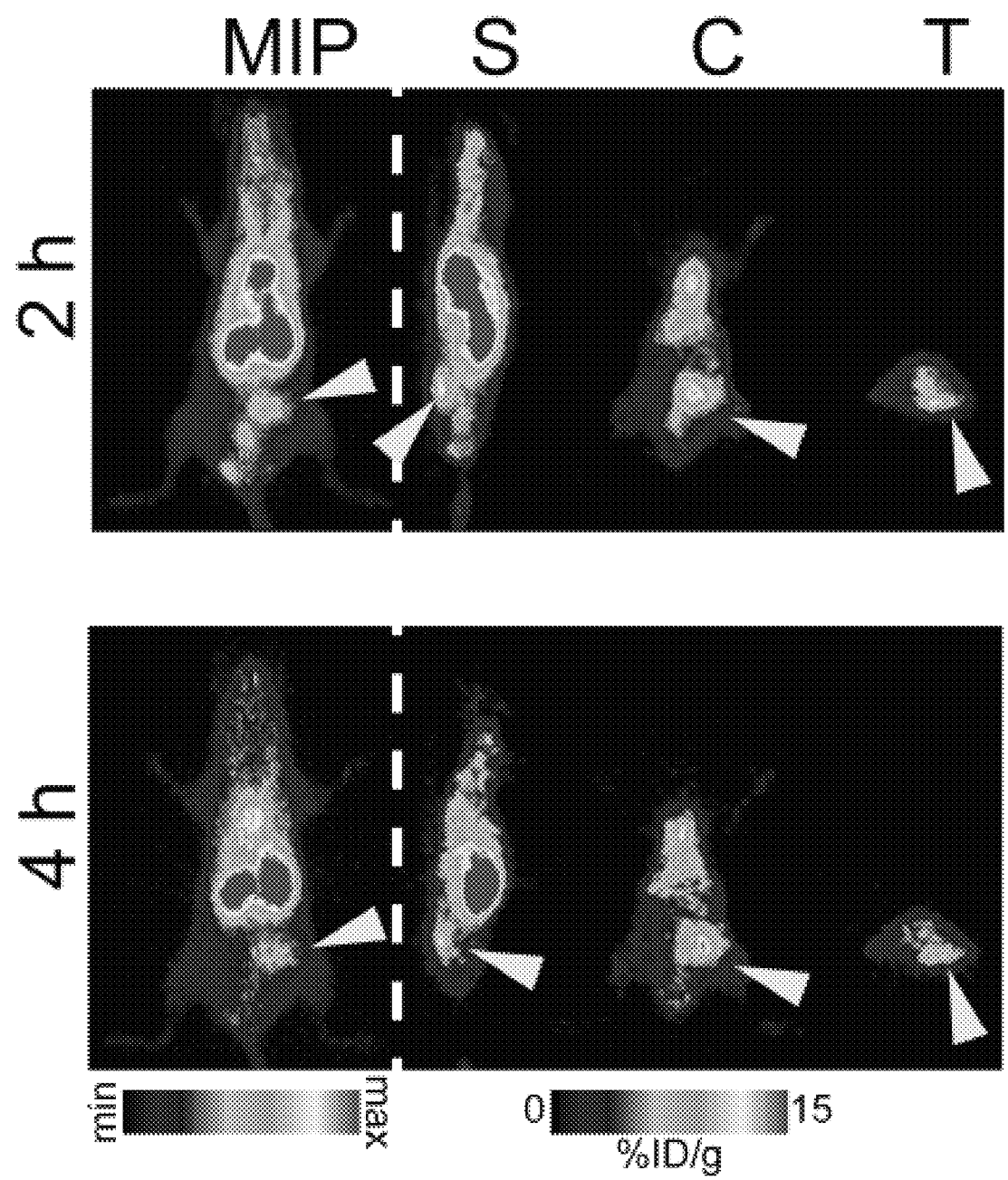
FIG. 20 shows PET ($^{68}Ga$, 2 and 4 h) images of the Ga-NO2A-cys Var3 radioconjugates. The arrowheads point to the tumor. Significant kidney uptake is observed in all images, but the tumor is visible at every time point with greatest tumor:background contrast at 24 h p.i. MIP, maximum intensity projection; S, sagittal; C, coronal; T, transverse.
Figure 24:
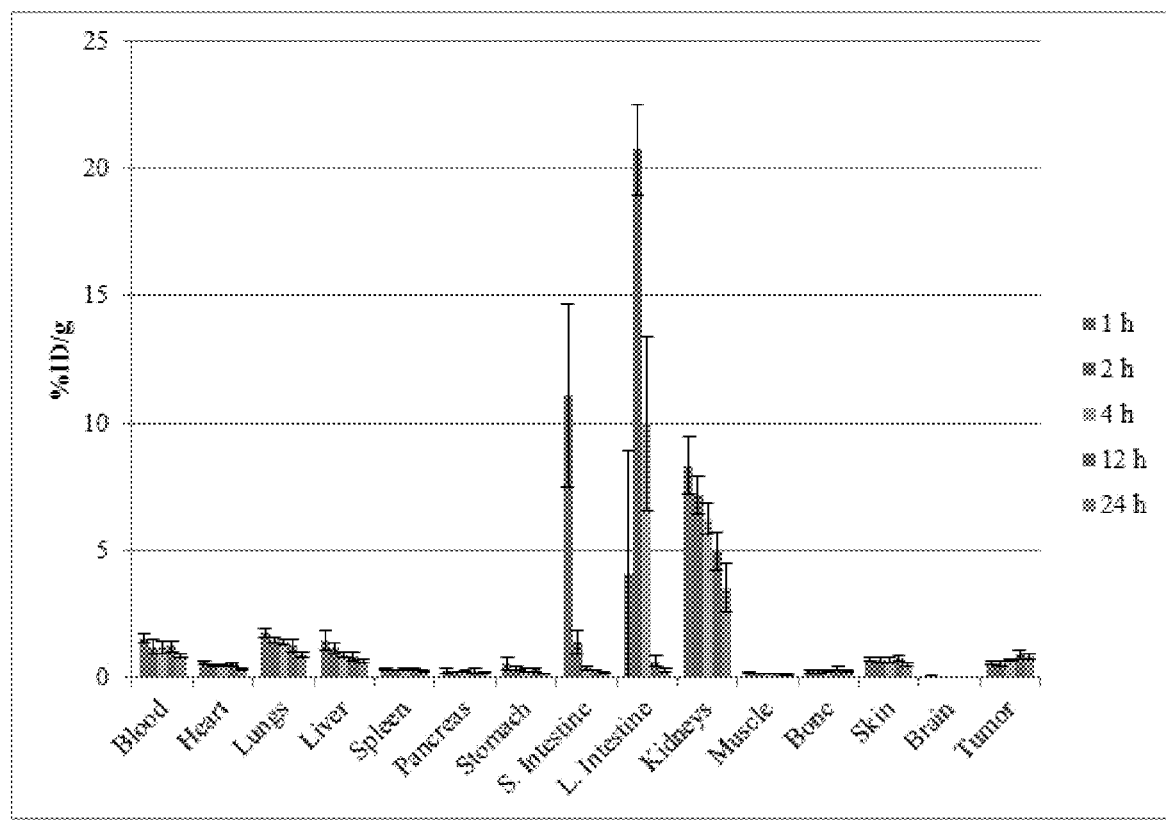
FIG. 24 shows the tissue uptake (mean % ID/g±SD) of $^{64}Cu$-NOTA-WT (n=4 (3 at 24 h)) administered via the lateral tail vein in female, BALB/c mice with orthotopic 4T1 breast cancer allografts implanted into the mammary fat pad.
Figure 27:
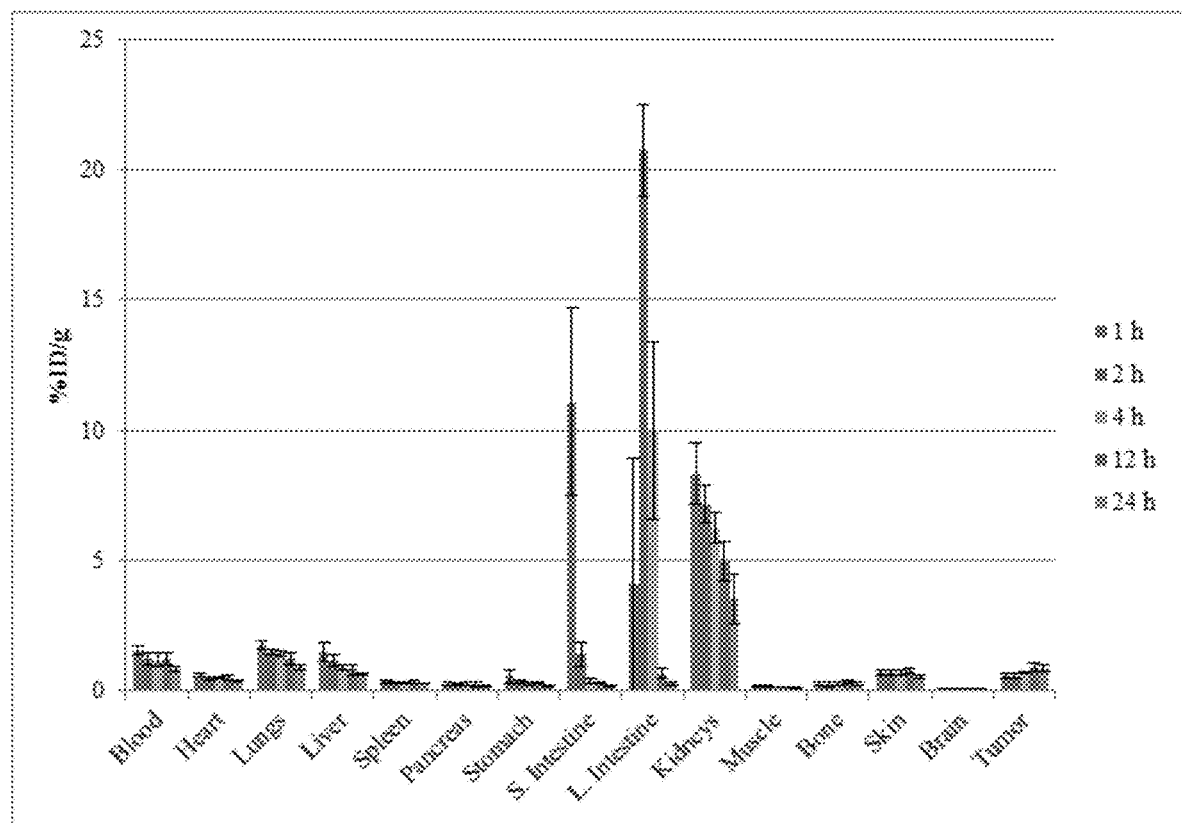
FIG. 27 shows the tissue uptake (mean % ID/g±SD) of $^{64}Cu$-NOTA-Var3 (n=5 (4 at 4 h)) administered via the lateral tail vein in female, BALB/c mice with orthotopic 4T1 breast cancer allografts implanted into the mammary fat pad.
Figure 30:
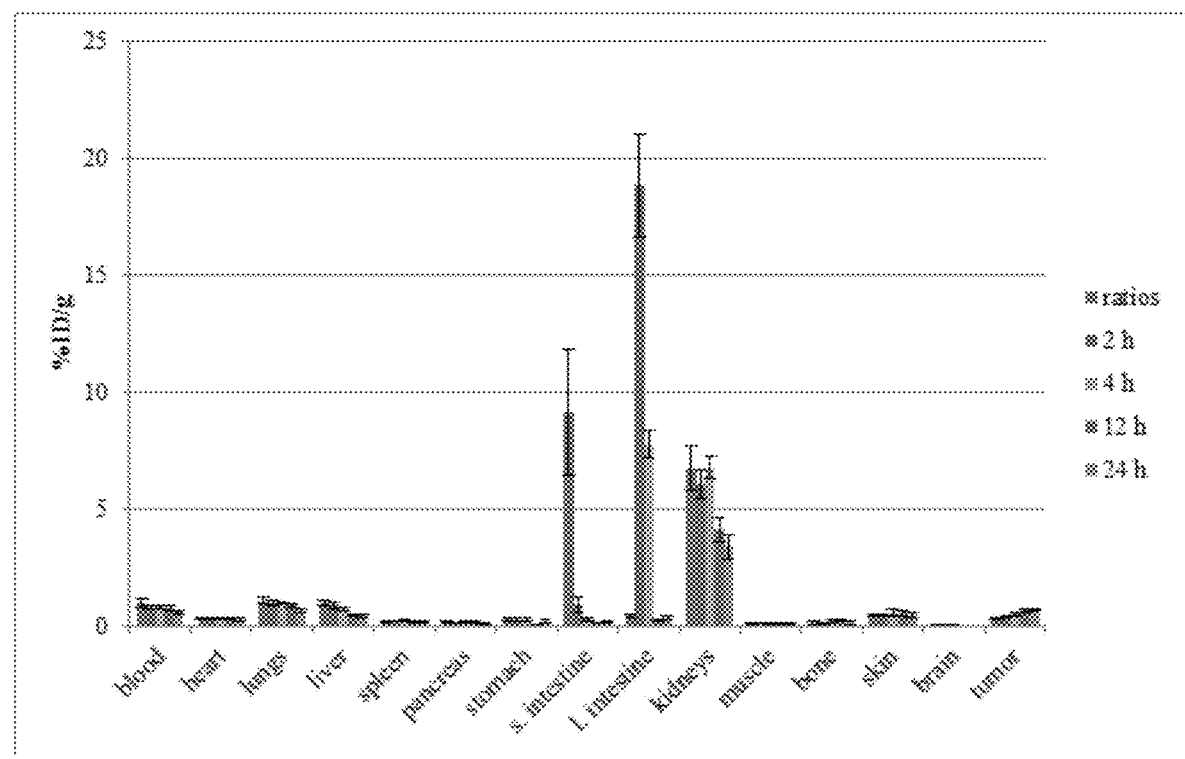
FIG. 30 shows the tissue uptake (mean % ID/g±SD) of $^{64}Cu$-NOTA-Var7 (n=4) administered via the lateral tail vein in female, BALB/c mice with orthotopic 4T1 breast cancer allografts implanted into the mammary fat pad.
Figure 33:
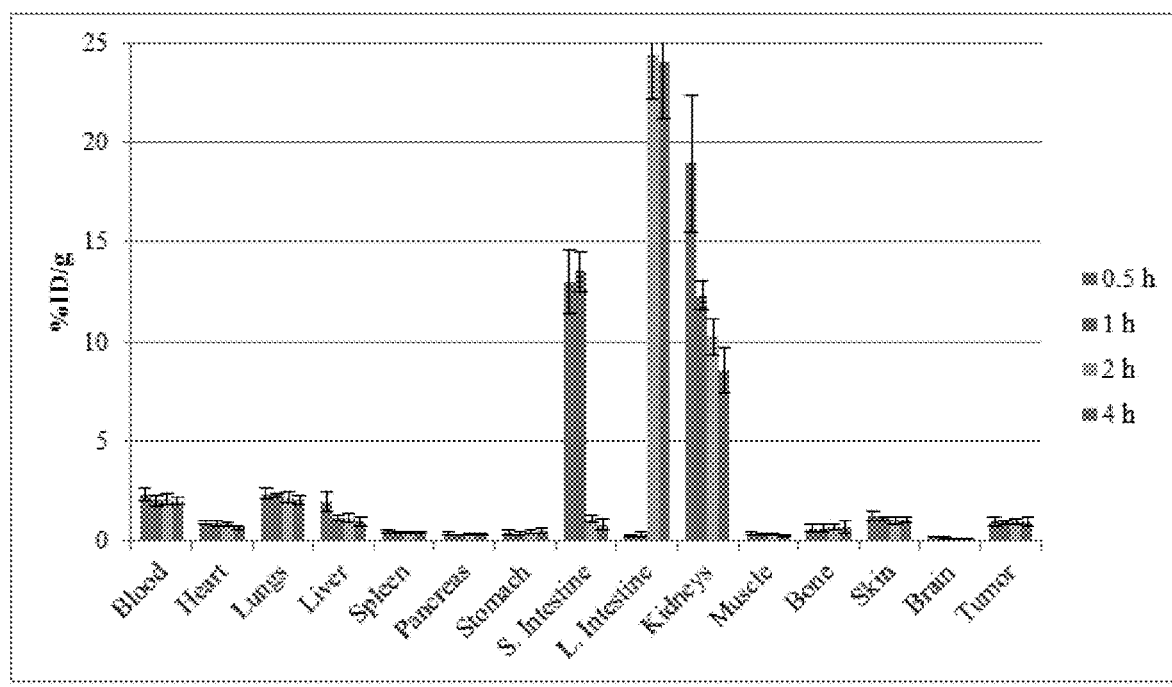
FIG. 33 shows the tissue uptake (mean % ID/g±SD) of [$^{18}F$]—AlF-NOTA-WT (n=5) administered via the lateral tail vein in female, BALB/c mice with orthotopic 4T1 breast cancer allografts implanted into the mammary fat pad.
Figure 36:
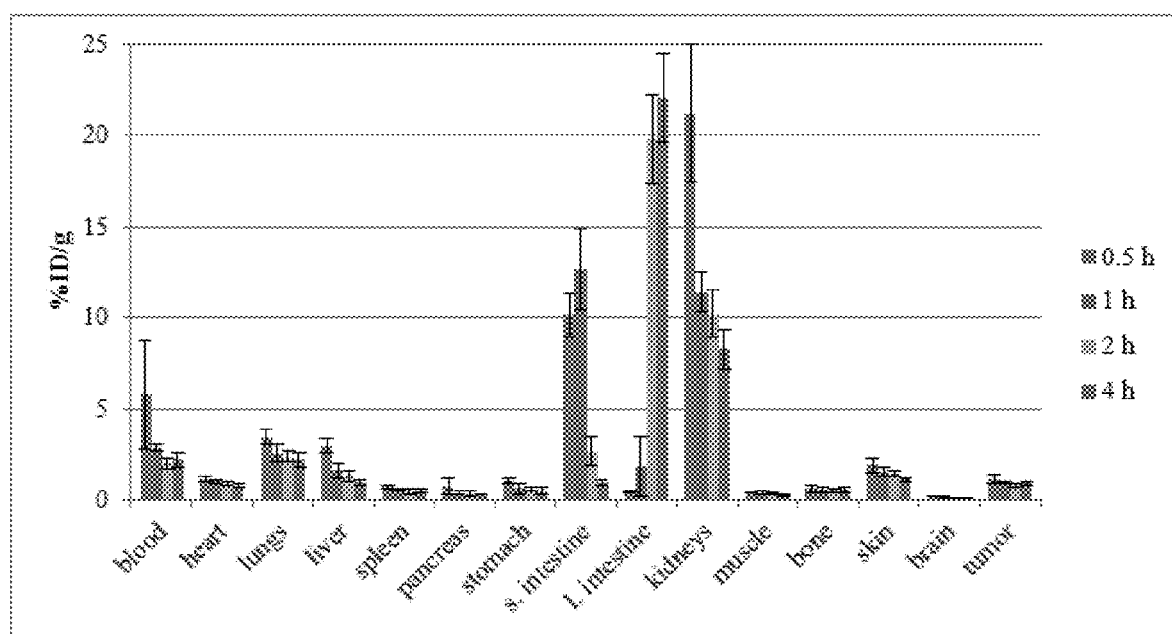
FIG. 36 shows the tissue uptake (mean % ID/g±SD) of [$^{18}F$]—AlF-NOTA-Var3 (n=5 (4 at 4 h)) administered via the lateral tail vein in female, BALB/c mice with orthotopic 4T1 breast cancer allografts implanted into the mammary fat pad.
Figure 39:
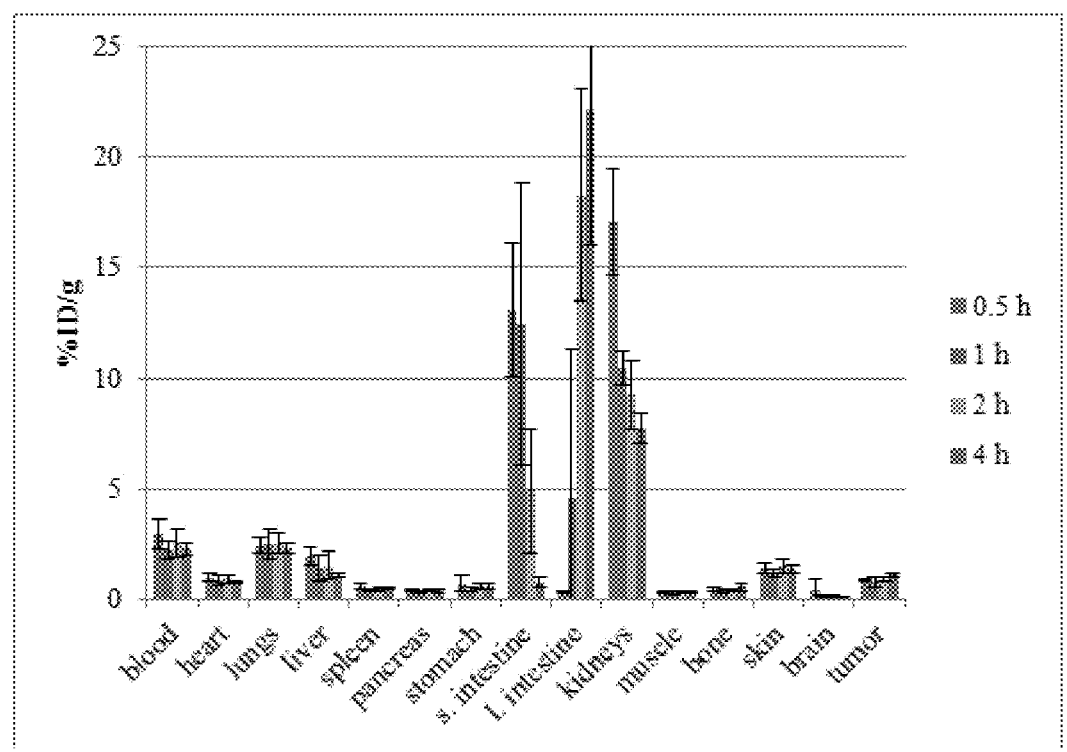
FIG. 39 shows the tissue uptake (mean % ID/g±SD) of [$^{18}F$]—AlF-NOTA-Var7 (n=5) administered via the lateral tail vein in female, BALB/c mice with orthotopic 4T1 breast cancer allografts implanted into the mammary fat pad.
Figure 42:
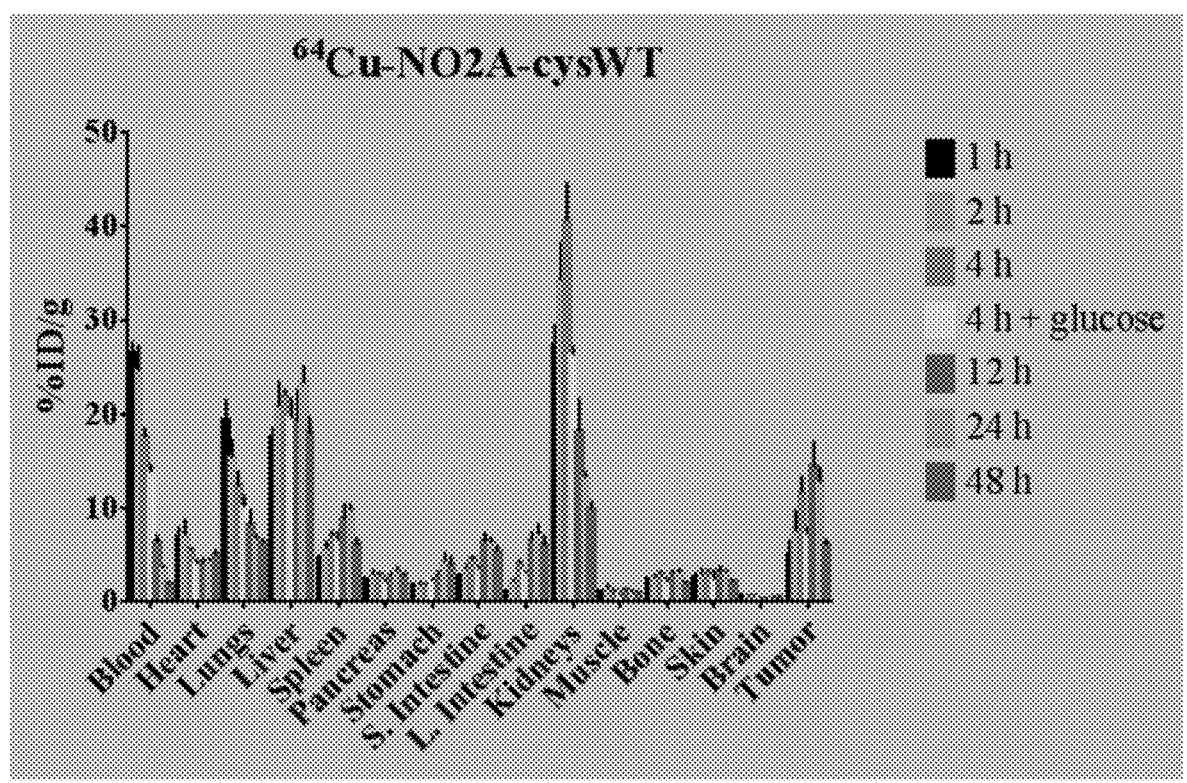
FIG. 42 shows the tissue uptake (mean % ID/g±SD) of $^{64}Cu$-NO2A-cysWT (n=3-5) administered via the lateral tail
Figure 45:
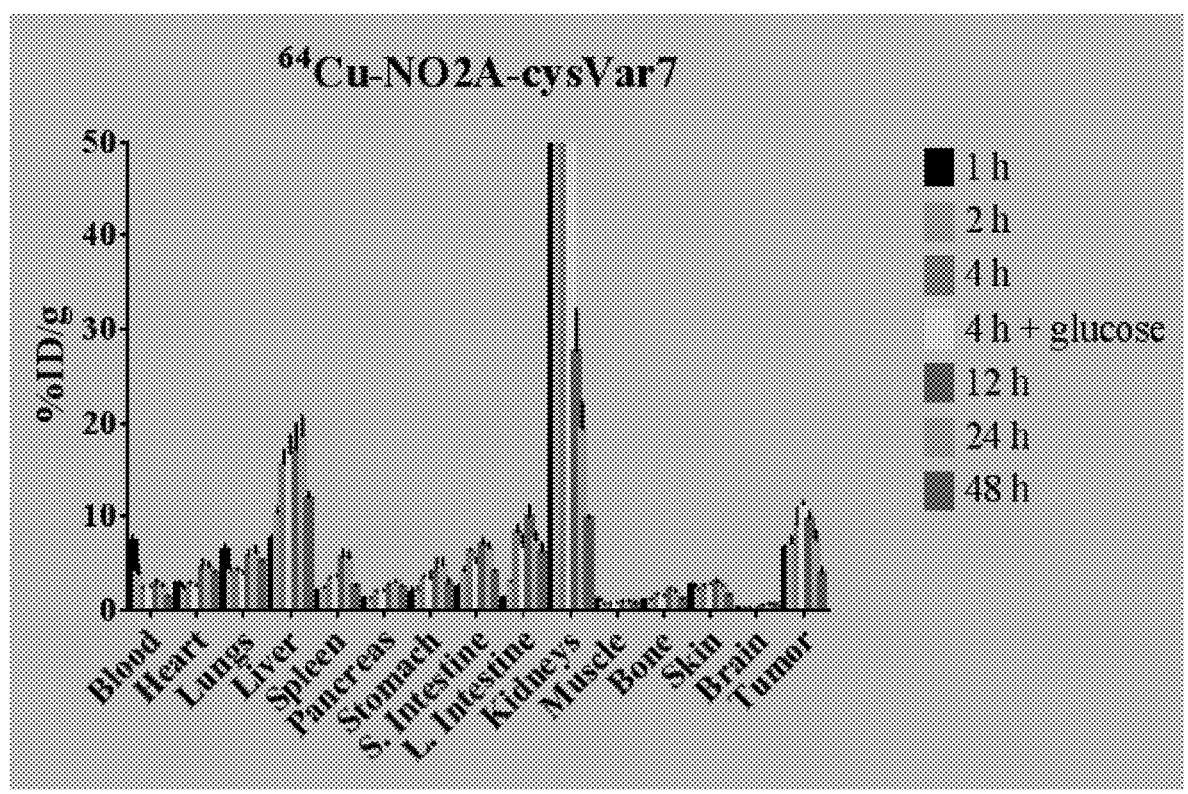
FIG. 45 shows the tissue uptake (mean % ID/g±SD) of $^{64}$Cu-NO2A-cysVar7 (n=4-5) administered via the lateral tail vein in female, BALB/c mice with orthotopic 4T1 breast cancer allografts implanted into the mammary fat pad full graph from text. Glucose was administered i.p. 30 min prior to tracer injection.
Figure 48:
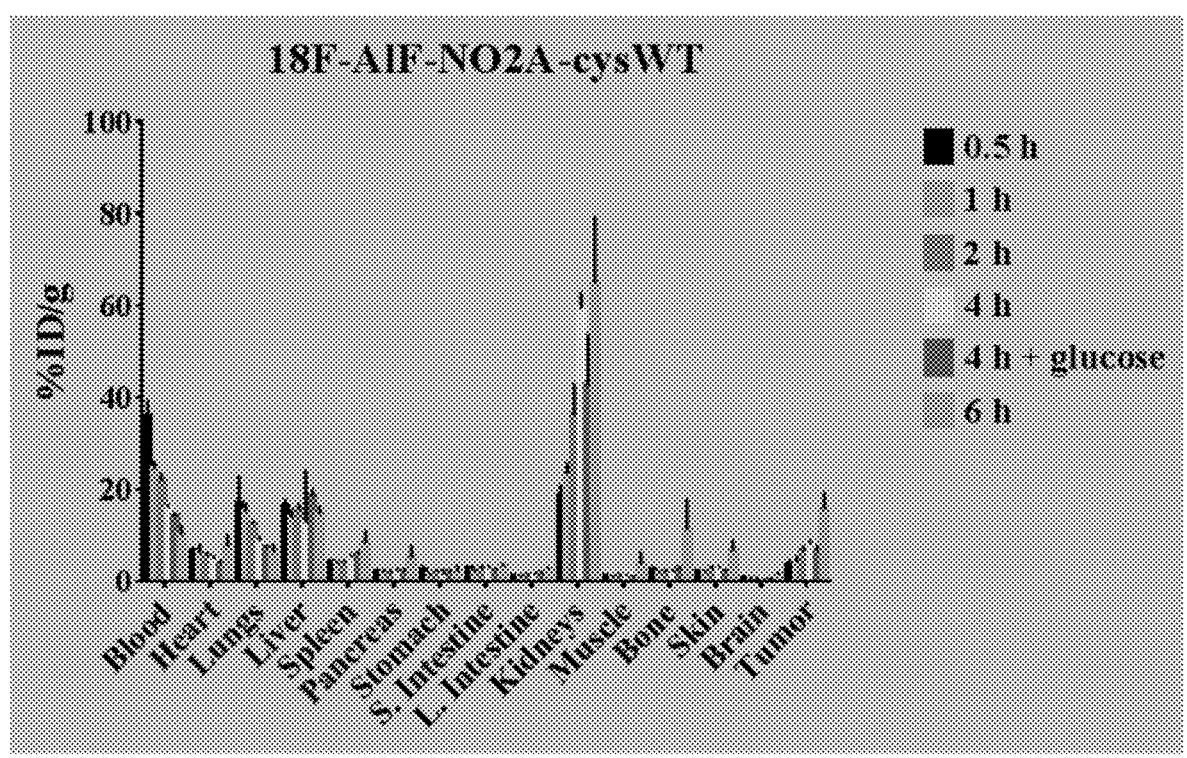
FIG. 48 shows the tissue uptake (mean % ID/g±SD) of [$^{18}$F]—AlF-NO2A-cysWT (n=4) administered via the lateral tail vein in female, BALB/c mice with orthotopic 4T1 breast cancer allografts implanted into the mammary fat pad full graph from text. Glucose was administered i.p. 30 min prior to tracer injection.
Figure 51:
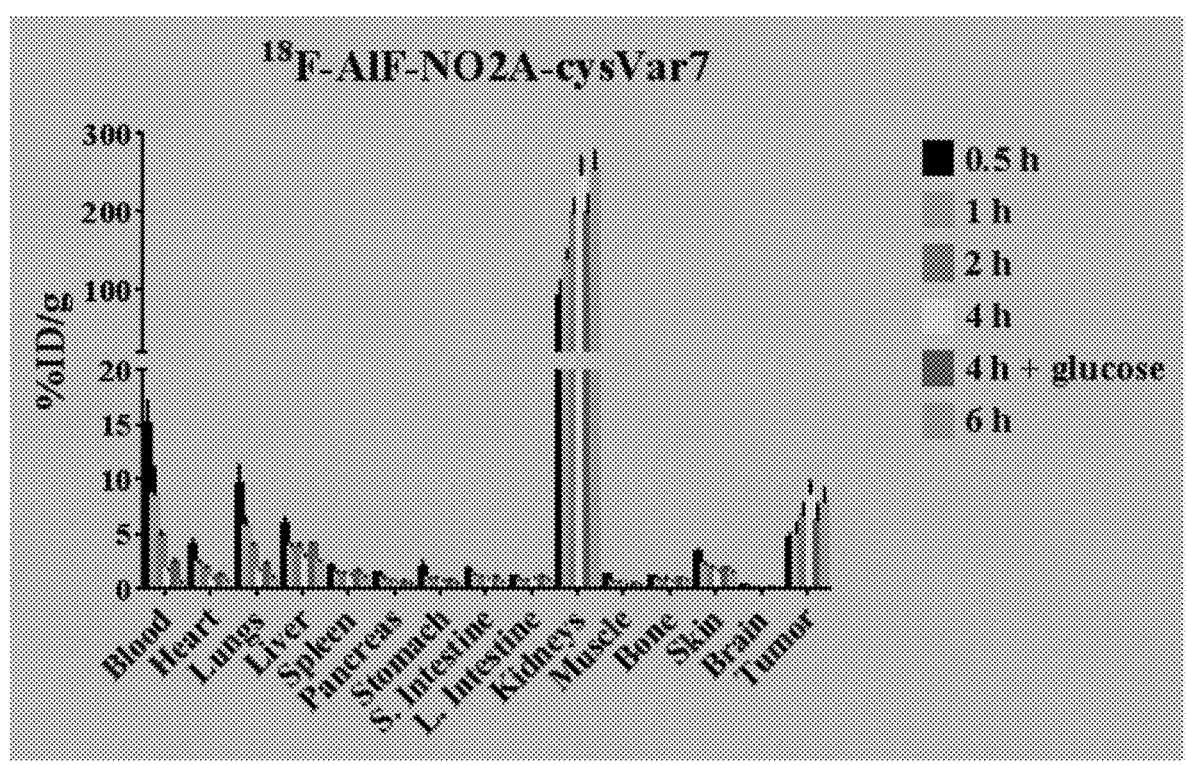
FIG. 51 shows the tissue uptake (mean % ID/g±SD) of [$^{18}$F]—AlF-NO2A-cysVar7 (n=3-5) administered via the lateral tail vein in female, BALB/c mice with orthotopic 4T1 breast cancer allografts implanted into the mammary fat pad full graph from text. Glucose was administered i.p. 30 min prior to tracer injection.
Figure 54:
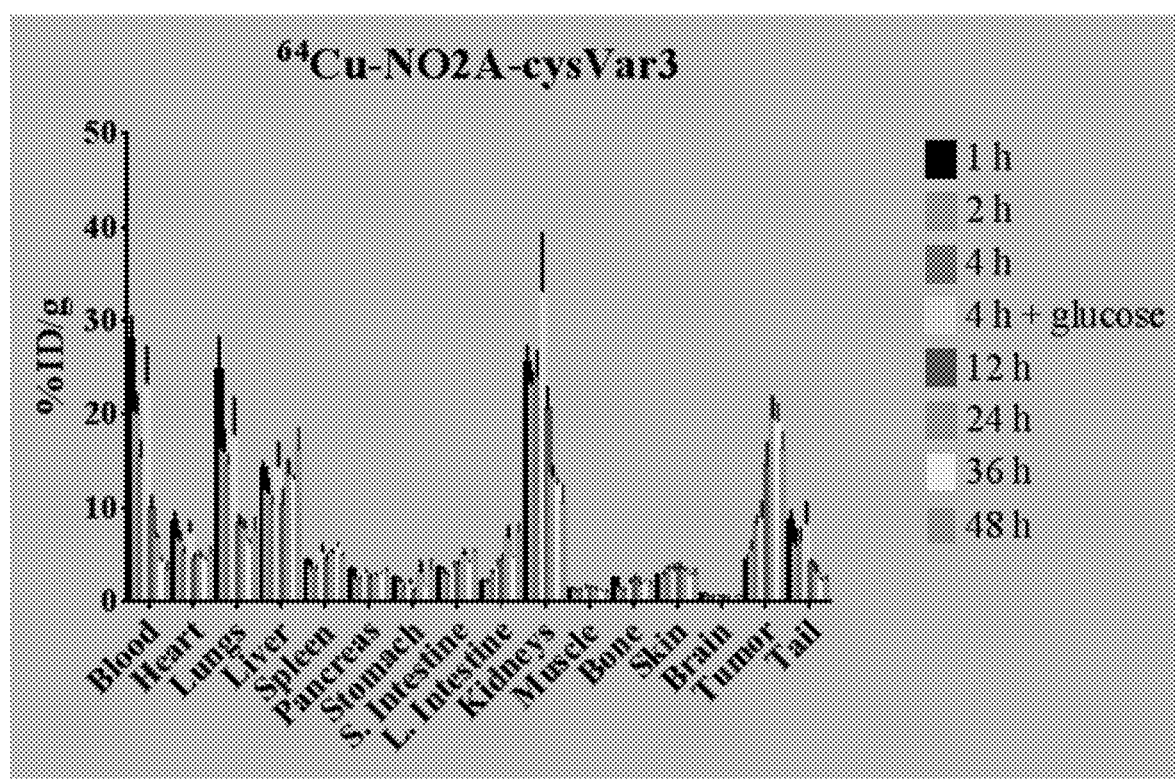
FIG. 54 shows the tissue uptake (mean % ID/g±SD) of $^{64}$Cu-NO2A-cysVar3 (n=3-8) administered via the lateral tail vein in female, BALB/c mice with orthotopic 4T1 breast cancer allografts implanted into the mammary fat pad full graph from text. Glucose was administered i.p. 30 min prior to tracer injection.
Figure 57:
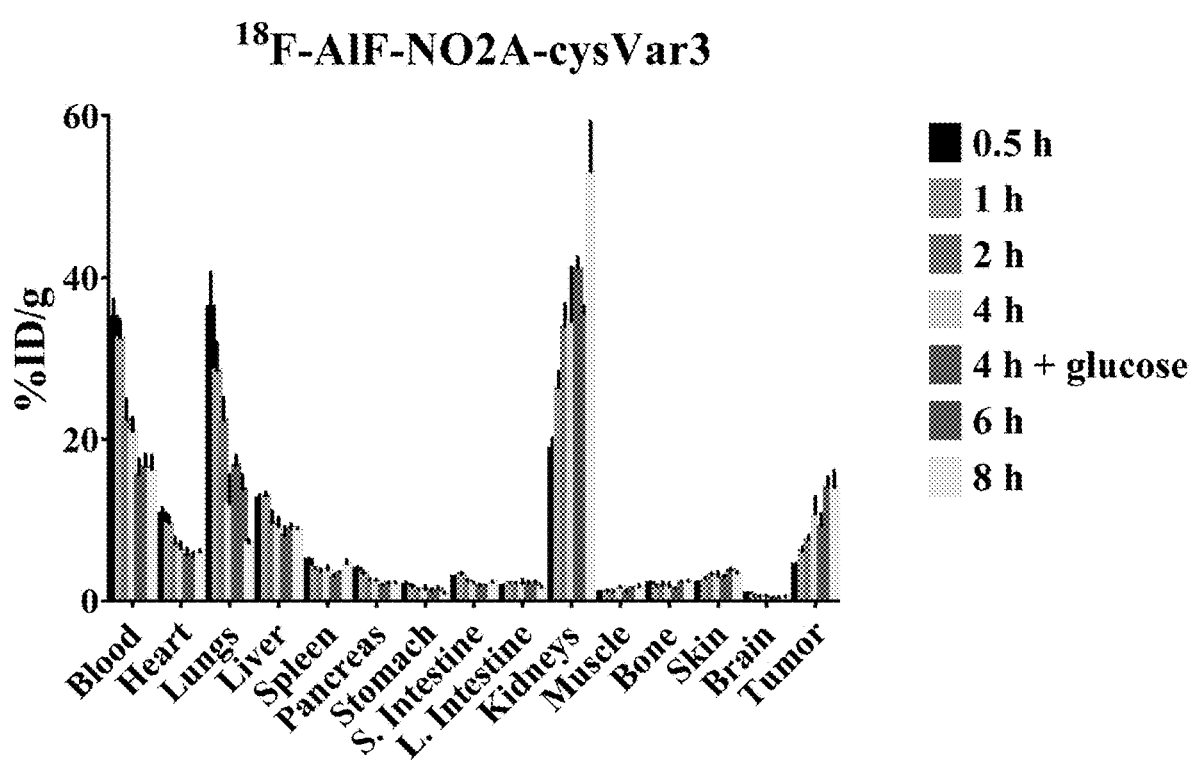
FIG. 57 shows the tissue uptake (mean % ID/g±SD) of [$^{18}$F]—AlF-NO2A-cysVar3 (n=4-10) administered via the lateral tail vein in female, BALB/c mice with orthotopic 4T1 breast cancer allografts implanted into the mammary fat pad full graph from text. Glucose was administered i.p. 30 min prior to tracer injection.

The SPECT/CT imaging with $^{67}$Ga-NO2A-cysVar3 and PET images of the $^{68}$Ga-NO2A-cysVar3 radioconjugates are shown in FIG. 18 and FIG. 20, respectively. The ex vivo biodistribution showed that the tumoral uptake (at 4 h p.i.) was 12±3% ID/g for $^{67}$Ga-NO2A-cysVar3, but 6±2% ID/g for $^{68}$Ga-NO2A-cysVar3 and 2.05±0.17% ID/g for the $^{67}$Ga-NOTA-Var3. The tumoral uptake (at 24 h p.i.) of the $^{67}$Ga-NO2A-cysVar3 in the imaging study (500 μCi injected) was 34±3% ID/g compared to 26±4% ID/g from the biodistribution study (50 μCi injected), but was greater than the 2.93±0.11% ID/g observed with $^{67}$Ga-NOTA-Var3. In both imaging experiments, the tumor was detectable, but more kidney uptake was observed relative to the $^{64}$Cu and Al$^{18}$F compounds. Additionally, the 4 h PET image shows significant blood pool, which is greatly reduced in the 24 h SPECT images. These results indicate that the positive charge of the metal-chelate complex shifts the excretion of the radiotracer toward kidney uptake, but does not decrease the tumoral uptake in the NO2A-cys Var3 radioconjugates.

The radioconjugate of NOTA-Var3 showed limited tumor targeting abilities, despite having a neutral metal-chelator complex. Additionally, the PET and SPECT/CT imaging of the radiopharmaceutical complexes utilizing the NO2A-$C^{27}$Var3 are included in FIGS. 19A and 19B.

These data demonstrate that all complexes with the NO2A chelator outperform the complexes with the NOTA chelator. It appears that NO2A-cyspHLIP complexes have a longer blood half-life, which results in higher targeting and longer retention within the tumor while exhibiting rapid clearance from nontarget tissues and the blood. Conversely, the NO2A-$C^{27}$Var3 compounds appear to have shorter blood half-lives than the NO2A-$C^2$Var3 compounds with greater kidney uptake and retention. The $^{67}$Ga-NO2A-$C^{27}$Var3 rapidly targets the tumor (20.5±1.0% ID/g) by 4 h p.i. and remains relatively constant out to 24 h p.i. (23±5% ID/g). The rapid accumulation within the tumor indicates that the NO2A-$C^{27}$Var3 complex may be useful for PET imaging with the shorter-lived $^{68}$Ga.

Figure 14A:
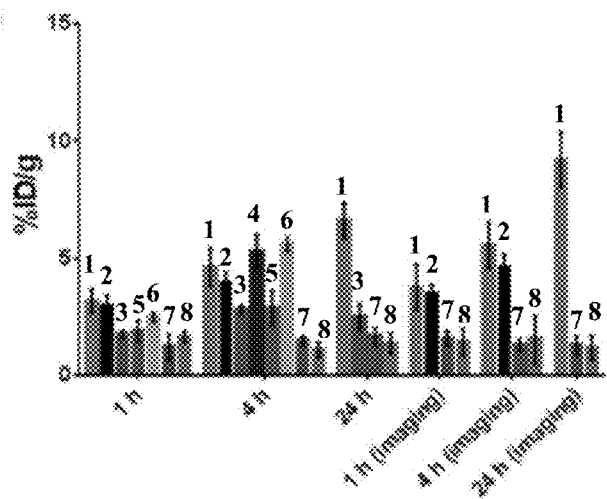
FIGS. 14A and 14B show a comparison of tumor uptake to previously reported studies for PC3 (FIG. 14A) and LNCaP (FIG. 14B) tumor bearing nude male mice at 1, 4, and 24 h with ex vivo biodistribution and in vivo imaging values. For imaging time points, ROIs were drawn on the coronal, sagittal, and transverse slices and the middle median value was tabulated for each mouse, the average of the four mice are shown with the standard deviation. Values from previous studies were used as reported.
Figure 14B:
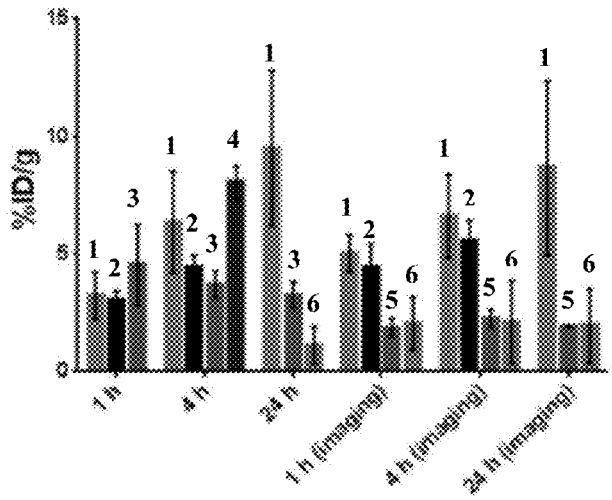

Taken together, the results demonstrate that $^{64}$Cu-NO2A-cysVar3, [$^{18}$F]—AlF-NO2A-cys Var3, 67Ga-NO2A-cys-Var3, and $^{67}$Ga-NO2A-$C^{27}$Var3 showed the greatest tumoral uptake and significant tumor-to-background contrast in the imaging studies described herein. The in vivo properties of $^{64}$Cu-NO2A-cysVar3 and [$^{18}$F]—AlF-NO2A-cysVar3 were investigated in PC3 and LNCaP tumor-bearing mice to compare the tumoral uptake observed in previous studies. In these tumor models, the tumor accumulation of $^{64}$Cu-NO2A-cysVar3 and [$^{18}$F]—AlF-NO2A-cysVar3 was significantly higher compared to previous generations of PET isotope-labeled complexes, especially at 24 h p.i. (FIGS. 14A-14B).

Figure 15A:
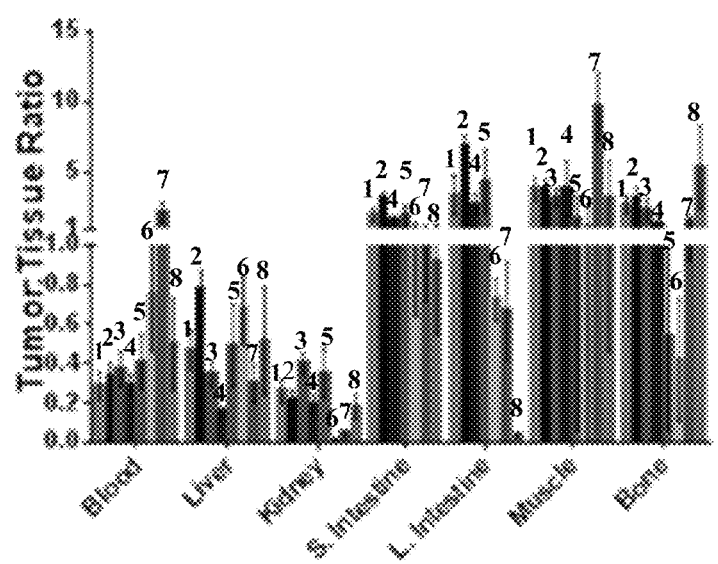
FIGS. 15A-15C show a comparison of tumor:tissue ratios at 4 h and 24 h to previous studies.
Figure 15B:
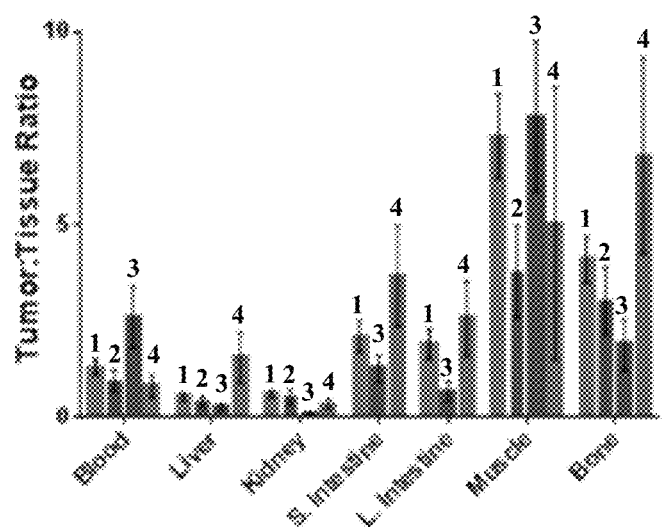
Figure 15C:
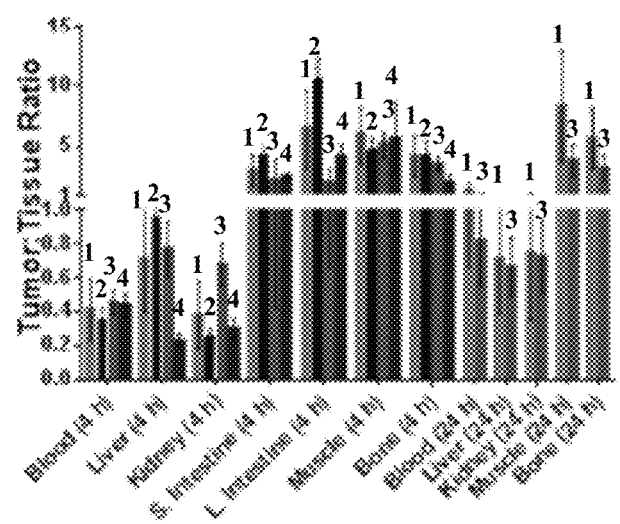

Comparing the tumor:tissue ratios with the previously reported compounds $^{18}$F-py-click-6Ahx-WT and $^{68}$Ga-DO3A-cysVar7, the tumor:muscle ratio at 4 h p.i. were 7.4±1.3 ($^{64}$Cu-NO2A-cysVar3), 6.9±1.9 ([$^{18}$F]—AlF-NO2A-cysVar3), 4±2 ($^{18}$F-py-click-6Ahx-WT), and 1.1±1.5 ($^{68}$Ga-DO3A-cysVar7) in PC3 tumor-bearing male nude mice; the tumor:bone ratios were 2.7±0.6 ($^{64}$Cu-NO2A-cysVar3), 3.2±0.7 ([$^{18}$F]—AlF-NO2A-cysVar3), 1.3±0.4 ($^{18}$F-py-click-6Ahx-WT), and 0.4±0.3 ($^{68}$Ga-DO3A-cysVar7) in PC3 tumor-bearing male nude mice. See FIGS. 15A-15B. Additionally, as shown in FIG. 15C, the tumor:muscle ratios in LNCaP tumor-bearing male nude mice at 4 h p.i. were 6±2 ($^{64}$Cu-NO2A-cysVar3), 4.7±0.9 ([$^{18}$F]—AlF-NO2A-cysVar3), and 6±3 ($^{18}$F-py-click-6Ahx-WT); the tumor:bone ratios in LNCaP tumor-bearing male nude mice at 4 h p.i. were 4.2±1.7 ($^{64}$Cu-NO2A-cysVar3), 4.3±1.1 ([$^{18}$F]—AlF-NO2A-cysVar3), and 1.8±0.6 ($^{18}$F-py-click-6Ahx-WT).

The tumor targeting ratios of $^{64}$Cu-NO2A-cysVar3 and [$^{18}$F]—AlF-NO2A-cysVar3 were superior to that observed with $^{68}$Ga-DO3A-cysVar7. While the $^{18}$F-py-click-6Ahx-WT had similar tumor:muscle ratios, the tumor:bone ratios were much lower than $^{64}$Cu-NO2A-cys Var3 and [$^{18}$F]—AlF-NO2A-cys Var3 in both prostate cancer tumor models. The decreased tumor:bone ratios may indicate that the previously reported $^{18}$F-py-click-6Ahx-WT was more prone to defluorination than the $^{18}$F-labeled complexes of the present technology. Further, unlike $^{18}$F-py-click-6Ahx-WT, the complexes of the present technology do not require HPLC purification or heating beyond 80° C., which is optimal for rapid dose-on-demand production of the radiolabeled complexes for patient trials.

These results demonstrate that the complexes of the present technology are useful in methods for detecting solid tumors in a subject. Accordingly, the compounds and complexes disclosed herein are useful in methods for detecting acidic diseased tissues in a subject.

Example 3: Use of the Complexes of the Present Technology to Detect Acidic Diseased Tissues in a Subject This Example demonstrates that the complexes of the present technology are useful in methods for detecting acidic diseased tissues in a subject.

Cerebral ischemia is induced by occlusion of the right middle cerebral artery for 30 min. Wild-type (WT) mice will be given a complex of the present technology (500-600 µCi (9-11 nmol) for in vivo imaging) at 0, 6, 24 and 48 h after ischemia. Mice will be sacrificed at no later than 48 hours after receiving the complex. PET/CT (2 and 4 h p.i.) and SPECT/CT (6 and 24 h p.i.) imaging studies will be carried out.

It is anticipated that the complexes disclosed herein will localize to the acidic diseased brain tissue (tissue impacted by ischemia), with minimal accumulation in non-target tissues.

These results demonstrate that the complexes of the present technology are useful in methods for detecting acidic diseased tissues in a subject.

EQUIVALENTS

The present technology is not to be limited in terms of the particular embodiments described in this application, which are intended as single illustrations of individual aspects of the present technology. Many modifications and variations of this present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the present technology. It is to be understood that this present technology is not limited to particular methods, reagents, compounds, compositions, or biological systems, which can, of course, vary. It is also to be understood that the terminology used herein is for the purpose of describing particular embodiments only, and is not intended to be limiting.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such A. A compound or pharmaceutically acceptable salt thereof comprising
    a pH (low) insertion peptide ("pHLIP") configured to localize to an extracellular environment having a pH that is lower than 7.4, wherein the pHLIP comprises a C-terminus and an N-terminus; and
    $X^1$ covalently attached to a heteroatom of a side chain of an amino acid residue of the pHLIP, where the amino acid residue is from 0, 1, 2, 3, 4, 5, or 6 residues from the C-terminus or the N-terminus; wherein
    $X^1$ is of Formula I

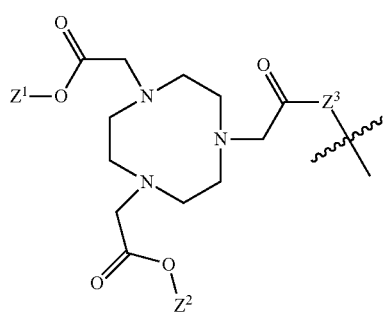
(I)

where $Z^1$ and $Z^2$ are each independently a lone pair of electrons (i.e. providing an oxygen anion) or H; and
$Z^3$ is —NH-alkylene-, —NH—CH$_2$CH$_2$-((poly(alkylene glycol))-,

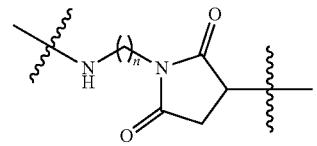

where n is 1, 2, 3, 4, 5, 6, 7, or 8, or a bond.

B. The compound of Paragraph A, wherein the pHLIP is configured to localize to an extracellular environment having a pH that is lower than 7.1.

C. The compound of Paragraph A or Paragraph B, wherein the pHLIP is configured to localize to a tissue comprising the extracellular environment.

D. The compound of any one of Paragraphs A-C, wherein $Z^3$ is —NH—(CH$_2$)$_m$—, —NH—CH$_2$CH$_2$—(O—CH$_2$CH$_2$)$_p$—,

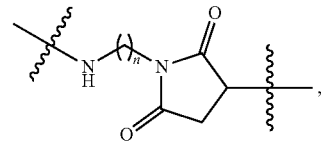

or a bond, where
n is 1, 2, 3, 4, 5, 6, 7, or 8;
m is 1, 2, 3, 4, 5, 6, 7, or 8; and
p is 1, 2, 3, 4, 5, 6, 7, or 8.

E. The compound of any one of Paragraphs A-D, wherein the pHLIP is

```
                                           (SEQ ID NO: 1)
ACEQNPIYWARYADWLFTTPLLLLDLALLVDADEGT, (SEQ ID NO: 2)
ACDDQNPWRAYLDLLFPTDTLLLDLLW, (SEQ ID NO: 3)
ADDQNPWRAYLDLLFPTDTLLLDLLWCG,
or (SEQ ID NO: 4)
ACEEQNPWARYLEWLFPTETLLLEL.
```

F. The compound of any one of Paragraphs A-E, wherein the amino acid residue is a cysteine or lysine.

G. The compound of any one of Paragraphs A-F, wherein $X^1$ is covalently attached to a sulfur atom of a cysteine residue of the pHLIP or is covalently attached to a ε-nitrogen atom of a lysine residue of the pHLIP.

H. The compound of any one of Paragraphs A-G, wherein the compound is

```
                                           (SEQ ID NO: 5)
AC(X¹)EQNPIYWARYADWLFTTPLLLLDLALLVDADEGT, (SEQ ID NO: 6)
AC(X¹)DDQNPWRAYLDLLFPTDTLLLDLLW,
```

```
                                                    (SEQ ID NO: 7)
ADDQNPWRAYLDLLFPTDTLLLDLLWC(X¹)G,
or
                                                    (SEQ ID NO: 8)
AC(X¹)EEQNPWARYLEWLFPTETLLLEL,
``` or a pharmaceutically acceptable salt thereof.

I. The compound of any one of Paragraphs A-H, wherein $X^1$ is of Formula Ia

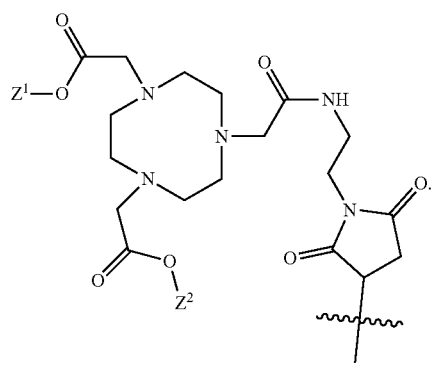

J. The compound of any one of Paragraphs A-I, wherein the compound is

```
                                                    (SEQ ID NO: 6)
AC(X¹)DDQNPWRAYLDLLFPTDTLLLDLLW, (SEQ ID NO: 7)
ADDQNPWRAYLDLLFPTDTLLLDLLWC(X¹)G,
``` or a pharmaceutically acceptable salt thereof; wherein $X^1$ is of Formula Ia.

K. A complex comprising the compound of any one of Paragraphs A-J and a radionuclide.

L. The complex of Paragraph K, wherein $X^1$ is of Formula II

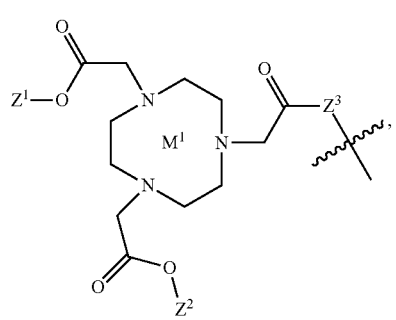

wherein $M^1$ is $^{60}Cu^{2+}$, $^{61}Cu^{2+}$, $^{62}Cu^{2+}$, $^{64}Cu^{2+}$, $^{67}Cu^{2+}$, $[^{18}F]$—$AlF^{2+}$, $^{67}Ga^{3+}$, $^{68}Ga^{3+}$, $^{69}Ga^{3+}$, or $^{71}Ga^{3+}$.

M. The complex of Paragraph K or Paragraph L, wherein $X^1$ is of Formula IIa

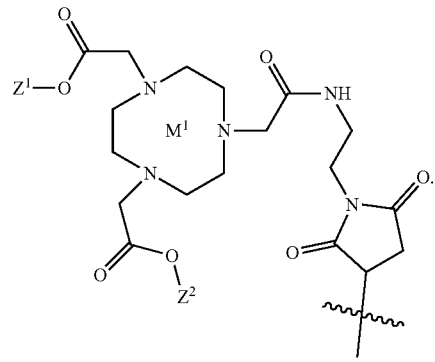

N. The complex of any one of Paragraphs K-M, wherein the complex is

```
                                                    (SEQ ID NO: 6)
AC(X¹)DDQNPWRAYLDLLFPTDTLLLDLLW, (SEQ ID NO: 7)
ADDQNPWRAYLDLLFPTDTLLLDLLWC(X¹)G,
``` or a pharmaceutically acceptable salt thereof; wherein $X^1$ is of Formula IIa.

O. A composition comprising a complex of any one of Paragraphs K-N and a pharmaceutically acceptable carrier.

P. A pharmaceutical composition for detecting a tissue comprising an extracellular environment having a pH that is lower than 7.4, the pharmaceutical composition comprising an effective amount of the complex of any one of Paragraphs K-N and a pharmaceutically acceptable carrier.

Q. The pharmaceutical composition of Paragraph P, wherein the tissue comprises one or more of the group consisting of an atherosclerotic plaques, ischemic myocardium, a tissue impacted by stroke, and a cancer tissue.

R. The pharmaceutical composition of Paragraph Q, wherein the cancer tissue is selected from the group consisting of breast cancer, colorectal cancer, cervical cancer, ovarian cancer, liver cancer, bladder cancer, hepatoma, hepatocellular carcinoma, brain tumors, lung cancer, gastric or stomach cancer, pancreatic cancer, thyroid cancer, kidney or renal cancer, prostate cancer, melanoma, sarcomas, carcinomas, Wilms tumor, endometrial cancer, glioblastoma, squamous cell cancer, astrocytomas, salivary gland carcinoma, vulvar cancer, penile carcinoma, and head-and-neck cancer, preferably from the group consisting of breast cancer, a brain tumor, prostate cancer, melanoma, and a metastatic cancer thereof.

S. A method for detecting solid tumors in a subject in need thereof comprising
  (a) administering an effective amount of a complex of any one of Paragraphs K-N to the subject; and
  (b) detecting the presence of a tissue comprising an extracellular environment having a pH that is lower than 7.4 in the subject by detecting radioactive levels emitted by the complex that are higher than a reference value.

T. The method of Paragraph S, wherein the radioactive levels emitted by the complex are detected using positron emission tomography or single photon emission computed tomography.

U. The method of Paragraph S or Paragraph T, wherein the subject is diagnosed with, or is suspected of having an atherosclerotic plaque, ischemic myocardium, a tissue impacted by stroke, or cancer.

V. The method of Paragraph U, wherein the cancer is selected from the group consisting of breast cancer, colorectal cancer, cervical cancer, ovarian cancer, liver cancer, bladder cancer, hepatoma, hepatocellular carcinoma, brain tumors, lung cancer, gastric or stomach cancer, pancreatic cancer, thyroid cancer, kidney or renal cancer, prostate cancer, melanoma, sarcomas, carcinomas, Wilms tumor, endometrial cancer, glioblastoma, squamous cell cancer, astrocytomas, salivary gland carcinoma, vulvar cancer, penile carcinoma, and head-and-neck cancer, preferably from the group consisting of breast cancer, a brain tumor, prostate cancer, melanoma, and a metastatic cancer thereof.

W. The method of any one of Paragraphs S-V, wherein the complex is administered into the cerebral spinal fluid or blood of the subject.

X. The method of any one of Paragraphs S-W, wherein the complex is administered intravenously, intramuscularly, intraarterially, intrathecally, intracapsularly, intradermally, intraperitoneally, intralesionally, transtracheally, subcutaneously, intracerebroventricularly, orally, intranasally, rectally, topically, or via inhalation.

Y. The method of any one of Paragraphs S-X, wherein the radioactive levels emitted by the complex are detected between 4 to 24 hours after the complex is administered.

Z. The method of any one of Paragraphs S-Y, wherein the radioactive levels emitted by the complex are expressed as the percentage injected dose per gram tissue (% ID/g).

AA. The method of any one of Paragraphs S-Z, wherein the ratio of radioactive levels between a tumor and normal tissue is about 2:1, 3:1, 4:1, 5:1, 6:1, 7:1, 8:1, 9:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1 or 100:1.

AB. A kit comprising a compound of any one of Paragraphs A-J, at least a radionuclide, and instructions for use.

AC. The kit of Paragraph AB, wherein the radionuclide comprises is $^{60}Cu^{2+}$, $^{61}Cu^{2+}$, $^{62}Cu^{2+}$, $^{64}Cu^{2+}$, $^{67}Cu^{2+}$, $[^{18}F]$—$AlF^{2+}$, $^{67}Ga^{3+}$, $^{68}Ga^{3+}$, $^{69}Ga^{3+}$, or $^{71}Ga^{3+}$.

Other embodiments are set forth in the following claims, along with the full scope of equivalents to which such claims are entitled.

The invention claimed is:

1. A compound or pharmaceutically acceptable salt thereof comprising a pH (low) insertion peptide ("pHLIP"), wherein
$X^1$ is covalently attached to a sulfur atom of a side chain of an amino acid residue of the pHLIP;
wherein
$X^1$ is of Formula Ia

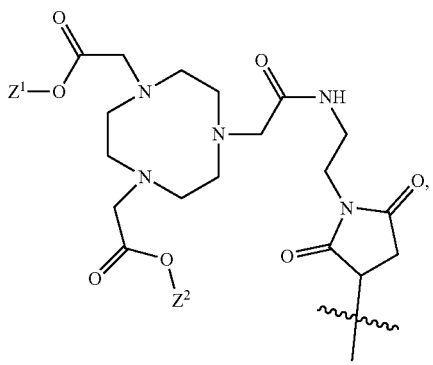

(Ia)

where
$Z^1$ and $Z^2$ are each independently a lone pair of electrons or H; and the compound is ADDQNPWRAYLDLLFPTDTLLLDLLWC($X^1$)G (SEQ ID NO:7) or a pharmaceutically acceptable salt thereof.

2. A complex comprising the compound of claim 1 and a radionuclide.

3. The complex of claim 2, wherein $X^1$ is of Formula IIa

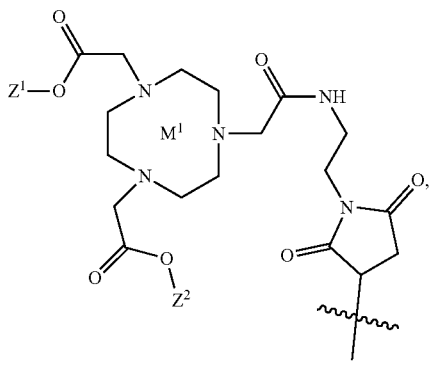

(IIa)

and
wherein $M^1$ is $^{64}Cu^{2+}$, $^{67}Cu^{2+}$, $[^{18}F]$—$AlF^{2+}$, $^{67}Ga^{3+}$, or $^{68}Ga^{3+}$.

4. A composition comprising a complex of claim 2 and a pharmaceutically acceptable carrier.

5. A pharmaceutical composition for detecting a tissue comprising an extracellular environment having a pH that is lower than 7.4, the pharmaceutical composition comprising an effective amount of the complex of claim 2 for detecting the tissue and a pharmaceutically acceptable carrier.

6. The pharmaceutical composition of claim 5, wherein the tissue comprises one or more of the group consisting of an atherosclerotic plaque, ischemic myocardium, a tissue impacted by stroke, and a cancer tissue.

7. A method for detecting solid tumors in a subject in need thereof comprising
(a) administering an effective amount of a complex of claim 2 for detecting solid tumors to the subject; and
(b) detecting the presence of a tissue comprising an extracellular environment having a pH that is lower than 7.4 in the subject by detecting radioactive levels emitted by the complex that are higher than a reference value.

8. The method of claim 7, wherein the radioactive levels emitted by the complex are detected using positron emission tomography or single photon emission computed tomography.

9. The method of claim 7, wherein the subject is diagnosed with, or is suspected of having an atherosclerotic plaque, ischemic myocardium, a tissue impacted by stroke, or cancer.

10. The method of claim 7, wherein the radioactive levels emitted by the complex are detected between 4 to 24 hours after the complex is administered.

11. A kit comprising a compound of claim 1, at least a radionuclide, and instructions for use.

12. The compound of claim 1, wherein each amino acid residue of the pHLIP is a D-amino acid.

* * * * *